(12) United States Patent
Ratkovic et al.

(10) Patent No.: US 11,451,451 B2
(45) Date of Patent: *Sep. 20, 2022

(54) INTENT-BASED ANALYTICS

(71) Applicant: Apstra, Inc., Menlo Park, CA (US)

(72) Inventors: Aleksandar Luka Ratkovic, Palo Alto, CA (US); Jonathan Thambidurai, Palo Alto, CA (US); Maksim Kulkin, Sunnyvale, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,783

(22) Filed: Jun. 30, 2020

(65) Prior Publication Data

US 2020/0328949 A1 Oct. 15, 2020

Related U.S. Application Data

(63) Continuation of application No. 16/043,904, filed on Jul. 24, 2018, now Pat. No. 10,756,983.

(Continued)

(51) Int. Cl.

| | |
|---|---|
| *H04L 41/14* | (2022.01) |
| *H04L 43/045* | (2022.01) |
| *H04L 67/02* | (2022.01) |
| *H04L 43/08* | (2022.01) |
| *H04L 43/06* | (2022.01) |
| *G06F 16/951* | (2019.01) |

(Continued)

(52) U.S. Cl.
CPC ........ *H04L 41/145* (2013.01); *G06F 16/2379* (2019.01); *G06F 16/9024* (2019.01); *G06F 16/951* (2019.01); *H04L 43/045* (2013.01); *H04L 43/06* (2013.01); *H04L 43/08* (2013.01); *H04L 43/0817* (2013.01); *H04L 67/02* (2013.01); *H04L 41/046* (2013.01); *H04L 41/22* (2013.01)

(58) Field of Classification Search
None
See application file for complete search history.

(56) References Cited

U.S. PATENT DOCUMENTS

| | | |
|---|---|---|
| 7,636,771 B2 | 12/2009 | Torii |
| 7,870,238 B2 | 1/2011 | Pusateri et al. |

(Continued)

FOREIGN PATENT DOCUMENTS

| | | |
|---|---|---|
| EP | 3522452 A1 | 8/2019 |
| EP | 3700132 A1 | 8/2020 |

(Continued)

OTHER PUBLICATIONS

U.S. Appl. No. 16/400,936, filed May 1, 2019, naming inventors Ratkovic et al.

(Continued)

*Primary Examiner* — Scott B Christensen
(74) *Attorney, Agent, or Firm* — Shumaker & Sieffert, P.A.

(57) ABSTRACT

In performing network analysis, a first declarative specification and a second declarative specification are received. The first declarative specification specifies a dynamically updating query associated with networking components of a computer network. Dynamically updated results of the dynamically updating query are processed. An indication of a detected anomaly is provided based at least in part on a result of the updated dynamically updated results of the dynamically updating query.

20 Claims, 42 Drawing Sheets

Related U.S. Application Data

(60) Provisional application No. 62/596,672, filed on Dec. 8, 2017.

(51) Int. Cl.
*G06F 16/23* (2019.01)
*G06F 16/901* (2019.01)
*H04L 43/0817* (2022.01)
*H04L 41/22* (2022.01)
*H04L 41/046* (2022.01)

(56) References Cited

U.S. PATENT DOCUMENTS

| | | |
|---|---|---|
| 8,156,207 B2 | 4/2012 | Wood et al. |
| 8,327,414 B2 | 12/2012 | Strassner et al. |
| 8,386,593 B1 | 2/2013 | Gao et al. |
| 8,737,993 B2 | 5/2014 | Alves et al. |
| 8,782,182 B2 | 7/2014 | Chaturvedi et al. |
| 8,819,202 B1 | 8/2014 | Carolan et al. |
| 8,849,973 B2 | 9/2014 | Leib et al. |
| 8,869,236 B1 | 10/2014 | Tonogai et al. |
| 9,037,969 B2 | 5/2015 | Wolff-Petersen et al. |
| 9,098,707 B2 | 8/2015 | Borghetti et al. |
| 9,298,928 B2 | 3/2016 | Borghetti et al. |
| 10,063,428 B1 | 8/2018 | Karam et al. |
| 10,277,461 B1 | 4/2019 | A et al. |
| 10,313,206 B1 | 6/2019 | Karam et al. |
| 10,333,776 B2 | 6/2019 | Karam et al. |
| 10,374,872 B2 | 8/2019 | Ratkovic et al. |
| 10,374,886 B1 | 8/2019 | A et al. |
| 10,389,573 B2 | 8/2019 | Karam et al. |
| 10,439,875 B2 | 10/2019 | Mohanram |
| 10,505,816 B2 | 12/2019 | Mohanram et al. |
| 10,516,761 B1 | 12/2019 | A et al. |
| 10,558,542 B1 | 2/2020 | A et al. |
| 10,567,384 B2 | 2/2020 | Kang et al. |
| 10,581,694 B2 | 3/2020 | Mohanram |
| 10,630,540 B2 | 4/2020 | Karam et al. |
| 10,693,738 B2 | 6/2020 | Nagarajan et al. |
| 10,698,714 B2 | 6/2020 | Krishnamurthy et al. |
| 10,756,983 B2 | 8/2020 | Ratkovic et al. |
| 10,771,342 B2 | 9/2020 | Kang et al. |
| 10,826,770 B2 | 11/2020 | Sethi et al. |
| 10,938,667 B2 | 3/2021 | Sharma et al. |
| 10,951,477 B2 | 3/2021 | Mohanram |
| 10,992,520 B2 | 4/2021 | Lee et al. |
| 10,992,543 B1 | 4/2021 | Rachamadugu et al. |
| 11,086,709 B1 | 8/2021 | Ratkovic et al. |
| 2002/0112053 A1 | 8/2002 | Christensen et al. |
| 2002/0178246 A1 | 11/2002 | Mayer |
| 2002/0178380 A1 | 11/2002 | Wolf et al. |
| 2004/0059812 A1 | 3/2004 | Assa |
| 2005/0091068 A1 | 4/2005 | Ramamoorthy |
| 2006/0080425 A1 | 4/2006 | Wood et al. |
| 2006/0241931 A1 | 10/2006 | Abu el Ata et al. |
| 2007/0130192 A1 | 6/2007 | Bolder et al. |
| 2007/0150561 A1 | 6/2007 | Courtney |
| 2009/0059814 A1 | 3/2009 | Nixon et al. |
| 2009/0171731 A1 | 7/2009 | Bobak et al. |
| 2009/0198797 A1 | 8/2009 | Wang et al. |
| 2009/0282129 A9 | 11/2009 | Tindal |
| 2010/0293364 A1 | 11/2010 | Maini |
| 2010/0306275 A1 | 12/2010 | Maheshwari et al. |
| 2013/0060929 A1 | 3/2013 | Koponen et al. |
| 2014/0096249 A1 | 4/2014 | Dupont |
| 2014/0200858 A1 | 7/2014 | Chatow et al. |
| 2015/0015376 A1 | 1/2015 | Jenkins |
| 2015/0188774 A1 | 7/2015 | Nadaf et al. |
| 2015/0248487 A1 | 9/2015 | Baranowski et al. |
| 2015/0379409 A1 | 12/2015 | Hu et al. |
| 2016/0188767 A1 | 6/2016 | Razin |
| 2016/0342510 A1 | 11/2016 | Pani |
| 2016/0344772 A1 | 11/2016 | Monahan et al. |
| 2017/0109907 A1 | 4/2017 | Hamedani |
| 2017/0250881 A1 | 8/2017 | Kellicker |
| 2017/0331828 A1 | 11/2017 | Caldera et al. |
| 2018/0137155 A1 | 5/2018 | Majumdar |
| 2018/0210927 A1 | 7/2018 | Karam et al. |
| 2018/0316576 A1 | 11/2018 | Kang et al. |
| 2019/0182119 A1 | 6/2019 | Ratkovic et al. |
| 2019/0238410 A1 | 8/2019 | Kang et al. |
| 2019/0238423 A1 | 8/2019 | Karam et al. |
| 2019/0306015 A1 | 10/2019 | Ratkovic et al. |
| 2019/0319830 A1 | 10/2019 | Karam et al. |
| 2020/0007495 A1 | 1/2020 | Balamurugan et al. |
| 2020/0136917 A1 | 4/2020 | Kang et al. |
| 2020/0213189 A1 | 7/2020 | Karam et al. |

FOREIGN PATENT DOCUMENTS

| | | |
|---|---|---|
| WO | 2007140337 A2 | 12/2007 |
| WO | 2017204872 A1 | 11/2017 |

OTHER PUBLICATIONS

U.S. Appl. No. 16/360,660, filed Mar. 21, 2019, naming inventors Rachamadugu et al.
U.S. Appl. No. 17/104,804, filed Nov. 25, 2020, naming inventors Hafeez et al.
Prakash et al., "PGA: Using Graphs to Express and Automatically Reconcile Network Policies," SIGCOMM 2015, Aug. 17-21, 2015, London, United Kingdom, 14 pp.
Harrington et al., "An Architecture for Describing Simple Network Management Protocol (SNMP) Management Frameworks," Network Working Group, RFC 3411, Dec. 2002, 65 pp.
Enns, "NETCONF Configuration Protocol," Network Working Group, RFC 4741, Dec. 2006, 96 pp.
Enns et al., "Network Configuration Protocol (NETCONF)," Internet Engineering Task Force (IETF),RFC 6241, Jun. 2011, 114 pp.
Bjorklund, "YANG—A Data Modeling Language for the Network Configuration Protocol (NETCONF)," Internet Engineering Task Force (IETF), RFC 6020, Oct. 2010, 174 pp.
International Search Report and Written Opinion of International Application No. PCT/US2018/051206, dated Nov. 26, 2018, 8 pp.
International Preliminary Report on Patentability from International Application No. PCT/US2018/051206, dated Jun. 9, 2020, 6 pp.
Prosecution History from U.S. Appl. No. 16/043,904, dated Dec. 12, 2019 through Jul. 14, 2020, 40pp.
U.S. Appl. No. 16/949,242, filed Oct. 21, 2020, naming inventors A et al.
Extended Search Report from counterpart European Application No. 18886065.4, dated Jun. 22, 2021, 9 pp.
"Zero-touch network and Service Management (ZSM); Means of Automation," ETSI GR ZSM 005: v1.1.1. May 2020, 70 pp.
Abhashkumar et al., "Supporting Diverse Dynamic Intent-based Policies using Janus," CoNEXT '17: Proceedings of the 13th International Conference on emerging Networking Experiments and Technologies, Incheon, Republic of Korea, Dec. 12-15, 2017, pp. 296-309.
Beckett et al., "Don't Mind the Gap: Bridging Network-wide Objectives and Device-level Configurations," SIGCOMM 16, Aug. 22-26, 2016, Florianopolis, Brazil, pp. 328-341.
Nagendra et al. "VISCR: Intuitive & Conflict-free Automation for Securing the Dynamic Consumer IoT Infrastructures," arXIV:1907.13288v1, Jul. 31, 2019, 16 pp.
Response to Extended Search Report dated Jul. 9, 2021, from counterpart European Application No. 18886065.4 filed Jan. 6, 2022, 152 pp.
U.S. Appl. No. 17/652,458, filed Feb. 24, 2022, naming inventors Chandrasekhar A.

```
class Schema(schema.Schema):                                    ─1100
    nodes = {
      'system': {
          'system_type': schema.Enum(['switch', 'server']),
          'role': schema.Enum(['spine', 'leaf',
                      'l2_server', 'l3_server',
                      'external_router']),
          'hostname': schema.Optional(schema.String()),
          'system_id': schema.Optional(schema.String()),
          'deploy_mode': schema.Optional(schema.Enum(['deploy', 'undeploy',
                                      'ready'])),
          'position': schema.Optional(schema.Integer()),
          'logical_device': schema.Optional(schema.String()),
      },
      'redundancy_group': {
      },
      'link': {
          'link_type': schema.Enum(['ethernet', 'aggregate_link']),
          'role': schema.Enum(['spine_leaf', 'leaf_l2_server', 'leaf_l3_server',
                      'leaf_pair_l2_server', 'leaf_pair_l3_server',
                      'leaf_peer_link', 'to_external_router']),
      },
      'interface': {
          'if_type': schema.Enum(['ip', 'loopback', 'ethernet', 'vlan', 'svi',
                      'port_channel', 'mlag_port_channel']),
          'if_name': schema.Optional(schema.String()),
          'mode': schema.Optional(schema.Enum(['trunk', 'access'])),
          'ipv4_addr': schema.Optional(schema.IpAddress()),
          'port_channel_id': schema.Optional(schema.Integer()),
          'mlag_id': schema.Optional(schema.Integer()),
          'protocols': schema.Optional(schema.Enum(['ebgp', 'iccp'])),
      },
      'domain': {
          'domain_type': schema.Enum(['autonomous_system', 'area', 'mlag']),
      },
      'virtual_network': {
          'vn_type': schema.Enum(['vlan', 'vxlan']),
          'vn_id': schema.Integer(),
          'description': schema.Optional(schema.String()),
          'ipv4_subnet': schema.Optional(schema.IpNetworkAddress()),
          'virtual_mac': schema.Optional(schema.MacAddress()),
          'virtual_gateway_ipv4': schema.Optional(schema.IpAddress()),
      },
```

FIG. 11

```
    'vn_instance': {
      'vlan_id': schema.VlanId(),
    },
    'vn_endpoint': {
      'tag_type': schema.Enum(['vlan_tagged', 'untagged']),
    },
}
relationships = [
    {
      'source': 'link',
      'type': 'composed_of',
      'target': 'link',
    },
    {
      'source': 'link',
      'type': 'part_of',
      'target': 'link',
    },
    {
      'source': 'system',
      'type': 'hosted_interfaces',
      'target': 'system',
    },
    {
      'source': 'interface',
      'type': 'hosted_on',
      'target': 'system',
    },
    {
      'source': 'interface',
      'type': 'composed_of',
      'target': 'interface',
    },
    {
      'source': 'interface',
      'type': 'part_of',
      'target': 'interface',
    },
    {
      'source': 'interface',
      'type': 'link',
      'target': 'link',
    },
```

```
{
    'source': 'link',
    'type': 'interfaces',
    'target': 'interface',
},
{
    'source': 'domain',
    'type': 'composed_of_systems',
    'target': 'system',
},
{
    'source': 'system',
    'type': 'part_of_domain',
    'target': 'domain',
},
{
    'source': 'domain',
    'type': 'composed_of_redundancy_group',
    'target': 'redundancy_group',
},
{
    'source': 'redundancy_group',
    'type': 'redundancy_group_domain',
    'target': 'domain',
},
{
    'source': 'domain',
    'type': 'composed_of_interfaces',
    'target': 'interface',
},
{
    'source': 'interface',
    'type': 'part_of_domain',
    'target': 'domain',
},
{
    'source': 'system',
    'type': 'part_of_redundancy_group',
    'target': 'redundancy_group',
},
{
    'source': 'redundancy_group',
    'type': 'composed_of_systems',
    'target': 'system',
},
```

```
{
    'source': 'interface',
    'type': 'hosted_on',
    'target': 'redundancy_group',
},
{
    'source': 'redundancy_group',
    'type': 'hosted_interfaces',
    'target': 'interface',
},
{
    'source': 'virtual_network',
    'type': 'instantiated_by',
    'target': 'vn_instance',
},
{
    'source': 'vn_instance',
    'type': 'instantiates',
    'target': 'virtual_network',
},
{
    'source': 'virtual_network',
    'type': 'member_endpoints',
    'target': 'vn_endpoint',
},
{
    'source': 'vn_endpoint',
    'type': 'member_of',
    'target': 'virtual_network',
},
{
    'source': 'system',
    'type': 'hosted_vn_endpoint',
    'target': 'vn_endpoint',
},
```

```
{
    'source': 'vn_endpoint',
    'type': 'hosted_on',
    'target': 'system',
},
{
    'source': 'vn_instance',
    'type': 'member_interfaces',
    'target': 'interface',
},
{
    'source': 'interface',
    'type': 'member_of_vn_instance',
    'target': 'vn_instance',
},
]
```

```
                                                                    ┌─1356
@rule(match(
    node('domain', name='domain', domain_type='autonomous_system')  ┌─1350
    .where(lambda domain: domain.domain_id)
    .out('composed_of_systems') ┌─1351
    .node('system', name='device') ┌─1352
    .where(lambda device: device.system_id)
    .out('hosted_interfaces')
    .node('interface', name='loopback', if_type='loopback')
    .where(lambda loopback: loopback.ipv4_addr),
    node(name='device') ┌─1353
    .out('hosted_interfaces')
    .node('interface', name='interface')
    .out('link')
    .node('link', name='link')
    .out('interfaces')
    .node('interface', name='remote_interface')
    .where(lambda interface, remote_interface: interface != remote_interface and
        interface.ipv4_addr)
    .out('hosted_on')
    .node('system', name='remote_device', role='external_router')
    .out('part_of_domain')
    .node('domain', name='remote_domain', domain_type='autonomous_system')
    .where(lambda remote_domain: remote_domain.domain_id),
    node(name='remote_device')
    .out('hosted_interfaces')
    .node('interface', name='remote_loopback', if_type='loopback')
    .where(lambda remote_loopback: remote_loopback.ipv4_addr)
))
```

```
def render_loopback_peering(self, path, action):
    def expect_bgp(path):
        expect = {
            'role': path['device'].role,
            'identity': {
                'source_ip': path['loopback'].ipv4_addr,
                'source_asn': path['domain'].domain_id,
                'dest_ip': path['remote_loopback'].ipv4_addr,
                'dest_asn': path['remote_domain'].domain_id
            },
            'expected': {
                'value': 'up'
            },
        }
        return expect
    if action in ['added', 'updated'] and self.should_render(path):
        self.expectation_store.add(path['device'].system_id,
                    'bgp',
                    self.expect_id(path),
                    expect_bgp(path))
    elif path['device'].system_id:
        self.expectation_store.remove(path['device'].system_id,
                    'bgp',
                    self.expect_id(path))
```

```
class InterfaceRenderer(ExpectationRenderingPlugin):
   OMITTED_NODE_ROLES = ['external_router', 'leaf_pair']
   UNMANAGED_NODE_ROLES = ['external_router', 'l2_server']

def render_interface(self, role, intf, state):
      return {
         'role': role,
         'identity': {
            'interface_name': intf,
         },
         'expected': {
            'value': state,
         }
      } def should_render_path(self, path):
      device = path['device']
      if device.role in self.OMITTED_NODE_ROLES:
         return False if device.deploy_mode == 'undeploy':
         return False link = path['link']
      # Exclude aggregate interface in pre-deploy state
      if link.link_type == 'aggregate_link' and device.deploy_mode != 'deploy':
         return False

# Always include interfaces facing unmanaged nodes
      remote_device = path['remote_device']
      if remote_device.role in self.UNMANAGED_NODE_ROLES:
         return True

# Exclude interfaces facing undeployed managed nodes
      if not remote_device.system_id or remote_device.deploy_mode == 'undeploy':
         return False return True
```

FIG. 14B

```
{
  "name": "server_tfc_imbalance,
  "processors": [
  {
   "name": "server_tx_bytes",
   "type": "interface_counter_collector",
   "outputs": { "out": "server_tx_bytes_output" },
                     "units": "bps",
  "properties": {
  "query": "node('system', name='sys').
            out('hosted_interfaces').
            node('interface', name='intf').
            out('link').
            node('link', name='link', link_type='ethernet', speed=not_none())"
  "system_id": "sys.system_id",
  "interface": "intf.if_name",
  "counter_type": "tx_bytes"
  }
 },
 {
  "name": "routing_table_size_standard_deviation",
  "type": "std_dev",
  "inputs": {
    "in": "server_tx_bytes_output"
  },
  "outputs": {
   "out": "std_dev_output"
  },
  "properties": { }
 },
```

FIG. 18A

```
{
        "name": "std_dev_anomaly",
        "type": "anomaly",
        "inputs": {
                "in": "std_dev_output"
        },
        "outputs": {
                "out": "server_traffic_imbalanced"
        },
        "properties": {
                "range": {
                        "max": 100,
                        "min": 0
                }
        }
    }
  ]
}
```

```
{
  "type" : "ns"
  "units"   "bytes_per_second"
  "properties" : ["interface", "system_id"],
  "values" : [
    {
      "properties" : {"interface" : "intf1", "system_id":spine1"},
      "value" : 22
    },
    {
      "properties" : {"interface" : "intf2", "system_id":"spine1"},
      "value" : 23
    },
    {
      "properties" : {"interface" : "intf1", "system_id":"spine3"},
      "value" : 24
    }
  ]
}
```

1806

```
{ "type" : "n",
  "units" : " ",
  "value" : 1 }
```

1808

```
{ "type" : "ds",
  "units" : " ",
  "value" : false,
  "possible_values" : ["true", "false"] }
```

FIG. 18B

```
{ "id" : "...",
  "last_modified_at" : "...",
  "severity" : "critical",
  "anomaly_type" : "probe",
  "identity" : {
      "anomaly_type" : "probe",
      "probe_id" : "efb2bf7f-d8cc-4a55-8e9b-9381e4dba61f",
      "stage_id" : "server_traffic_imbalanced",
      "properties" : { },
  }
  "actual" : {
      "value_int" : 101
  },
  "expected" : {
      "value_int" : 100
  },
}
```
— 1810

FIG. 18C

```
message ProbeProperty {
    required string name = 5;
    required string value = 6;
}
message ProbeMessage {
    repeated ProbeProperty property = 1;
    oneof value {
        int64 int64_value = 2;
        float float_value = 3;
        string string_value = 4;
    }
    required string probe_id = 5;
    required string stage_name = 6;
}
```
1812

FIG. 18D

| | | | | | 🔒 admin ▾ |
|---|---|---|---|---|---|
| 🗂 Q|O|S | Blueprints | Devices | Design ▾ | Resources ▾ | Platform ▾ | |

🏠/Blueprints/rack-based-blueprint-ofaef644

⌂ Dashboard   ⚠ Staged ⟩ 🖫 Uncommitted ⟩ ↻ Active   🗑 Delete Blueprint

△ Status  ⚡ Anomalies  ⚙ Analytics  🔍 Query

Probes/leaf_ecmp_balance_ok leaf_tx_bytes leaf_tx_bytes

Stage: leaf_tx_bytes_accumulate
Type: Number Set Time Series

| System ID | Interface | Counter Type | Value |
|---|---|---|---|
| 525400AD83CD | swp1 | tx_bytes | 〰️〰️〰️ 197  12:46:58 |
| 5254007EDF69 | Ethernet2 | tx_bytes | 〰️〰️〰️ |
| 52540026B670 | Ethernet2 | tx_bytes | |
| 525400AD83CD | swp2 | tx_bytes | |
| 5254007EDF69 | Ethernet1 | tx_bytes | |
| 52540026B670 | Ethernet1 | tx_bytes | | leaf_tx_bytes_accumulate leaf_tx_bytes_accumulate leaf_tx_std leaf_tx_std leaf_tx_anomaly leaf_tx_anomaly leaf_tx_imbalance leaf_tx_imbalance leaf_tx_match_imbalance leaf_tx_match_imbalance leaf_tx_imbalance_anomaly leaf_tx_imbalance_anomaly

| System ID | Interface Name | Value |
|---|---|---|
| leaf_0 | swp0 | 389kbps |
| leaf_1 | swp1 | 850kbps |
| leaf_2 | swp2 | 631kbps |
| leaf_3 | swp3 | 223kbps |
| leaf_0 | swp4 | 419kbps |
| leaf_1 | swp5 | 746kbps |
| leaf_2 | swp6 | 291kbps |
| leaf_3 | swp7 | 194kbps |
| leaf_0 | swp8 | 521kbps |
| leaf_1 | swp9 | 759kbps |

| System ID | Interface Name | Value |
|---|---|---|
| leaf_0 | swp0 | |
| leaf_1 | swp1 | |
| leaf_2 | swp2 | 613697 00:03:35 |
| leaf_3 | swp3 | 00:00:00 00:01:00 00:02:00 00:03:00 00:04:00 00:05:00 |
| leaf_0 | swp4 | |
| leaf_1 | swp5 | |
| leaf_2 | swp6 | |
| leaf_3 | swp7 | |
| leaf_0 | swp8 | |
| leaf_1 | swp9 | |
| leaf_2 | swp10 | |
| leaf_3 | swp11 | |

| System ID | Status |
|---|---|
| 525400C4247F | True |
| 525400C4247E | False |
| 525400C4247G | False |
| 525400C4247T | False |
| 525400C4247W | False |
| 525400C4247H | False |

FIG. 19D

INTENT-BASED ANALYTICS

CROSS REFERENCE TO OTHER APPLICATIONS

This application is a continuation of co-pending U.S. patent application Ser. No. 16/043,904, entitled INTENT-BASED ANALYTICS filed Jul. 24, 2018 which is incorporated herein by reference for all purposes, which claims priority to U.S. Provisional Application No. 62/596,672, entitled INTENT-BASED ANALYTICS filed Dec. 8, 2017 which is incorporated herein by reference for all purposes.

BACKGROUND OF THE INVENTION

Ensuring that a computer network is operating correctly and efficiently often requires collecting and analyzing data about the computer network. Typically this can be achieved by writing a custom program that gathers selected data from specified sources and analyzes the data using a chosen criteria specifically programmed for the selected data. However, when the computer network changes or other criteria are desired to be analyzed, the new custom programs have to be developed. This is often costly and inefficient as well as difficult to develop. As the requirements change over time, often the entire costly process of code development must be performed again, despite how minor the change is to the network.

BRIEF DESCRIPTION OF THE DRAWINGS

Various embodiments of the invention are disclosed in the following detailed description and the accompanying drawings.

FIG. 11 shows an example of a model schema for a graph model.

FIG. 13B shows an example of an implementation of an agent.

FIG. 18A is an example of a specification of a probe.

FIG. 18B is an example of responses to queries for stages of a probe.

FIG. 18C is an example of a raised anomaly.

FIG. 18D is an example of formats for probe messages.

FIG. 19A is a diagram illustrating an embodiment of a user interface for managing a probe.

FIGS. 19B-19E show various example user interface components 1904-1910 showing results from probe executions.

DETAILED DESCRIPTION

Figure 1:
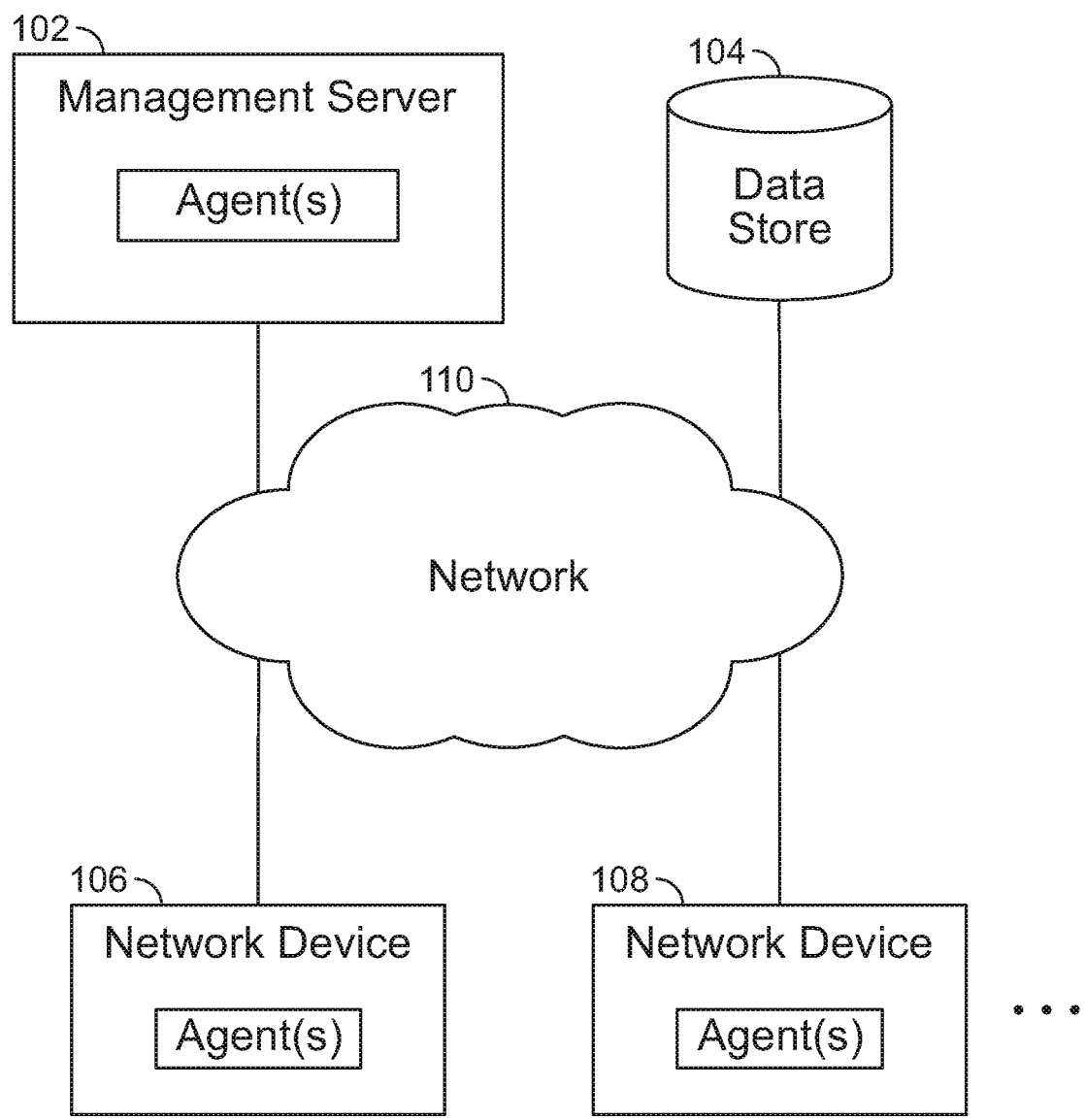
FIG. 1 is a diagram illustrating an embodiment of a network management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to configure and validate the operational state of a network, a network administrator may specify a declarative requirement of a desired network configuration and expectations of the operational state. For example, the network administrator may specify a declarative requirement of what the final network configuration should be rather than the mechanics of how to accomplish the network configuration.

Enterprise data center infrastructures (e.g., networks) are continuously growing and the need for holistic management software is of paramount importance. Yet management tools are not able to keep up with the growing complexity of infrastructures due to diverse network topologies, ever growing data center sizes, and more inter-connected data centers. Building extensibility into management tools is often difficult as it relies on having a scalable runtime and programming environment that is extensible at the customer site. For example, many management tools do not allow extending built in domain models to represent newer infrastructure designs.

In some embodiments, a graph representation data model (e.g., with nodes and edges) is utilized along with a management tool to configure and set operational state expectations for a computing infrastructure. As follows, graph model, graph representation, and graph are used interchangeably to refer to a graph representation data model. The graph representation allows modeling richness with a small set of foundational constructs—nodes and edge relations. The management tool utilizing the graph representation is a deeply extensible and effective way to curtail complexity in modeling, allowing creation of domain specific data models for representing specific network designs/topologies.

But using graph representations comes with new challenges. As the size and frequency of modification of the graph representations increases, the processing required to implement and maintain aspects of business logic also increases exponentially. These dimensions put conventional programming paradigms at risk in delivering a reliable infrastructure. Thus, an implementation of a graph representation model that is efficient, modular, and scalable is desired.

Configuration and validation of operational state of a computing infrastructure is disclosed. The disclosed method comprises representing at least a portion of the computing infrastructure as a graph representation of computing infrastructure elements including a computing infrastructure node and a computing infrastructure edge, detecting a change in the graph representation of computing infrastructure elements, and determining whether the change affects a graph representation query/triggering pattern. In the event the change affects the graph representation query/triggering pattern, a query agent associated with the graph representation query/triggering pattern is notified of the change. In some embodiments, business rules and policies are also represented in the graph representation. A system comprising an interface and a processor configured to execute the method is disclosed.

For example, system resources are configured to enable a desired computer network configuration. In some embodiments, expectations that operational state must satisfy are calculated. In some embodiments, at least a portion of the computing infrastructure is represented as a graph representation of computing infrastructure elements including computing infrastructure nodes and computing infrastructure edges. For example, based on received declarative requirements of a desired network configuration, a graph representation of computing infrastructure elements of the desired network configuration is generated and utilized to trigger and build the configuration of the desired network. Examples of components that a node may represent include a server, a switch, a network interface, a virtual network, virtual network endpoints, a rule, a policy, etc. with associated properties and edges represent connections between the nodes and their associated properties. By using the graph representation, the configuration and structure of the computing infrastructure elements can be organized into discreet objects and associated connections that allow easy detection of any changes and relationships affected by the changes.

The graph representation may change as the requirements change and properties associated with graph representation elements are updated. In some embodiments, a change in the graph representation is detected and it is determined whether the change affects a triggering graph representation pattern. For example, processing agents that perform processing are each associated with one or more triggering patterns that trigger processing of the associated agent. In the event the detected change affects the triggering pattern of a processing agent, the change is reported to the agent associated with the triggering pattern. For example, rather than utilizing a single pipelined process to configure and implement the entire set of declarative requirements, many different agents that perform a different assigned portion of the configuration and implementation are utilized in combination. By dividing the processing into portions handled by various different agents, changes to the declarative requirements may be implemented by only invoking the specific agents related to the implementing change rather than exciting an entire monolithic pipelined process to implement a minor change. Each agent is associated with a triggering pattern that identifies a portion of the graph representation of interest that will trigger processing of the agent. If the graph representation includes at least a portion that matches a triggering pattern of an agent (e.g., change to declarative requirements changes the graph representation portion that matches the triggering pattern specified for an agent), a processing function of the matched agent is invoked to allow the processing function to perform processing associated with the matched graph representation portion.

Even after a network has been established, the graph representation can be utilized to analyze the network. For example, network analysis is performed to identify and resolve network problems. In some embodiments, a network administrator specifies network analysis to be performed using a declarative specification of elements of a directed acyclic graph that at least in part represents processing stages in performing a desired network analysis. For example, a declarative specification of an element that executes a dynamically updating query (e.g., triggering pattern) and declarative specifications of a plurality of processing function elements including at least one condition that dynamically process dynamically updated results of the dynamically updating query are received. When the declarative specifications are executed, the use of the query/triggering pattern allows the specification to dynamically adapt to any changes in the network without the need to reprogram code or the specification. Based on a result of the execution of the element and the plurality of processing functions, a notification of a detected anomaly is provided if appropriate.

The graph representation can effectively serve as the single source of truth that can programmatically adapt dynamically to change. The solutions described herein enable one or more of the following:

- Ability to easily extend the schema of the single source of truth to address new business rules and infrastructure capabilities.
- Ability to programmatically decompose the single source of truth into subsets of elements of interest as it grows in size and complexity. This decomposition allows handling of scaling issues—e.g., an architecture that results in every piece of logic reacting to every change in intent will not scale.
- Ability to get notified reactively about the nature of a change (e.g., addition, update, deletion) in the intent. This asynchronous, reactive capability (as opposed to polling) is another key to addressing scaling issues as intent gets more complicated.
- Ability for components to communicate in reaction to a change in intent.
- Ability for network operators to insert their expertise by enabling them to insert their own logic and programmatically reason about the intent, all in the presence of change.
- Ability to add support for new innovative features offered by modern infrastructure platforms.
- Ability to add support for a collection of new telemetry data.
- Ability to launch Intent-Based Analytics to extract knowledge out of raw telemetry data.

At a high level, declarative specification of intent may define the "what" and not the "how." By specifying the intent, it is ensured that expectations of the intent are dynamically met in the presence of any change. Changes can come from either the operator (e.g., business rule change) or the infrastructure (e.g., operational status change). By leveraging the graph representation that includes telemetry data and a triggering pattern that provides updated results, current relevant resources can be dynamically identified even if the network is updated.

In some cases, raw telemetry data may not be sufficient. Because a network link can go "down" after a check, a user may care more about "aggregated" information about recent history rather than instantaneous status. For example, a user may desire a network link to be "up" for 99.9% of the time in the last 1 hr and "down" not more than is during any "down" event. In an example of monitoring network traffic, being overloaded for short periods of time may be okay as long as in aggregation over a specified period of time it is not overloaded.

In one example, suppose some resiliency has been built into an application that can tolerate up to 10% of the links being "unhealthy" or "overloaded" (or both). If this tolerance is violated, it is desirable to have an anomaly, "network has an issue," raised and extract information about the anomaly. This extraction can be implemented by a logical data processing workflow including the following stages:

- Collect statuses from all links carrying "App" traffic.
- Collect traffic utilization info from all links carrying "App" traffic.
- Create recent history time series (denoted as "TS") for the two metrics above.
- Perform the analysis on the time series to calculate time spent in "up"/"down" states and time over the utilization threshold.
- Combine the results to calculate the percentage of "unhealthy" or "overloaded" links.
- Raise an anomaly if more than 10% of links is "unhealthy" or "overloaded" or both.

This logical analytics workflow is effectively a directed acyclic graph of stages where each of the stages is one of (a) accumulation of resources of interest, (b) post-processing of telemetry, or (c) some conditional expression that raises an anomaly. This logical workflow may be implemented by specifying it declaratively (e.g., as a directed graph of stages) and then deploying it with a single POST request including the declarative specification to a network destination, and have the rest performed automatically. The system could then automate the collection of the telemetry, create a data processing pipeline, and provide actionable and context rich data, including, but not limited to raising the anomalies.

Once a problem has been identified (e.g., a number of unhealthy/overloaded links is higher than an application can tolerate), the next level of investigation and troubleshooting can be performed using the results. For example, during a processing stage, the following can be performed:

- Initiate the next level of telemetry to identify which flows are contributing to overloaded links, and try to identify elephant flows.
- Take a snapshot of relevant info (which other applications were running on the servers experiencing problems).
- Log the info above for post mortem analysis.
- Any other processing and analysis.

FIG. 1 is a diagram illustrating an embodiment of a network management environment. Management server 102 is connected to data store 104, network device 106, and network device 108 via network 110. In some embodiments, management server 102 provides a network configuration, monitoring, analysis, troubleshooting, reporting, and management solutions. For example, a user may utilize a solution at least in part provided by management server 102 to set up a network configuration, set up a network device, calculate operational state expectations, monitor performance or operational state of a network, monitor devices of a network, automate tasks, analyze the network, identify issues, troubleshoot problems, and otherwise perform management of devices of the network. In the example shown, management server 102 is utilized to manage at least network device 106 and network device 108. Management server 102 processes/executes agents (e.g., agents performing functions triggered when a portion of a graph representation matches a specified triggering graph representation pattern of a corresponding agent). In some embodiments, management server 102 is specialized custom hardware. In some embodiments, management server 102 is utilized to configure hardware network switches.

In some embodiments, management server 102 facilitates interactions with users to receive and provide desired requirements, specifications, and status updates. For example, a user utilizes a user interface (e.g., web interface, application interface, command line interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements. In some embodiments, management server 102 facilitates analysis and monitoring of the established network. For example, a user provides a specification of components of a workflow (e.g., directed graph workflow) utilized to detect and analyze the network (e.g., analyze performance, detect issues, detect anomaly, etc.). One or more of the components may execute a dynamically updating query (e.g., triggering pattern) of the graph representation, and one or more may execute one or more processing functions including at least one condition that dynamically processes dynamically updated results of the dynamically updating query. The result of the workflow may be used to generate and provide a notification and/or report.

In some embodiments, management server 102 selects processing agents among a plurality of processing agents (e.g., triggered by patterns matching at least a portion of a graph representation) to achieve/complete a desired network requirement and/or network analysis. In some embodiments, agents are accessed by a user via an API (e.g., RESTful API). For example, HTTP methods (e.g., GET, PUT, POST, DELETE, etc.) are utilized to access and manage information via the API. URIs may be utilized to reference state and resources. The declarative requirements may be specified at one or more selected stages/levels among a plurality of stages/levels. In some embodiments, a user specifies one or more constraints (e.g., resources, policies, etc.) of a desired network configuration. In some embodiments, declarative specifications may be provided for one or more elements of an analysis workflow.

In some embodiments, at least a portion of a computing infrastructure to implement the declarative requirements is represented as a graph model/representation of computing infrastructure elements including computing infrastructure nodes and computing infrastructure edges. Examples of data associated with each node of the graph representation include: an identifier, a node type (e.g., server, switch, interface, rule, policy, etc.), a descriptive label (e.g., description of node), a tag, and other properties (e.g., one or more key value pairs). Examples of data associated with each edge of the graph model include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

When a change in the graph representation of computing infrastructure elements is detected, it is determined whether the change affects any triggering graph representation pattern. In the event the change affects the triggering pattern, the change is notified to a processing agent associated with the affected triggering pattern. For example, processing agents are declaratively authored with a set of one or more triggering patterns with associated callback functions. The function of each agent may perform portions of the processing required to generate configurations, deploy the computing infrastructure, and/or perform analysis. For example, the callback functions of various agents perform semantic validation, gather telemetry and execution data, and/or detect anomalies during execution.

The system invokes the callback of an agent anytime the graph representation elements' corresponding triggering pattern of the agent is 'added,' updated,' and/or 'removed' in the associated portion of the graph representation. Thus, each agent is dealing with a subset of a graph model/representation that is relevant to its own objectives and it does not get invoked for changes not relevant to it. Each processing agent focuses only on the parts of the graph representation relevant to the business logic it implements.

Agents need not keep track of all changes to the graph, and only need to re-execute parts of its business logic based on incremental changes in the graph representation portion of interest. By having all processing related to the computing infrastructure implemented as agents of the graph model, the computing infrastructure can be optimized and scaled independent of any complex central processing given the decentralization of the processing agents.

The agents thus coded in the above fashion can incrementally perform their duties. In some embodiments, on startup, the agent evaluates its inputs and outputs and performs initial processing to ensure that inputs and outputs satisfy constraints defined in its business logic. This initial processing may involve processing multiple components of the graph matching the agent's defined triggering patterns. After initial start-up processing, the agent has reached a steady state. In the steady state, an agent may choose to only react to incremental changes to the graph representation that are relevant to its business logic, and performs incremental processing on such changes on top of the steady state.

In some embodiments, a triggering pattern of a processing agent specifies identifiers of graph representation elements that describe at least a portion of a graph representation of interest, and when the triggering pattern matches a portion of the graph representation of interest or no longer matches a previously matched portion of the graph representation, the associated processing function is executed. The invoked function of the agent is provided pointers to the graph representation elements included in the matching portion to allow the invoked function to utilize/modify the associated graph representation elements. In some embodiments, an API is provided to allow modification and use of the graph representation via the API. Execution of the API invokes one or more associated agents to perform the necessary processing required to achieve the desired result of the API invocation. In some embodiments, telemetry data collected during use and execution of the computing infrastructure is mapped to corresponding graph representation elements to provide (e.g., visually) a representation of the telemetry data in the graph representation format.

This paradigm may support any programming language to be used for authoring agents. Code execution is efficient because each piece of code is explicitly associated with only a portion of the graph representation of interest (e.g., small portion) and is only invoked when necessary. The agents are also modular because each agent can have any number of rules, each with a callback function, thereby cleanly separating the code along the boundaries of triggering patterns. It is also scalable because there can be multiple agent instances and multiple systems to dispatch changes to interested agents. This enables a real-time state (e.g., not message) based publish/subscribe communication mechanism implemented on top of graph-based live queries, therefore enabling reacting to incremental graph changes and triggering incremental processing. The asynchronous, reactive capability of the system allows the system to scale. Support for new features offered by modern infrastructure platforms may be easily added (e.g., by adding new agents). In some embodiments, components of the system communicate in reaction to a change in intent.

Management server 102 implements and manages various graph representation processing agents. In some embodiments, agents provide device requirement instructions to and receive status information from various devices of a network being managed. For example, using desired network requirements, agents determine individual device requirements to implement the desired network requirements. In some embodiments, in translating the desired network requirements to the device requirements, a plurality of different successive processing stages/levels may be utilized. The network requirements may be specified for any of the different processing stage levels. For example, network requirements may be specified at the most general and highest level and/or at a lower and more specific stage/level. Each processing stage/level may translate an input declarative requirement to an output declarative requirement that may be utilized as the input declarative requirement for the next subsequent lower processing stage/level. For each processing stage/level, agents merge an input declarative requirement with one or more constraints (e.g., resources available, policies to follow, etc.) to determine the output declarative requirement. By being able to provide desired declarative network requirements of any selected stage/level of a plurality of different processing stages/levels, a user is given the option to tune the level/amount of control desired by the user in configuring the network. For example, a network administrator who desires to quickly set up a default configuration network may specify declarative requirements at the highest stage/level while a network administrator who desires to set up a more customized and specific network may specify declarative requirements at a lower stage/level. In some embodiments, each processing stage/level performs a different function. For example, one processing stage/level determines a logical connectivity in its output declarative requirements, another processing stage/level determines physical connectivity in its output declarative requirements, and another processing stage/level determines a cabling diagram in its output declarative requirements.

In various embodiments, any number of agents may exist. Each agent may perform the same and/or different functions that may be triggered by one or more associated triggering patterns. In some embodiments, an agent coordinates and performs verification that a service is functioning. For example, the desired configuration of a desired network/device service that has been received is utilized to generate one or more device verification models for one or more devices that are utilized. Each device verification model may identify one or more parameters to be verified/detected for the specific device of the verification model. The device verification model is different from device requirements provided to a device to implement the device requirements to configure the device. For example, device requirements are provided to configure/set up a device to provide service whereas the device verification model is provided to verify a status and/or configuration of the service. In some embodiments, in response to the device verification model, a status report is received from the corresponding device that identifies status of the one or more parameters identified in the verification model. An agent may then aggregate and analyze one or more status reports to determine whether the service has been properly implemented/configured and/or is properly functioning.

One or more processing agents executed by network device 106 receive device requirements for network device 106 and one or more processing agents executed by network device 108 receive device requirements for network device 108. Each of these agents may generate and/or implement/execute native hardware instructions implementing device requirements to configure its associated individual network device.

In some embodiments, an agent hosted by network device 106 receives a device verification model for network device 106 and an agent hosted by network device 108 receives a device verification model for network device 108. Each of these agents may determine one or more status parameters to be reported to verify the corresponding device verification model and gather/detect the determined status parameters. Then each agent may provide a status report of the gathered/detected status parameters to another agent that is handling the verification of the service being provided. In some embodiments, each agent reports information about a status, an operation, and/or other information of its associated device(s). A different agent may then collect and process the reported information to report the information and/or to perform a responsive action. For example, when an agent provides a status update that its associated device is overloaded, another agent (e.g., hosted by management server 102) may add a new device to a network to offload processing and/or to move a processing task of the overloaded device to another network device. The collected status information may be provided by an agent as a report and/or a request for action.

Data store 104 stores the data of the graph model. Data store 104 may be included in a networked storage service. In the example shown, agents access data store 104 via network 110. In some embodiments, data store 104 is directly connected to management server 102 via a non-shared connection. In various embodiments, data store 104 is included in any of the components shown in FIG. 1. For example, data store 104 is included in server 102. Data store 104 may include a server that manages data stored in data store 104. In some embodiments, data store 104 stores analysis workflow/component configurations, reports, results, and/or other related data. Examples of data store 104 include a database, a highly available storage, a distributed storage, a cloud storage, a data service, or any other type of data storage.

Network device 106 and network device 108 may be any type of device connected to network 110. Examples of network device 106 and network device 108 include a server, a network switch, a network router, a cache server, a storage device, a hypervisor switch, a virtual router, a load balancer, a firewall, a network fabric device, a virtual network device, a software device, a software component, or any type of computer or networking device that may be physical or virtual. The shown agents are software and/or hardware components included in corresponding components. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly.

Although single instances of many of the components shown in FIG. 1 have been shown to simplify the diagram, additional instances of any of the components shown in FIG. 1 may exist. For example, any number of management servers, storages, and network devices may exist. Management server 102 may be a cluster of servers and storage 104 may be a distributed storage. Any number of agents may exist. A single server/device may include any number of agents. Although the example shown in FIG. 1 shows each agent included/installed in their respective associated system components, the agents may be included in different servers/devices. For example, a single agent may be assigned to processing across a plurality of network devices. Components not shown in FIG. 1 may also exist. In some embodiments, each resource (e.g., each agent, server, and network device) of FIG. 1 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. A plurality of domains may be utilized to manage a single network. The components shown in FIG. 1 may be components of one or more domains. Any of the components shown in FIG. 1 may be a physical or a virtual component.

Figure 2:
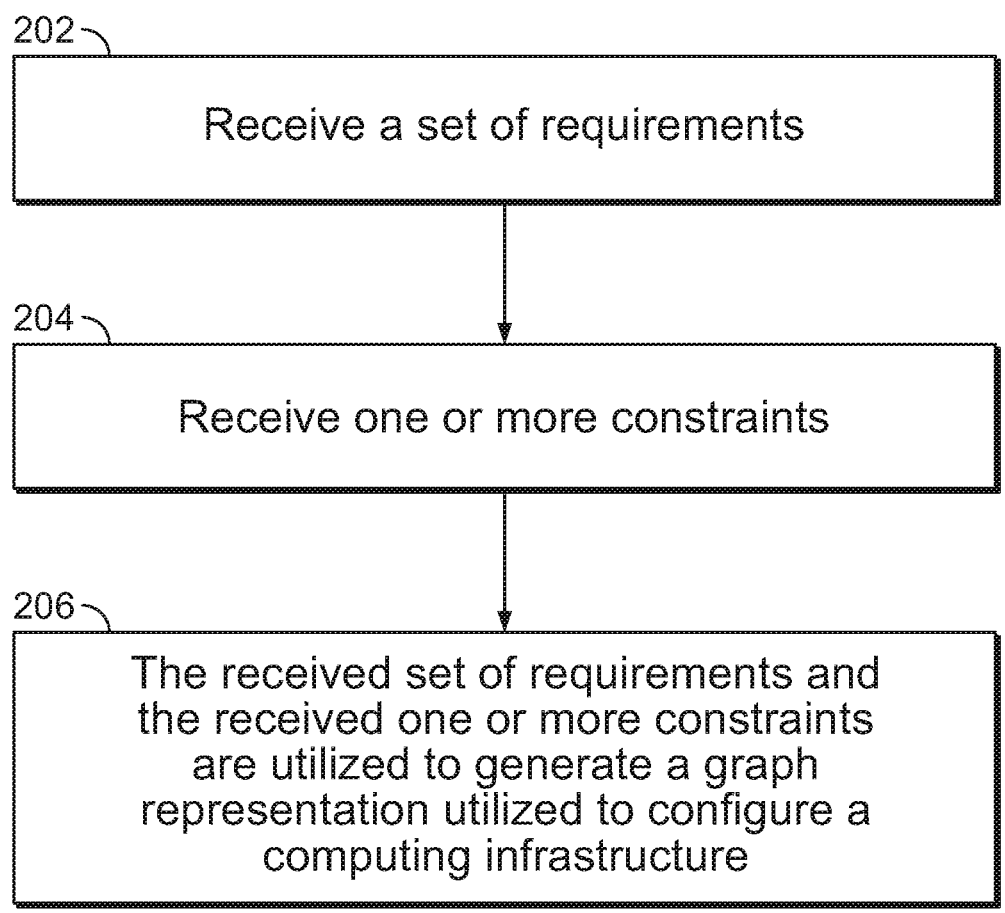
FIG. 2 is a flowchart illustrating an embodiment of a process for publishing network requirements.

FIG. 2 is a flowchart illustrating an embodiment of a process for publishing network requirements. The process of FIG. 2 may be implemented on management server 102 of FIG. 1.

At 202, a set of requirements is received. In some embodiments, the set of requirements includes a specification of an intent that identifies a desired service and an associated reference design to be used to implement the intent. The reference design may identify a standard manner in which component systems and devices are to be organized to provide a service. For example, the reference design identifies a network topology and protocol(s) to be utilized to provide an intended network service. The intent may specify one or more requirements (e.g., declarative network requirements) of the desired service independent of the reference design to be utilized. For example, the intent may specify that 20 servers are to be networked together. The intent is to be implemented using the specified reference design and by changing the specification of the reference design, implementation of the same intent may be changed to utilize the newly specified reference design. By separating the specification of the intent and the reference design, different reference design implementations of the intent may be achieved by simply specifying different reference designs along with the same intent.

In some embodiments, the set of requirements includes a desired configuration, setting, topology, and/or other specifications of a network/service and/or one or more devices connected or able to be connected to the network. In some embodiments, the set of requirements includes a set of declarative requirements. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

In various embodiments, the set of requirements specifies a desired configuration, a desired action, a command, or any other instruction or desired result of one or more devices. One example of the set of network requirements is a set of requirements to establish a connected network of endpoints. For example, endpoints may represent servers, virtual machines, containers, or applications.

For example, the intent is connect 500 servers together and the reference architecture is a mesh network (e.g., Layer 3 Clos Network). In a Clos Network reference architecture, every lower-tier switch (e.g., leaves) is connected to each of the top-tier switches (e.g., spines) in a full-mesh topology. A portion of an example intent that specifies an instruction to establish an L3 Clos network configuration received via a received requirements file is below:

Network architecture=Clos/BGP
# of servers connected=144500
IP address pool=10.0.0.0/20
ASN pool=[1000-1100]

The above requirements specify that a network with 500 network servers should be established and the network architecture topology of the network to be established is a Clos network using Border Gateway Protocol (BGP) with required IP addresses allocated from the range 10.0.0.0 through 10.0.15.255 and ASNs (autonomous system numbers) to be allocated from the range 1000 to 1100.

In some embodiments, the set of requirements is verified for validity and correctness. For example, it is verified that the set of network requirements has been received from an authorized and validated source, the provided requirement specification syntax is correct, valid requirements have been provided, all required parameters for a desired result have been specified, and provided requirements are able to be achieved via available hardware/software resources/devices.

In some embodiments, the set of requirements is a set of declarative requirements that specify a desired configuration, a desired action, a desired mapping result, a command, or any other desired result of one or more declarative requirement processing stages/levels. In some embodiments, the set of requirements may be specified for one or more selected processing stages/levels of successive declarative requirement processing stages/levels. For example, there exists a plurality of processing successive stages/levels that successively require more specific/lower stage/level declarative requirements at each lower stage/level and a user may specify declarative requirements for any one of the stages/levels. In some embodiments, each of the processing stages/levels determines additional aspects of a network to be configured. For example, the output of each processing stage/level includes additional declarative requirements that further define additional aspects of the desired network.

In some embodiments, the set of declarative requirements is specified for a selected processing stage/level. For example, network declarative requirements can be specified for the most general and highest processing stage/level or for a lower and more specific processing stage/level based on the amount of customization and detail desired to be controlled when automatically setting up a network defined by the specified declarative requirements. Each processing stage/level may translate an input requirement to an output requirement that may be utilized as the input requirement for the next processing stage/level, if applicable. For example, by successively converting declarative requirements to a lower stage/level declarative requirement with more specificity at each of the plurality of processing levels/stages, declarative requirements for each specific device to be configured by each processing agent of each specific device are determined.

In some embodiments, rather than requiring a user to specify declarative requirements that conform to a single specificity level, the user is able to specify declarative requirements at any of a plurality of different specificity levels corresponding to the plurality of processing levels/stages. Thus, by being able to provide desired network declarative requirements at any of a plurality of different selected levels, a user is given the option to specify the level/amount of control desired by the user in configuring the network. For example, a network administrator who desires to quickly set up a default configuration network may specify declarative requirements at the highest stage/level (e.g., number of servers to be supported) while a network administrator who desires to set up a more customized and specific network may specify declarative requirements at a lower stage/level (e.g., specific cable connection mapping between network switches).

In some embodiments, each stage processes an input requirement using one or more constraints (e.g., resources available, policies to follow, etc.) to determine the output requirement. In some embodiments, constraints are received at the agent. For example, a user provides the constraints (e.g., resources available, policies to follow, etc.) for storage in a data store for use in one or more processing stages. In some embodiments, if a required declarative requirement has not been specified by a user, a default declarative requirement that is consistent with the specified declarative requirement is utilized. In some embodiments, declarative requirements may be specified for a plurality of different processing stages/levels. For example, a user may specify a high level declarative requirement for the starting processing stage/level but also for another lower processing stage/level to customize a desired aspect. In some embodiments, the declarative requirements are specified in JavaScript Object Notation (i.e., JSON) format.

At 204, one or more constraints are received. In some embodiments, one or more constraints are received from a user via an interface. For example, constraints (e.g., resources available, policies to follow, etc.) are received via a user interface (e.g., web interface, application interface, command line interface, application programming interface (API), RESTful API, configuration file interface, etc.). In some embodiments, the constraints have been automatically determined. For example, the constraints include a list of network switches available and the available resources have been automatically discovered. In some embodiments, the constraints include information identifying resources. For example, identification information about hardware and/or software resources available to be utilized to determine an output declarative requirement is received. In some embodiments, the constraints include specification of one or more policies. For example, a policy specification of how to determine an output requirement is specified by a policy constraint (e.g., how to assign device names, how to assign port mappings, etc.). In some embodiments, the policy constraint may include one or more rules, logic, program code, and/or mappings that at least in part specify how to determine an output from an input declarative requirement. In some embodiments, the constraints may be utilized together with an input declarative requirement by agents to determine an output requirement for at least one processing stage/level of a plurality of processing stages/levels. In some embodiments, the received constraint is associated with at least one specific processing stage/level.

At 206, the received set of requirements and the received one or more constraints are utilized to generate a graph representation utilized to configure a computing infrastructure. In some embodiments, operational state expectations are set for the computing infrastructure and subsequently validated. In some embodiments, the received set of network requirements and the received one or more constraints are utilized to determine a set of output requirements. For example, the received set of input requirements and the received one or more applicable constraints are utilized to determine a lower level of output declarative requirements. In some embodiments, the received set of network requirements is a set of declarative requirements that are to be processed using the one or more constraints to ultimately determine a set of declarative device requirements for one or more devices to be configured to implement a desired network. In some embodiments, a progression of one or more processing stages/levels is achieved via processing agents to determine a final output set of declarative requirements. In some embodiments, a directed graph progression of one or more processing stages/levels is utilized to determine a final output set of declarative requirements.

In one example, the set of requirements to establish the L3 Clos network described previously is utilized to generate a graph representation of the intended network configuration and operational state. Examples of data associated with each node of the graph model include: an identifier, a node type (e.g., server, switch, interface, rule, policy, etc.), a descriptive label (e.g., description of node), a tag, and other properties (e.g., one or more key value pairs). Examples of data associated with each edge of the graph model include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

Various processing agents perform processing to create, implement, verify, and/or modify the graph representation. Each agent is associated with one or more triggering graph representation patterns that will trigger the associated agent and when the graph representation is created or modified due to the initial specification and/or as a result of processing by another agent that modifies the graph representation, it is determined whether the change affects any triggering pattern. In the event the change affects the triggering pattern, the change is notified to a processing agent associated with the affected triggering pattern. For example, processing agents are declaratively authored with a set of one or more rules with associated callbacks. The call back function and business logic function of each agent may perform portions of the processing required to generate configurations and deploy the computing infrastructure. For example, the call back functions of various agents perform semantic validation, gather telemetry and execution data, and/or detect anomalies during execution.

In some embodiments, the agents together in effect analyze the received requirements and determine and identify devices that will be utilized to implement the desired network configuration of the received network requirements. The example L3 Clos network requirements specify the number of spine network switch devices to be 6 and the number of leaf network switch devices to be 32. In total, the agents will determine and identify 38 devices that will need to be configured to implement the desired Clos network. For each of the devices that are to be utilized, the agents determine the individual device requirements in implementing the desired Clos network. For the L3 Clos network example, below is one example of device requirements for one of the 38 different device requirements.

Role=spine
    IP address=10.0.0.3
    ASN=1000
    Neighbors=[(Leaf-1, 10.0.0.7, 1010), (Leaf-2, 10.0.0.15, 1011), . . . (Leaf-32, 10.0.0.176), 1042]
    Status=defined The above device requirements specify that in a Clos network, one network switch device is to be a spine switch with a BGP router identifier defined as IP address 10.0.0.3 and ASN 1000. The leaf switches connected to this spine switch device have been also identified, as well as their IPs and ASNs.

In some embodiments, the processing performed in 206 includes performing processing for one or more processing stages/levels of a plurality of successive declarative requirement processing stages/levels. For example, a processing for one processing stage/level is performed using one or more agents and the output declarative requirement of this process level is used to add/modify data to the graph representation that may trigger other triggering patterns of other agents that in effect serve as an input declarative requirement for the next processing stage, if applicable. In some embodiments, if a declarative requirement is not specified for a particular processing stage/level, the required input declarative requirement for the processing stage/level may be determined automatically based on the received declarative requirements (e.g., to be consistent) and/or a default declarative requirement for the processing stage/level is utilized.

In some embodiments, utilizing the one or more constraints includes utilizing information identifying resources to assign a configuration to/from hardware/software resources. For example, devices to be configured are selected from a list of device resources. In another example, a configuration parameter is selected from a list of available configuration parameter ranges. In some embodiments, utilizing the constraint includes utilizing a specification of one or more policies. For example, a policy specification of how to determine the output requirement from the input requirements is specified by a policy (e.g., how to assign device names, how to assign port mappings, etc.). In some embodiments, a policy includes one or more rules, logic, program code, and/or mappings that at least in part specify how to determine the output declarative requirements from the input declarative requirements.

In some embodiments, the agents utilized to determine the output requirements is configurable/customizable. For example, a user may modify, extend, and/or configure the triggering patterns and/or call back function processing performed by the agents. The agents may be configurable/customizable via an interface such as an API.

In some embodiments, the set of output requirements is verified. In some embodiments, verifying the set of output requirements includes performing one or more tests to determine whether the set of output requirements is valid and matches an intent of input requirement(s). In some embodiments, the test to be performed may depend on the processing stage/level of the set of output requirements, content of the input requirements, content of the output requirements, the agent utilized, one or more constraints utilized, and/or processing performed to determine the output declarative requirements. In some embodiments, the graph representation is verified to ensure that it conforms to a schema that defines allowed elements of the graph representation and how the graph representation is allowed to be structured/connected. For example, an agent that is triggered by a new/modified element or connection of the graph representation executes via its callback function a verification of the new/modified element or connection to ensure that it satisfies the rules of the schema.

Figure 3A:
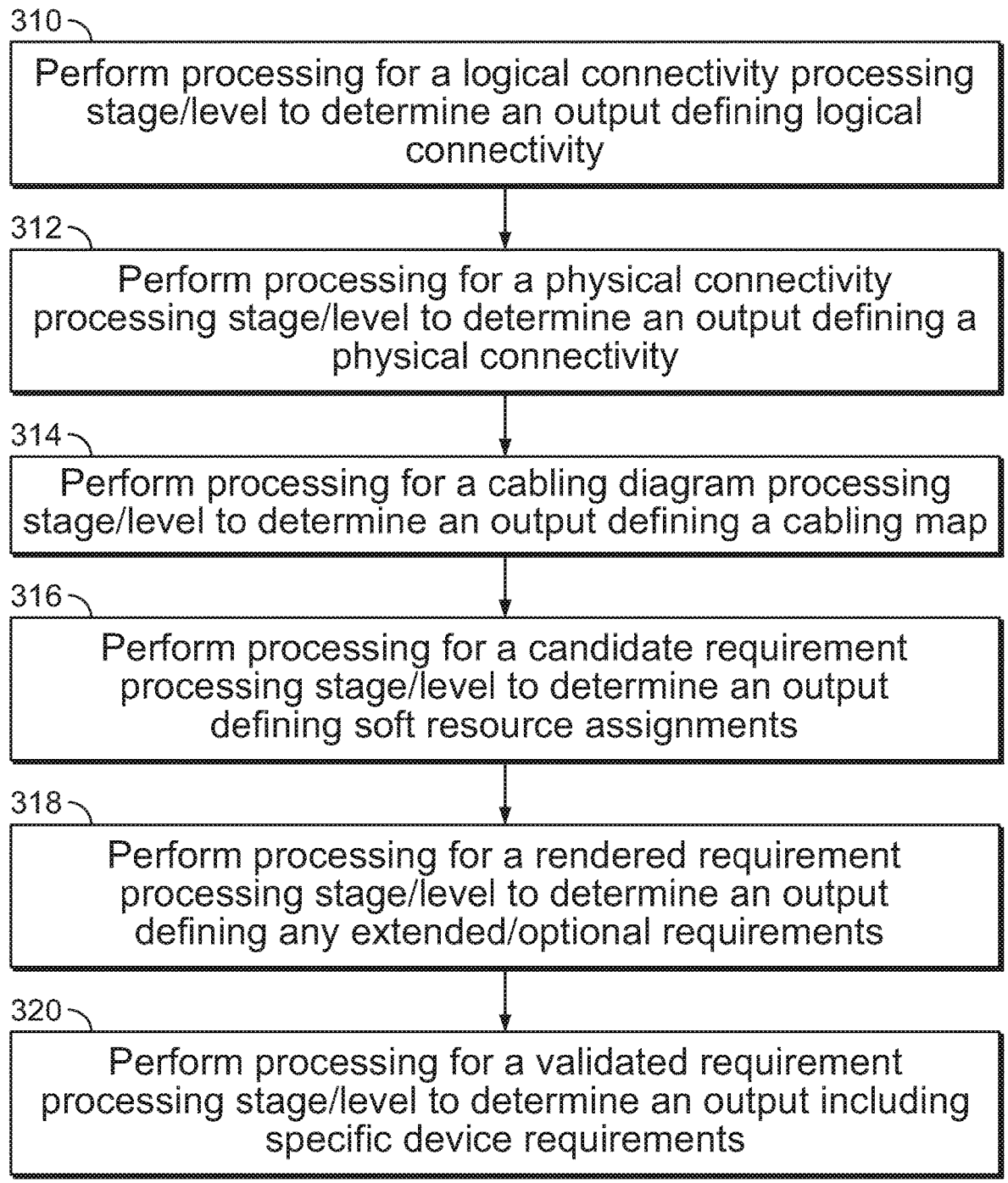
FIG. 3A is a flowchart illustrating an embodiment of an example process for automatically configuring a network using received declarative requirements.

FIG. 3A is a flowchart illustrating an embodiment of an example process for automatically configuring a network using received declarative requirements. The process of FIG. 3A may be implemented on management server 102 of FIG. 1. In some embodiments, the process of FIG. 3A is performed at least in part by one or more different agents. For example, each processing stage/level may be performed by one or more agents. In some embodiments, at least a portion of the process of FIG. 3A is included in 206 of FIG. 2. In some embodiments, the process of FIG. 3A is utilized to automatically configure an L3 Clos network. For example, the process of FIG. 3A is utilized to configure an L3 Clos network for a specific network domain and network point of delivery (i.e., PoD).

In some embodiments, the process of FIG. 3A may be flexibly started/entered at any of the steps of the process depending upon a level of input declarative requirements provided by a user. In some embodiments, after declarative requirements to configure a network are received (e.g., received at 202 of FIG. 2), the processing stage/level of the declarative requirement processing stages/levels corresponding to the received declarative requirements is determined. For example, the received declarative requirements are analyzed to determine the level/type of requirements specified in the received declarative requirements and the processing stage/level of a plurality of processing stages/levels corresponding to the received declarative requirements is identified. In some embodiments, it is determined which step (e.g., which one of steps 310 to 320) of the process of FIG. 3A corresponds to the identified processing stage/level and the process of FIG. 3A is entered/started at the determined step.

At 310, processing for a logical connectivity processing stage/level is performed to determine an output defining logical connectivity. In some embodiments, the logical connectivity is determined at a processing stage/level of a plurality of declarative requirement processing stages/levels. In some embodiments, processing the logical connectivity processing stage/level includes determining output declarative requirements using input declarative requirements. In some embodiments, the input declarative requirements are at least in part received in 202 of FIG. 2. In some embodiments, processing the logical connectivity processing stage/level includes determining output declarative requirements identifying logical connections between leaf network switches and spine network switches to implement input declarative requirements defining a desired L3 Clos network. The input declarative requirements of this processing stage/level may specify one or more of the following: the number of servers to be connected using the L3 Clos network to be established; and the oversubscription ratio (e.g., maximum amount of bandwidth theoretically that could be required for a network switch port vs. actual maximum bandwidth capacity of the network switch port). In some embodiments, constraints are obtained (e.g., obtained in 204 of FIG. 2) and utilized (e.g., utilized in 206 of FIG. 2) to determine the output declarative requirements. For example, profiles (e.g., number of switch-facing ports, number of server-facing ports, etc.) of devices (e.g., network hardware switches) available to be utilized to create the L3 Clos network (e.g., without identifying specific exact machine) are obtained and utilized in selecting the types of devices to be utilized in the output declarative requirement identifying the mesh network. In some embodiments, only devices identified in the constraints may be the switches identified in the output declarative requirements.

In some embodiments, the input declarative requirements of the logical connectivity processing stage/level include one or more declarative requirements provided by a user. For example, the input declarative requirements of the logical connectivity processing stage/level include declarative requirements received in 202 of FIG. 2. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 310 is not performed in the event a user provided a lower/later level/stage of input declarative requirements. For example, the process of FIG. 3A is entered at 312. In some embodiments, the output declarative requirements are verified to ensure performance expectations and/or an intent of the input declarative requirements is met. In some embodiments, the output declarative requirements are verified to verify the number and/or type of network switches utilized and/or devices utilized in the output declarative requirements.

At 312, processing for a physical connectivity processing stage/level is performed to determine an output defining a physical connectivity. In some embodiments, the transformation from a logical connectivity to a physical connectivity involves assigning switch models to the logical devices and performing validation to ensure that the selected switch models have the necessary prerequisites (such as number of ports with specific line rates) to participate in the network configuration. In some embodiments, the physical connectivity processing stage/level is one of a plurality of declarative requirement processing stages/levels. In some embodiments, processing the physical connectivity processing stage/level includes determining output declarative requirements using input declarative requirements. The input declarative requirements of this processing stage/level may be the output declarative requirements of the processing stage/level of 310. In some embodiments, the input declarative requirements are at least in part received in 202 of FIG. 2. In some embodiments, processing the physical connectivity processing stage/level includes determining an output declarative requirement identifying physical connections between specific device types corresponding to logical connections specified in the input declarative requirements. In some embodiments, constraints are obtained (e.g., obtained in 204 of FIG. 2) and utilized (e.g., utilized in 206 of FIG. 2) to determine the output declarative requirements. For example, profiles of specific device types (e.g., specific model/vendor of network hardware switches) available to be utilized to create the L3 Clos network are obtained and utilized in selecting the specific device types to be utilized in the output declarative requirement identifying the L3 Clos mesh network. In some embodiments, specific device types are assigned to logical devices of the input declarative requirements to determine the output declarative requirements for this processing stage.

In some embodiments, the input declarative requirements of the physical connectivity processing stage/level include one or more declarative requirements provided by a user. For example, the input declarative requirements of the physical connectivity processing stage/level include declarative requirements received in 202 of FIG. 2. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 312 is not performed in the event a user provided a lower/later level/stage of input declarative requirements than the level of the physical connectivity processing stage/level. For example, the process of FIG. 3A is entered at 314. In some embodiments, the output declarative requirements are verified to ensure correct route tables are consistent with the input declarative requirements. In some embodiments, the output declarative requirements are verified to verify route tables and/or specific device types included in the output declarative requirements.

At 314, processing for a cabling diagram processing stage/level is performed to determine an output defining a cabling diagram/map. In some embodiments, the cabling diagram processing stage/level is one of a plurality of declarative requirement processing stages/levels. In some embodiments, processing the cabling diagram processing stage/level includes determining output declarative requirements using input declarative requirements. The input declarative requirements of this processing stage/level may be the output declarative requirements of the processing stage/level of 312. In some embodiments, the input declarative requirements are at least in part received in 202 of FIG. 2. In some embodiments, processing the cabling diagram processing stage/level includes determining an output declarative requirement identifying a cabling diagram/map defining connections between ports of L3 Clos switches specified in the input declarative requirements. In some embodiments, constraints are obtained (e.g., obtained in 204 of FIG. 2) and utilized (e.g., utilized in 206 of FIG. 2) to determine the output declarative requirements. For example, constraints of port maps/identifications and port resources of specific devices (e.g., network hardware switches) to be utilized to create the L3 Clos network are obtained and utilized in determining the specific cable connections between ports of the switches of the L3 Clos mesh network. In some embodiments, various roles (e.g., server facing, spine, edge, etc.) are assigned for specific ports in determining the output declarative requirements for this processing stage. In some embodiments, one or more policy/rule/code constraints are utilized in determining the cabling diagram output declarative requirement.

In some embodiments, the input declarative requirements of the cabling diagram processing stage/level include one or more declarative requirements provided by a user. For example, the input declarative requirements of the cabling diagram level include declarative requirements received in 202 of FIG. 2. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 314 is not performed in the event a user provided a lower/later level/stage of input declarative requirements than the level of the cabling diagram processing stage/level. For example, the process of FIG. 3A is entered at 316. In some embodiments, the output declarative requirements are verified to ensure correct cabling and/or port (e.g., port function) mappings.

At 316, processing for a candidate requirement processing stage/level is performed to determine an output defining soft resource assignments. In some embodiments, the candidate requirement processing stage/level is one of a plurality of declarative requirement processing stages/levels. In some embodiments, processing the candidate requirement processing stage/level includes determining output declarative requirements using input declarative requirements. The input declarative requirements of this processing stage/level may be the output declarative requirements of the processing stage/level of 314. In some embodiments, the input declarative requirements are at least in part received in 202 of FIG. 2. In some embodiments, processing the candidate requirement processing stage/level includes determining an output declarative requirement identifying assigned soft resources of connections identified in the input declarative requirements. In some embodiments, constraints are obtained (e.g., obtained in 204 of FIG. 2) and utilized (e.g., utilized in 206 of FIG. 2) to determine the output declarative requirements. For example, constraints including a listing of soft resources (e.g., IP address ranges, autonomous system number (ASN) ranges, etc.) available to be assigned are utilized in assigning soft resources to the network switch connections. In some embodiments, one or more policy/rule/code constraints are utilized in assigning soft resources specified in the output declarative requirements.

In some embodiments, the input declarative requirements of the candidate requirement processing stage/level include one or more declarative requirements provided by a user. For example, the input declarative requirements of the candidate requirement level include declarative requirements received in 202 of FIG. 2. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 316 is not performed in the event a user provided a lower/later level/stage of input declarative requirements than the level of the candidate requirement processing stage/level. For example, the process of FIG. 3A is entered at 318. In some embodiments, the output declarative requirements are verified to ensure correct IP assignments, ASNs, Border Gateway Protocol (BGP) sessions, etc. Although ASN examples have been described, other reference architectures and routing protocols may be utilized in various embodiments. For example, a different routing protocol such as Open Shortest Path First (OSPF) that does not require ASNs may be utilized.

At 318, processing for a rendered requirement processing stage/level is performed to determine an output defining any extended/optional requirements. In some embodiments, the rendered requirement processing stage/level is one of a plurality of declarative requirement processing stages/levels. In some embodiments, processing the rendered requirement processing stage/level includes determining output declarative requirements using input declarative requirements. The input declarative requirements of this processing stage/level may be the output declarative requirements of the processing stage/level of 316. In some embodiments, the input declarative requirements are at least in part received in 202 of FIG. 2. In some embodiments, processing the rendered requirement processing stage/level includes determining an output declarative requirement identifying final configurations including any extended/optional requirements/configurations of the L3 Clos network to be established. In some embodiments, constraints are obtained (e.g., obtained in 204 of FIG. 2) and utilized (e.g., utilized in 206 of FIG. 2) to determine the output declarative requirements. For example, a specification of extended/optional configurations (e.g., configurations to be added/substituted from candidate configurations, parameters, etc.) to be assigned for specific types of devices is utilized in determining extended/optional requirements/configurations of the final requirements specified in the output declarative requirements. In some embodiments, one or more policy/rule/code constraints are utilized in determining the rendered requirement output declarative requirements.

In some embodiments, the input declarative requirements of the rendered requirement processing stage/level include one or more declarative requirements provided by a user. For example, the input declarative requirements of the rendered requirement level include declarative requirements received in 202 of FIG. 2. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 318 is not performed in the event a user provided a lower/later level/stage of input declarative requirements than the level of the rendered requirement processing stage/level. For example, the process of FIG. 3A is entered at 320. In some embodiments, the output declarative requirements are verified to ensure correct final configurations.

In some embodiments, performing processing for the rendered requirement processing stage/level includes identifying and invoking, for each component of the system (e.g., device) to be configured to provide the desired service, a function to generate rendered requirements for the component of the system. In some embodiments, there exists a plurality of different functions that are each specific to a particular reference architecture and system component role within the reference architecture. For example, for each system component to be utilized to provide the intended network service, the rendered requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

At 320, processing for a validated requirement processing stage/level is performed to determine an output including specific device requirements. In some embodiments, the validated requirement processing stage/level is the final processing stage/level of a plurality of declarative requirement processing stages/levels. In some embodiments, processing the validated requirement processing stage/level includes determining output declarative requirements using input declarative requirements. The input declarative requirements of this processing stage/level may be the output declarative requirements of the processing stage/level of 318. In some embodiments, the input declarative requirements are at least in part received in 202 of FIG. 2. In some embodiments, processing the validated requirement processing stage/level includes determining an output declarative requirement assigning final configurations to specific network devices to be configured to implement the L3 Clos network. In some embodiments, constraints are obtained (e.g., obtained in 204 of FIG. 2) and utilized (e.g., utilized in 206 of FIG. 2) to determine the output declarative requirements. For example, constraints including a specification of specific device profiles, availability of specific actual devices, and/or unique identifiers (e.g., serial numbers) of specific devices are received to determine specific device/switch assignments to be specified in the output declarative requirements. In some embodiments, one or more policy/rule/code constraints are utilized in assigning specific devices assigned in the validated requirement output declarative requirements.

In some embodiments, the input declarative requirements of the validated requirement processing stage/level include one or more declarative requirements provided by a user. For example, the input declarative requirements of the rendered requirement level include declarative requirements received in 202 of FIG. 2. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 320 is not performed in the event a user provides final validated requirements identifying specific devices. In some embodiments, the output declarative requirements are verified to ensure correct specific device assignments. In some embodiments, the output declarative requirements are to be pushed to specific agents to configure specific devices/switches. For example, the output declarative requirements of this stage/level are received at 402 of FIG. 4.

In some embodiments, processing in 318 and/or 320 includes identifying and invoking for each system component (e.g., node, device, etc.) to be configured to provide the desired service, a configuration/service rendering program function to generate rendered/output requirements for the component. In some embodiments, there exists a plurality of different functions that are each specific to a particular reference architecture and system component role within the reference architecture. For example, for each system component to be utilized to provide the intended network service, the rendered/output requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

In some embodiments, processing in 318 and/or 320 includes identifying and invoking, for each component of the system (e.g., node, device, etc.) to be configured to provide the desired service, a verification model rendering function to generate a verification model for the component of the system. In some embodiments, there exists a plurality of different functions that are each specific to a particular reference architecture and system component role within the reference architecture to generate a corresponding verification model. For example, for each system component to be utilized to provide the intended network service, the verification model is generated by a particular program function (e.g., verification model rendering function is different from the service rendering function that generates the rendered/output requirements for the system component) that is specific to the reference architecture and role of the system component. The verification model may be utilized by one or more agents to perform a verification of the nodes/components and/or elements of an associated graph representation.

Although a simple linear progression of processing stages/levels has been shown in the example of FIG. 3A to simplify the example, various processing agents may perform the workflow shown in FIG. 3A using various processing orders and paths that may be at least in part parallel.

Figure 3B:
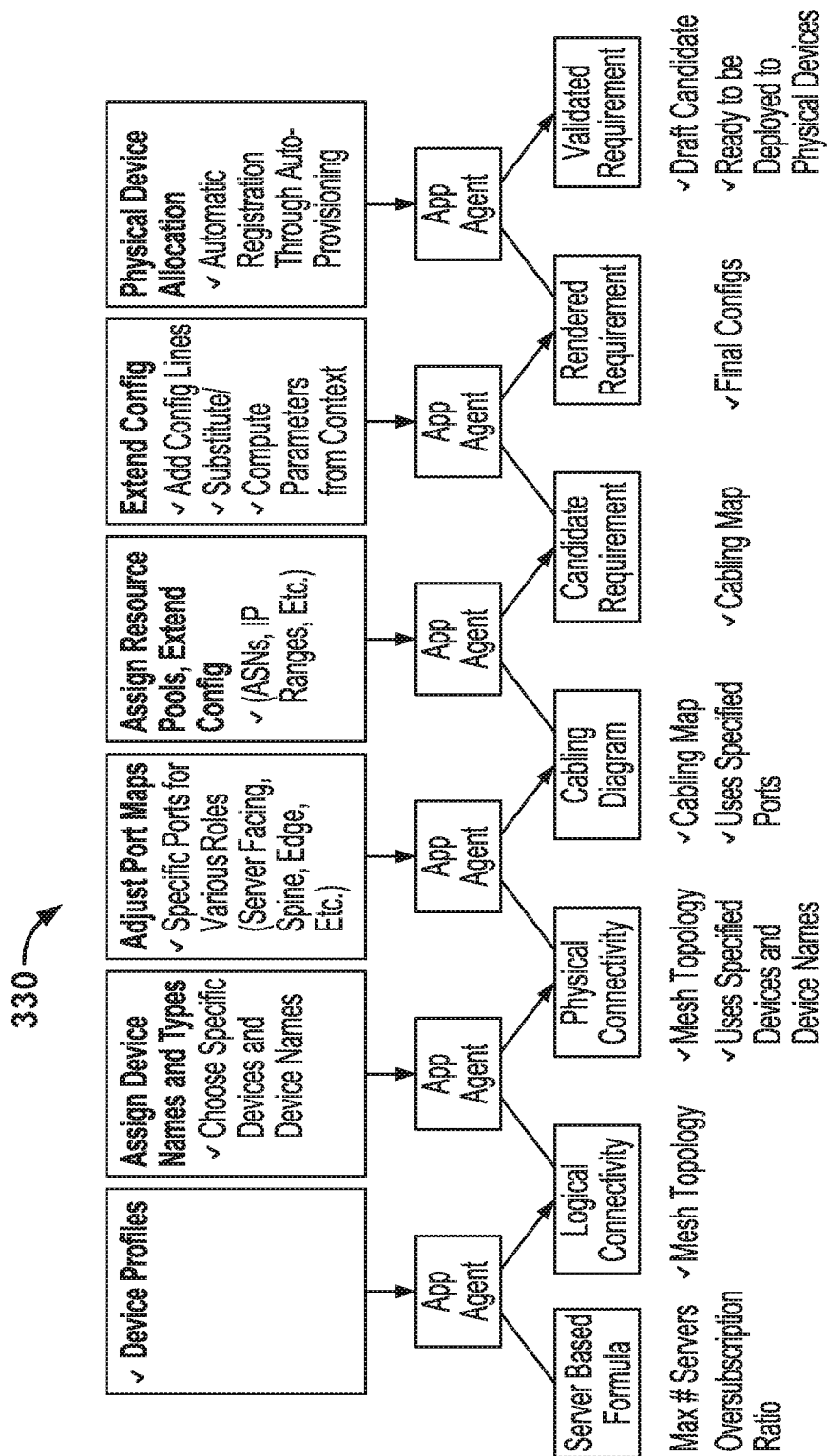
FIG. 3B is a block diagram illustrating processing stages/levels of an example process for automatically configuring an L3 Clos network.

FIG. 3B is a block diagram illustrating processing stages/levels of an example process for automatically configuring an L3 Clos network. The processing shown in FIG. 3B may be implemented on management server 102 of FIG. 1. In some embodiments, the processing shown in FIG. 3B is performed at least in part by one or more different processing agents triggered by at least a portion of an associated graph representation (e.g., graph representation portion matching triggering pattern of the agent). In some embodiments, the processing shown in FIG. 3B is included in 206 of FIG. 2. In some embodiments, FIG. 3B illustrates the process of FIG. 3A. In some embodiments, a user is able to flexibly enter the processing shown in FIG. 3B at any one of the successive processing stages/levels depending on a level of input declarative requirements provided by a user. As shown in diagram 330, output of a previous/higher level stage is utilized by one or more agents of the next lower level as its input declarative requirements. For example, output of a previous level agent updates a portion of a graph representation and the update triggers a pattern of a next level agent. The agents may utilize the output of a previous agent along with predefined input constraints to determine the output to update the graph representation.

Figure 4:
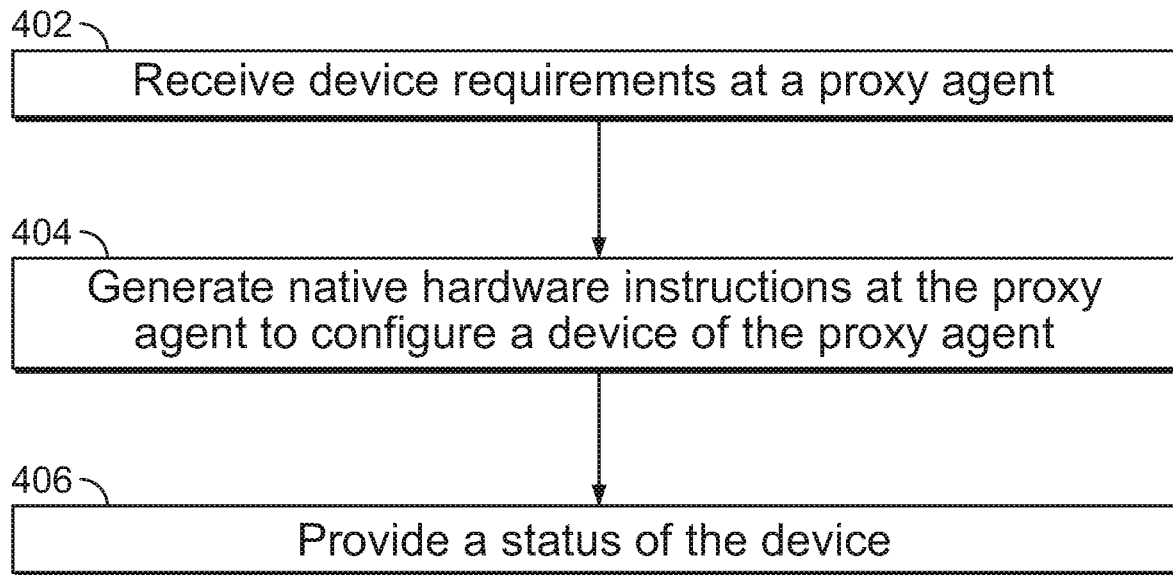
FIG. 4 is a flowchart illustrating an embodiment of a process for generating native hardware instructions.

FIG. 4 is a flowchart illustrating an embodiment of a process for generating native hardware instructions. The process of FIG. 4 may be implemented on network device 106 and/or 108 of FIG. 1. In some embodiments, the process of FIG. 4 is performed by one or more processing agents of network device 106 and/or 108 of FIG. 1.

At 402, device requirements are received at an agent. In some embodiments, the agent is an agent executed by network device 106 and/or 108 of FIG. 1. In some embodiments, the agent is a software and/or hardware component that manages and implements device requirements for an associated/assigned device. In some embodiments, different types/versions of agents exist for different network devices. For example, an agent provides conversion functionality between a device requirement and implementing native instructions specific to a device and the agent that can generate native instructions for a specific device (e.g., specific to vendor, operating system, protocol, version, etc. of the device) is selected for the specific device. Because the agent needs to handle specific native instructions of a device, when a new type or version of a device is added to a network, only a new agent for the new device is required while agents that perform other functions may remain unchanged. For example, an interaction agent that facilitates interactions with users to receive and provide desired requirements, specifications, and status updates or an application agent that implements and manages the desired network requirements, configurations, and status updates across various network devices are not required to change. This may allow simplified administration of various different types of devices of a network. The agent may be installed on a device managed by the agent. In some embodiments, the agent is remote from the managed device. In some embodiments, one agent may manage a plurality of devices. For example, a single agent may manage a plurality of devices of the same type. In some embodiments, the device-specific instructions are generated at a server and provided to the agent that is responsible for applying the provided instructions on the device and reporting the status of applying the provided instructions.

In some embodiments, the received device requirements are the device requirements specified in a graph representation generated in 206 of FIG. 2 for a device. In some embodiments, each different agent is associated with a triggering pattern of the graph model that identifies the device associated with the corresponding agent. In some embodiments, the receiving the device requirements includes receiving an indication that the device requirements have been stored to a data store due to a subscription and the agent requests and obtains the device requirements from the data store. In some embodiments, the receiving the device requirements includes automatically receiving content of device requirements from a data store due to a subscription. In some embodiments, receiving the device requirements includes directly receiving the device requirements from an agent.

At 404, native hardware instructions are generated using the agent to configure a device of the agent. In some embodiments, native hardware instructions are generated in a software library and the generated native hardware instructions are utilized by an agent. In some embodiments, the device requirements received by the agent are processed by the agent to generate the native hardware instructions implementing the received device requirements. For example, received declarative instructions are converted to imperative instructions. In some embodiments, the native hardware instructions are in the native programming/configuration syntax of the device. For example, the native hardware instructions are generated in a format native to a configuration software interface of the device. In some embodiments, the native hardware instructions are in a form that can be directly utilized by the device to configure the device. In some embodiments, the native hardware instructions are executed by the device. For example, the generated native hardware instructions are issued for execution on the device.

In one example, the device requirements to become a spine switch of the L3 Clos network configuration described previously in the specification are received at the agent and the agent analyzes the received device requirements and generates native network switch device instructions to configure the network switch device to become a spine switch of a Clos network with the specified BGP router identifier and specified neighbors.

At 406, a status of the device is provided. In some embodiments, step 406 is optional and may not be performed. In some embodiments, providing the status includes updating data in a corresponding node in a graph representation, an identifier of the status. In some embodiments, providing the status includes providing an indication of status of achieving the received device requirements. For example, a status indication of a stage of the processing of the device requirements is provided.

In some embodiments, the status of the device indicates a status of implementing device requirements on the device. For example, the status may be one of six states. The initial first example state is a "defined" state that indicates that the device requirement has been successfully updated. A second example state is a "staged" state that indicates that resources have been allocated to implement the device requirements. A third example state is a "rendered" state that indicates that native hardware instructions corresponding to the device requirements have been generated. A fourth example state is a "deployed" state that indicates the generated native hardware instructions for execution on the device. A fifth example state is an "operational" state that indicates that the generated native hardware instructions are successfully executed on the device. However, when an error is encountered, a sixth example "error" state may be indicated to indicate that an error has been encountered.

In some embodiments, the status of the device indicates a health state of the device. For example, indication of information such as processing load, CPU utilization, storage utilization, memory utilization, version identification, errors encountered, network status, network bandwidth, network latency, etc. may be provided. In some embodiments, the status of the device indicates a packet drop rate. For example, an indication of a Ternary Content Addressable Memory (i.e., TCAM) utilization of the device is provided by the agent. In another example, an indication is provided when a TCAM table is overflowed.

Figure 5:
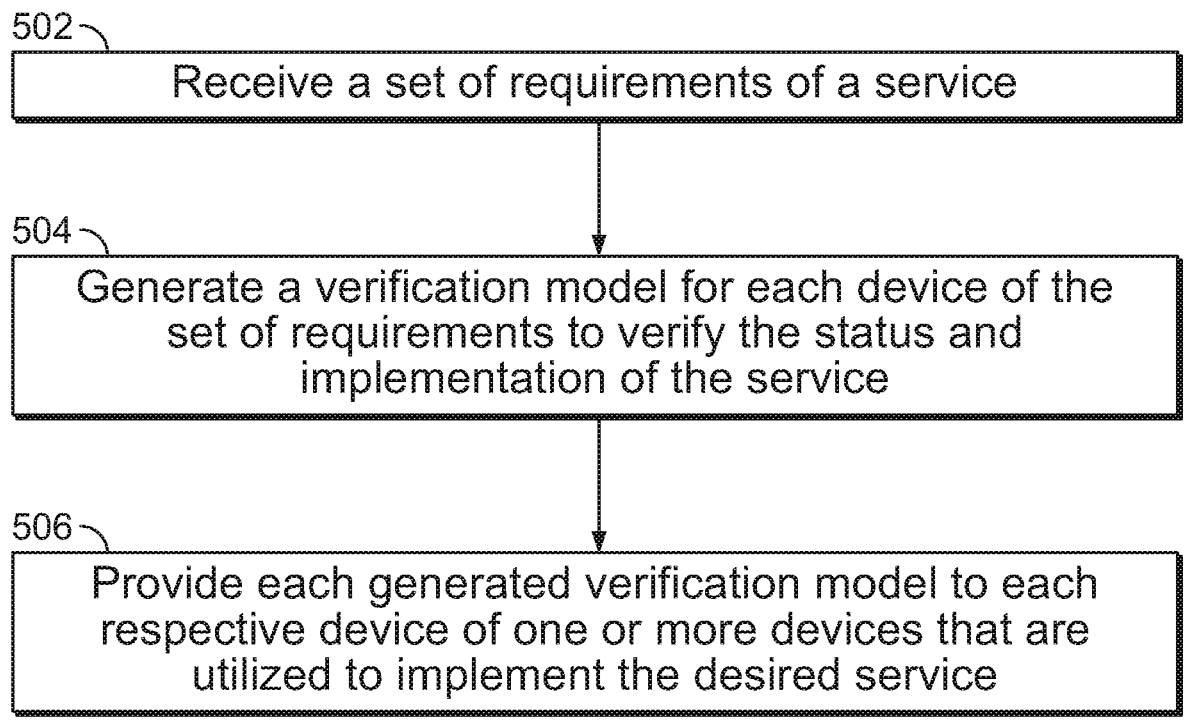
FIG. 5 is a flowchart illustrating an embodiment of a process for generating a verification model.

FIG. 5 is a flowchart illustrating an embodiment of a process for generating a verification model. The process of FIG. 5 may be implemented on management server 102 of FIG. 1.

At 502, a set of requirements of a service is received. In some embodiments, the received set of requirements is the set of network requirements received in 202 of FIG. 2. The service may be a network service and/or other type of service. In some embodiments, the set of requirements includes a set of declarative requirements. For example, declarative requirements express a desired configuration of network components without specifying an exact native device configuration and control flow. By utilizing declarative requirements, what should be accomplished may be specified rather than how it should be accomplished.

At 504, a verification model for each device of the set of requirements is generated to verify the status and implementation of the service. In some embodiments, generating the verification model includes using the received set of requirements along with one or more received constraints associated with the set of requirements to determine a more complete set of requirements to be utilized to generate one or more verification models and one or more device configurations. For example, the output of step 316 of FIG. 3A is utilized to generate one or more verification models for one or more devices to be utilized to implement the service to be verified. In this example, the output of step 316 is utilized to generate both the specific device requirements to be utilized to configure devices to provide the service (e.g., utilized to generate output of steps 318/320 of FIG. 3A) as well as separate verification models for each of the devices to verify that each device is properly functioning and has been properly configured for the set of requirements. In some embodiments, validation test procedures are executed and the results are compared against generated expectations. In some embodiments, the received set of requirements has been processed to include information such as a cabling diagram/map using at least a portion of the process of FIG. 3A. For example, the set of requirements received in 502 has been processed to specify topology of connections between network components.

At 506, each generated verification model is provided to each respective device of one or more devices that are utilized to implement the desired service. In some embodiments, providing the generated verification model includes sending the generated verification model to an agent of the respective device. For example, an agent of management server 102 sends a generated verification model to an agent of network device 106 and sends another generated verification model to proxy an agent of network device 108 of FIG. 1. In some embodiments, providing each generated verification model includes storing each generated verification model in data of nodes of a graph representation stored in a data store (e.g., data store 104 of FIG. 1) to allow one or more agents to read and access its respective verification model from the nodes of the graph representation. Thus, rather than directly communicating the verification models to devices, an agent stores the verification models to the nodes of a graph representation to communicate the information.

Figure 6:
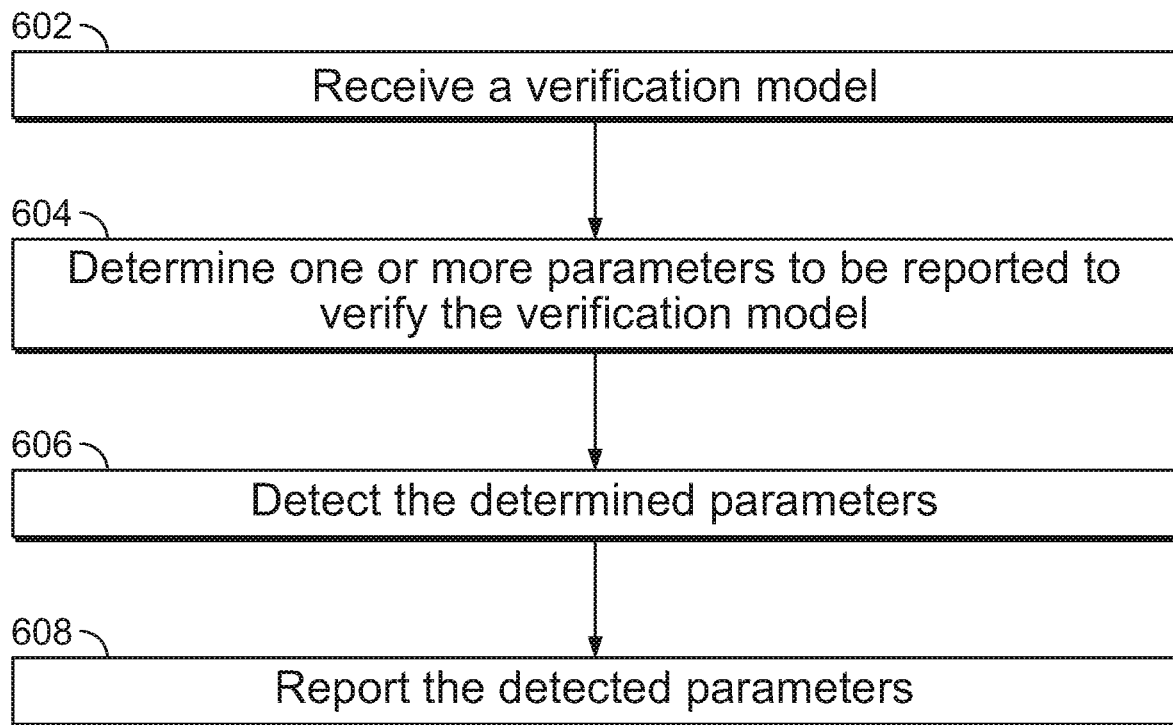
FIG. 6 is a flowchart illustrating an embodiment of a process for detecting status parameters.

FIG. 6 is a flowchart illustrating an embodiment of a process for detecting status parameters. The process of FIG. 6 may be implemented on network device 106 and/or network device 108 of FIG. 1. For example, at least a portion of the process of FIG. 6 is performed by one or more agents of network device 106 and/or network device 108.

At 602, a verification model is received. In some embodiments, an agent receives a verification model. The agent may be an agent configured to handle the verification using the verification model. This agent may be the same or different from the agent utilized in FIG. 4 to configure the device. In some embodiments, the received verification model is the verification model provided in 506 of FIG. 5. For example, an agent of a device being verified obtains the verification model from another agent.

In some embodiments, the received verification model is the verification model provided in 506 of FIG. 5 for a device of the agent. In some embodiments, receiving the verification model includes detecting (e.g., via a matching triggering pattern) that the verification model has been stored in a node of a graph representation. In some embodiments, the verification model includes a list of one or more connections and associated parameters of the connections, and the associated device/agent of the verification model is to report/verify the existence, status, and/or parameters of the listed connections.

In some embodiments, the verification model includes a list of one or more service processes that should be operating on the associated device of the verification model and the associated device/agent is to report/verify the existence, status, and/or parameters of the listed service processes. In some embodiments, the verification model includes a list of one or more IP addresses that should be configured and are operating on the associated device of the verification model and the associated device/agent is to report/verify the existence, status, and/or parameters of the listed IP addresses. In some embodiments, the verification model includes a list of one or more interfaces of the associated device that should be verified and the associated device/agent is to report/verify the existence, status, and/or parameters of the listed interfaces. In some embodiments, the verification model includes a list of one or more connections between interfaces of the associated device and the other connected device that should be configured and operating and the associated device/agent is to report/verify the existence, status, and/or parameters of the listed interface connections. In some embodiments, the verification model includes a list of one or more device identifications of the associated device and the associated device/agent is to report/verify the existence, status, and/or parameters of the listed device identifications.

At 604, one or more parameters to be reported to verify the verification model are determined. In some embodiments, the verification model identifies the one or more parameters. For example, the verification model includes a list of parameters of interest and a status/verification of each of these parameters that are to be reported. Examples of the parameters and status include parameters/status of connection sessions, services, IP addresses, interfaces, interface connections, device configurations, device properties, ports, quality of service metrics, etc. In some embodiments, the verification model identifies a higher conceptual item to be verified rather than specific parameters to be verified and one or more parameters that need to be verified to verify the item are identified. For example, the verification model identifies a connection to be verified and one or more parameters of the connection that need to be verified are identified. In some embodiments, determining the one or more parameters includes generating a list of status parameters that need to be detected from the device based on the verification model. In some embodiments, determining the one or more parameters includes identifying device/operating system specific parameters to be verified to verify an item of the verification model. For example the verification model includes a verification instruction/parameter that is not specific to a particular device type and/or device operating system and an agent translates the verification instruction to a device type/operating system specific instruction/parameter. By allowing the protocol/format/instruction of the verification model to be specific vendor/operating system agnostic, generation of the verification model is simplified. Because each agent may be specific for a particular type of device vendor/operating system, the agent is the most efficient entity to perform the translation between a generic verification item of the verification model to a specific item particular to the device.

At 606, the determined parameters are detected. In some embodiments, parameter detection is performed when the verification model is received. For example, an initial verification is performed to ensure that the service of the verification model has been properly initialized/configured in the graph representation. In some embodiments, parameter detection is performed periodically. For example, verification is performed at a periodic interval on an ongoing basis to ensure proper functioning of the service continually. In some embodiments, parameter detection is performed periodically (e.g., every periodic interval). In some embodiments, parameter detection is performed dynamically. For example, when a potential material change is detected (e.g., in the graph representation), parameter detection is invoked and performed to ensure that the service is properly functioning despite the change. Examples of the change may include a change to one or more of the following: a network connection, a device hardware, a device operating system, an application of the device, an error event, and any status of the device associated with the verification model. In another example, when a device (e.g., switch) operating system is informed about a change (e.g., changes to a route/routing table), the operating system notifies the agent that in response triggers parameter detection.

In some embodiments, detecting the determined parameters includes obtaining a status of a parameter. For example, a status of a network connection is obtained. In another example, it is determined whether an identified process is still functioning. In some embodiments, detecting the determined parameters includes obtaining a value of a parameter. For example, a network identifier (e.g., IP address) of an identified network connection is determined. In some embodiments, detecting the determined parameters includes obtaining information reported to the device from another device. For example, the device performing the verification detection receives status reports/messages from its neighbor devices and information included in these reports/messages is obtained. In some embodiments, detecting the determined parameters includes performing an inquiry to another device connected to the device performing the verification detection. For example, an inquiry message is sent to another device to detect the parameter. In another example, a ping message or a request for information may be sent. In some embodiments, detecting the determined parameters includes obtaining a received message from a connected node/device identifying a parameter/status. For example, a Link Layer Discovery Protocol (LLDP) message is received from a peer switch and this message is reported/analyzed to perform verification.

At 608, the detected parameters are reported. For example, one or more of the detected parameters are detected by one or more agents (e.g., an agent of the management server 102 that is tasked with performing the verification) and stored in one or more nodes of the graph representation. In some embodiments, reporting the detected parameters includes performing an analysis to determine a verification result. For example, one or more detected parameters are detected by agents that are triggered by a change to parameters of a node of the graph model and the call-back function of the agent performs a comparison with one or more expected values of the parameters to determine whether the expected values have been detected and an identification of the result of the comparison is included in a report. In some embodiments, reporting detected parameters includes determining, using a call-back function of an agent triggered by an associated triggering pattern, a summary of one or more of the detected parameters. For example, the detected parameters are categorized, organized, analyzed, tallied, and/or statistically analyzed and one or more results are included in a provided report.

In some embodiments, reporting detected parameters includes storing a report in one or more nodes of the graph representation and/or providing the report to a user. In some embodiments, the report includes a determined aggregated summary/count of one or more parameters. For example, the number of interfaces that are active, inactive, expected, etc. is determined and included in the report in addition to a listing of individual status/parameters (e.g., status identifier, status last update time, etc.) of each interface. In another example, the number of sessions (e.g., BGP sessions) that are active, inactive, expected, etc. is determined and included in the report in addition to a listing of individual status/parameters (e.g., session state, status last update time, source/destination IP address/ASN, etc.) of each session. In some embodiments, the report includes identification of LLDP messages and one or more parameters (e.g., identification of sending/receiving interfaces and devices, message timestamps, etc.) of the messages that have been exchanged between the device and its peer device.

Figure 7:
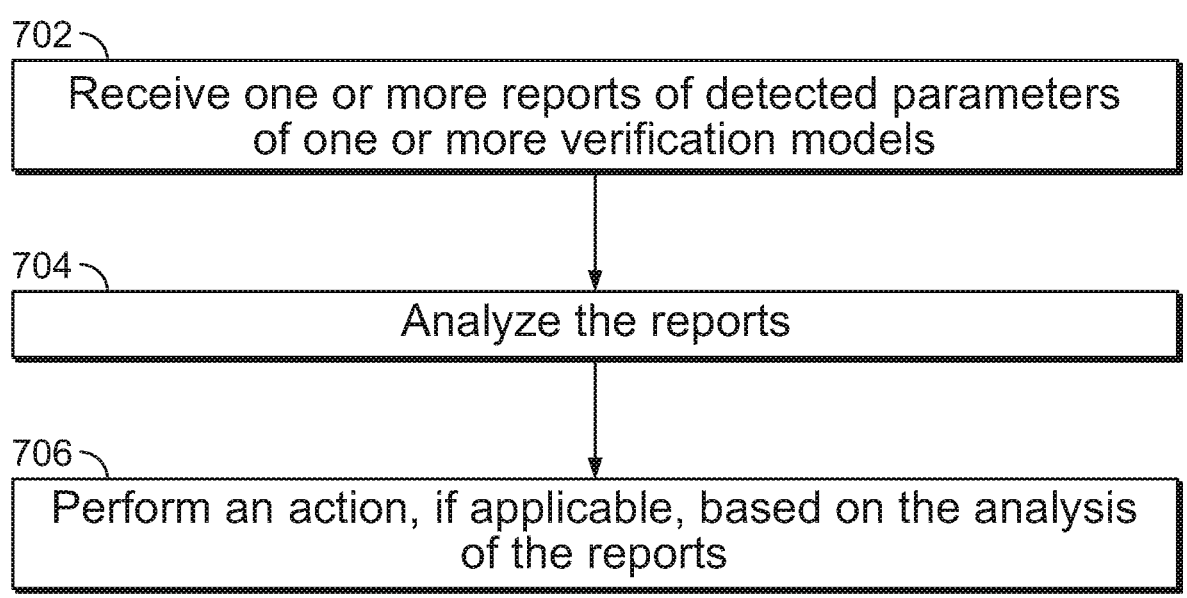
FIG. 7 is a flowchart illustrating an embodiment of a process for analyzing verification reports.

FIG. 7 is a flowchart illustrating an embodiment of a process for analyzing verification reports. The process of FIG. 7 may be implemented on management server 102 of FIG. 1. In some embodiments, at least one or more portions of the process of FIG. 7 are performed by one or more agents.

At 702, one or more reports of detected parameters of one or more verification models are received. In some embodiments, the received reports are reports provided in 608 from one or more different agents at one or more instances. For example, a report is received from each device that has been configured to provide a service being verified. In some embodiments, receiving the reports includes receiving the reports directly from one or more devices. In some embodiments, receiving the reports includes obtaining/receiving the reports from one or more nodes of a graph representation.

At 704, the reports are analyzed. For example, reported data included in the received reports is correlated, compared, and otherwise analyzed to determine whether the service has been properly implemented/configured and/or is properly functioning. In some embodiments, one or more expected values and/or expected status corresponding to a properly functioning state of the service are known and the reports are analyzed to verify that the expected values/status have been detected. In some embodiments, analyzing the reports includes determining whether an error message and/or an indication of an unexpected state has been reported in the reports.

In some embodiments, an expectation associated with the received reports is verified. For example, one or more rules or tests are performed to verify that a value included in the report is as expected, specified, and/or within a range. In some embodiments, the expectation includes one or more tests to be performed to verify that a set of requirements has been successfully achieved. For example, the received set of network requirements in 202 of FIG. 2 specifies one or more tests to be performed to verify that the set of network requirements has been successfully achieved. For example, in the L3 Clos network example discussed throughout the specification, a test to verify that routing tables have been successfully updated and leaf switch nodes are aware of neighbors to reflect the Clos network configuration is received along with the network requirements received in 202 of FIG. 2. This test may be published by one or more agents along with the requirements in 204 of FIG. 2 and one or more agents receive the test as the expectation for verification. In some embodiments, the expectation identifies an acceptable range for a resource utilization indicator. In some embodiments, the expectation identifies an error state of the received status.

In some embodiments, performing the analysis includes determining that throughput and/or quality of service/performance metrics are met. In some embodiments, performing the analysis includes determining whether all required connections between devices to provide the desired service have been properly configured/detected across all reports from the devices providing the service. For example, rather than merely checking each report in isolation, data reported in multiple reports from different devices are correlated to determine that connection data/parameters between two devices that are supported to be connected match to create a valid connection. In some embodiments, performing the analysis includes determining whether one or more parameters/connections that are extraneous (or not supposed to exist to provide the desired service) exist. In some embodiments, performing the analysis includes verifying isolation of domains and/or ensuring that one domain is not over utilizing resources.

At 706, an action, if applicable, is performed based on the analysis of the reports. In some embodiments, no action is performed if the data included in the received reports is as expected, specified, and/or within a range. For example, it is determined that the service is properly functioning and/or has been properly configured. In some embodiments, it is determined that the service is not properly functioning and/or has not been properly configured and a message is provided to indicate this error (e.g., via an agent). In some embodiments, an expectation identifies the responsive action to be performed based on the data of the received reports. In some embodiments, performing the action includes reporting a data of the reports. For example, a result of a test is reported (e.g., report a result of a test to verify that the set of network requirements has been successfully achieved). In some embodiments, reporting the data of the reports includes summarizing data of the reports. Reporting the data of the reports may include providing the report/status to an agent (e.g., the agent may provide the report/status to a user).

In some embodiments, performing the action includes configuring, moving, removing, and/or adding a device of a network and/or a process/program of a device of the network. For example, an agent generates instructions (e.g., publishes device requirements to a system data store for an agent to implement on a device) to automatically mitigate/fix an error indicated by the status (e.g., repair/replace device that has encountered an error). In one example, when an agent provides a status update that its associated device is overloaded, the agent may add a new device to a network to offload processing and/or move a processing task of the overloaded device to another network device. The collected status information may be provided by an agent as a report and/or a request for action.

In some embodiments, performing the action includes allowing an agent that is configured to perform the action to perform the action. For example, an agent that has determined that the received status indicates that the action should be performed informs another agent (e.g., due to detecting of a triggering pattern of the agent) to perform the action.

Figure 8:
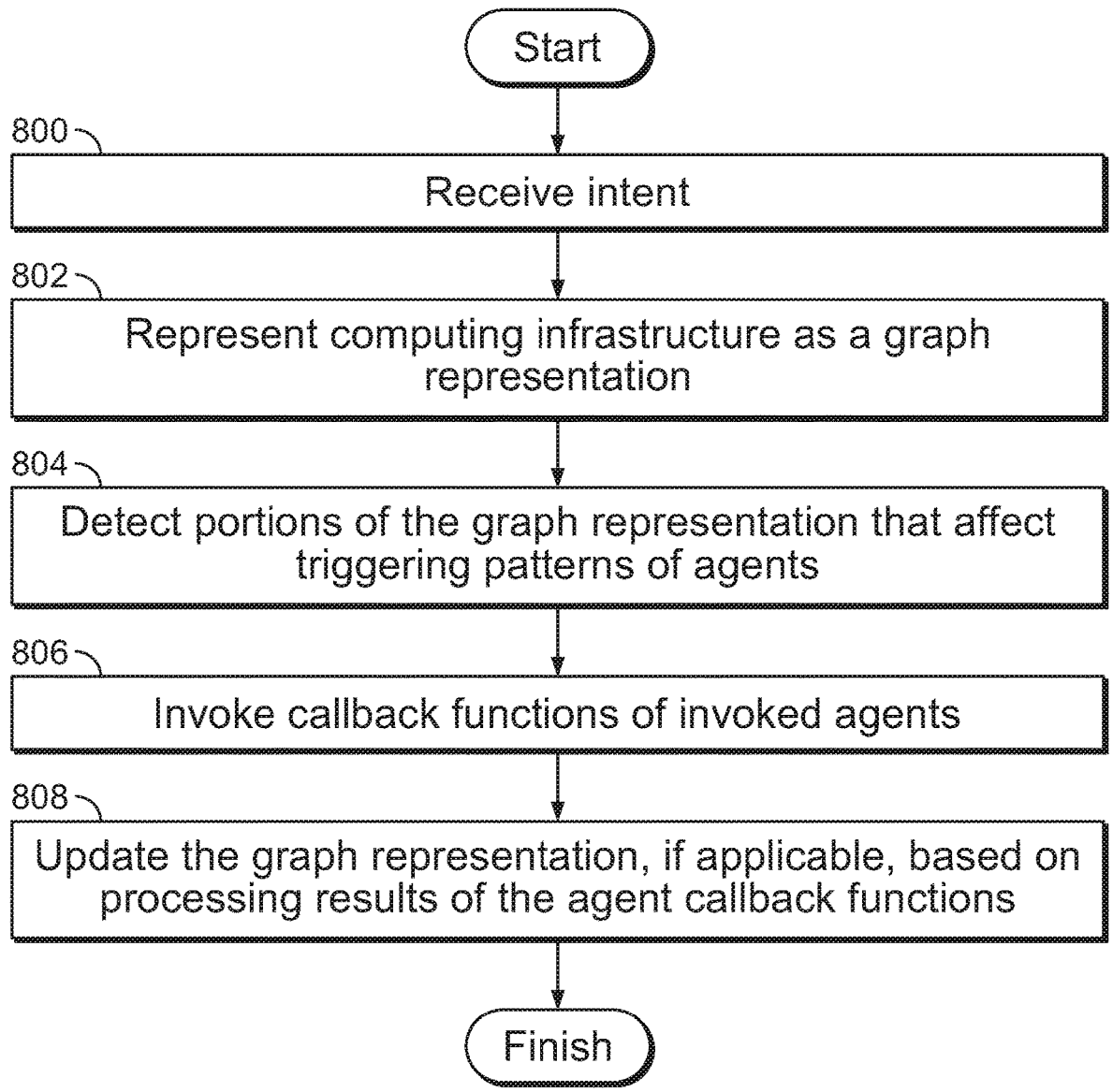
FIG. 8 is a flowchart illustrating an embodiment of a process for automatically configuring a computing infrastructure using a graph model.

FIG. 8 is a flowchart illustrating an embodiment of a process for automatically configuring a computing infrastructure using a graph model. At 800, intent is received. The intent comprises a desired computing infrastructure configuration. The intent may specify a desired service, a reference architecture, and/or a network requirement. In some embodiments, the intent includes the set of requirements received in 202 of FIG. 2. In some embodiments, the intent is a result of a business rule change initiated by a network operator or an operational status change (e.g., a network component is disabled). At 802, computing infrastructure is represented as a graph representation. In some embodiments, business rules and policy elements are also represented in the graph representation. For example, the intent is processed to determine a graph of nodes and edges in implementing the intent. In some embodiments, network devices are represented by nodes whereas relationships between devices are represented by edges. In various embodiments, policies, rules, interfaces, abstract information, or any other appropriate network configuration information is represented in the graph via nodes and edges. In the event the intent indicates a change to an existing network configuration, the intent may be processed and represented as changes to an existing graph model (e.g., by modifying nodes or relationships, deleting nodes or relationships, or adding nodes or relationships). In the event the intent is a first indication of intent for a network, a new graph model may be created based on the intent. In some embodiments, the network is not deployed until sufficient configuration parameters are indicated in the intent. For example, network devices may be configured but not taken online.

At 804, portions of the graph representation that affect triggering patterns of agents are detected. For example, an agent is associated with a specific triggering pattern of interrelated nodes and edges. In some embodiments, a triggering pattern is written in a programming language (e.g., Python, PERL, Java, etc.). A triggering pattern may describe a portion of a graph model. In some embodiments, a triggering pattern defines an attribute of a node or edge (e.g., type, property, or tag). In some embodiments, a triggering pattern defines nodes and edges of specific types and defines how the nodes and edges are interrelated in a specific configuration. Changes to the graph representation may cause a specific pattern to occur in the graph representation that was not previously present, invoking an agent associated with the specific pattern. For example, an agent is invoked based on detection of a specified chain of nodes and relationships of specific types and in a specific order indicated by the pattern. In some embodiments, a triggering pattern associated with an agent matches at least a portion of the graph representation prior to a change to the graph representation and the change to the graph representation modifies (e.g., changes or deletes) the portion of the graph representation that previously matched the triggering pattern. This may result in invocation of the agent in response to detecting that the matching graph representation portion has been modified. For example, the pattern may specify a specific configuration of two specific types of linked nodes and this pattern is detected in the graph representation. A change to a property of any node of the graph representation belonging to a graph portion matching a pattern may invoke the callback function associated with the pattern. In another example, a removal of any element of a portion of the graph representation that used to match a triggering pattern invokes that agent associated with the triggering pattern.

At 806, callback functions of invoked agents are invoked. In some embodiments, an agent is associated with a triggering pattern and a callback function. In the event a triggering pattern of an agent is detected, the agent is invoked and a callback function associated with the agent is invoked. The callback functions execute commands (e.g., to implement at least a portion of the intent). For example, the graph model is updated and network devices are configured by the callback functions triggered by detected changes to the appropriate portions of the graph representation associated with triggering patterns. In some embodiments, using a publish-subscribe model of triggering patterns and callback functions, changes to the network configuration are able to be implemented incrementally.

At 808, the graph representation is updated, if applicable, based on processing results of the agent callback functions. In some embodiments, a callback function causes modifications, additions, or deletions of nodes or edges in the graph representation. The graph representation is updated based on any changes caused by agent callback functions. In some embodiments, the changes to the graph representation caused by the callback function invoke one or more additional callback functions. In some embodiments, the graph representation accurately represents the network configuration at any given time. Changes to the network configuration may be implemented by changing the graph representation, wherein changing the graph representation triggers agents to perform callback functions that execute the changes.

Figure 9:
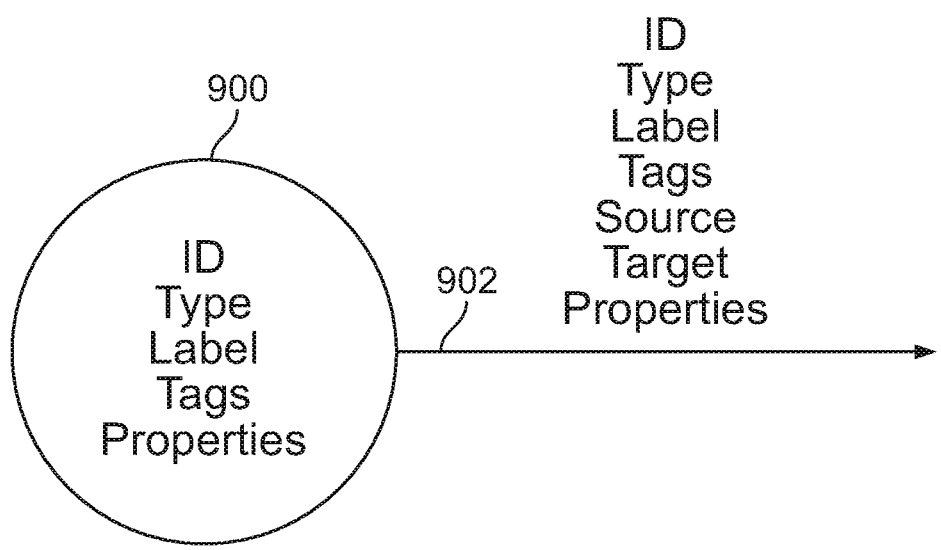
FIG. 9 is a block diagram illustrating an embodiment of a node and an edge that may be included in a graph model.

FIG. 9 is a block diagram illustrating an embodiment of a node and an edge that may be included in a graph model. In some embodiments, a graph model of computing infrastructure is comprised entirely of nodes and edges. All nodes may share the same structure whereas edges share the same structure. In the example shown, node 900 comprises multiple attributes comprising an identifier (ID), a type, a label, tags, and properties. In some embodiments, an ID comprises a unique identifier such as a string or integer. An ID may be used to identify the node in a graph representation and distinguish it from other nodes and edges. In some embodiments, type describes an immutable type that the node is classified as. Type may be a string. In various embodiments, a node is of type server, switch, policy, rule, user, or any abstract concept. In some embodiments, label is a user-friendly caption used to identify the node. Label may be a string. For example, a node may be labeled "server3" in the event it is type server and it is the third server present in the network. In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of nodes of a same type, a group of edges of different types, or any combination of nodes and edges. The tag may be a user-friendly format, such as a string (e.g., "high availability servers"). In some embodiments, properties comprise properties of the node or data associated with the node. In some embodiments, properties comprise a key-value list of any data desired to be associated with the node. For example, properties may comprise information relating to a computer memory size or server speed. Properties may comprise telemetry data.

As shown, edge 902 comprises multiple attributes comprising an ID, a type, a label, tags, a source, a target, and properties. In some embodiments, an edge in a graph representation of a network configuration comprises the same attributes as a node in the graph representation (e.g., ID, type, label, tags, properties) with the addition of a source and target.

In some embodiments, an ID comprises a unique identifier such as a string or integer. An ID may be used to identify the edge in a graph representation and distinguish it from other nodes and edges. In some embodiments, type describes an immutable type that the edge is classified as. Type may be a string. In various embodiments, an edge is of type "link," "interfaces," "hosted on," "applies to," or any abstract concept. In some embodiments, label is a user-friendly caption used to identify the edge. Label may be a string. For example, an edge may be labeled "hosted_on" because the edge is of type "hosted on." In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of edges of a same type, a group of nodes of different types, or any combination of nodes and edges. The tag may be a user-friendly format, such as a string (e.g., "open connections"). In some embodiments, properties comprise properties of the edge or data associated with the edge. In some embodiments, properties comprise a key-value list of any data desired to be associated with the edge. For example, properties may comprise information relating to a computer memory size or server speed. Properties may comprise telemetry data.

In some embodiments, an edge is directional and represents a relationship between two nodes. In some embodiments, source refers to an edge's source/originating node and target refers to an edge's target/destination node. Source and target may consist of strings that refer to nodes in the graph representation. For example, a source and a target of an edge in a graph model comprise IDs of nodes present in the graph model. An edge may represent a one-way relationship between two nodes. Multiple edges may exist between two nodes. For example, a switch node (e.g., node of type "switch") has a relationship of hosting an interface node (directional from switch node to interface node) whereas the interface node has a relationship of "hosted_on" in regards to the switch node (directional from interface node to switch node). As shown, edge 902 is directional, wherein node 900 is its source and its target is a node that it points to. In a network configuration graph representation, each edge may have a source and target node.

In some embodiments, not all attributes (e.g., ID, type, tag, etc.) are required to be specified in creation of a node or edge. Default attributes may be used. For example, given a source and target, an edge type may be inferred. In some embodiments, an edge type is inferred based on node types of the source and target. In some embodiments, an ID and label are randomly generated and/or automatically generated. For example, a label may be incremented to label nodes "server_1," "server_2," and so forth as nodes of type "server" are created. Properties may be determined based on type. A default setting for tags may comprise no tags.

In some embodiments, the graphical representation allows diverse concepts to be represented with flexibility while the structure of graph elements remains static. The graphical representation may allow for a robust and scalable system. For example, a node of type policy may comprise properties describing the policy as using a specific resource pool. An edge of type "policy_applies_to" with the node of type "policy" as a source and a node of type "switch" as a target represents that the policy is implemented on a switch. An agent with a triggering pattern of an edge of type "policy_applies_to" with a source node of type "policy" and a target node of type "switch" may invoke an agent that implements the policy in the event a portion of the graphical representation matches the pattern of edge of type "policy_applies_to" with a source node of type "policy" and a target node of type "switch."

In some embodiments, telemetry data collected during use and execution of the computing infrastructure is mapped to corresponding graph elements to provide (e.g., visually) a representation of the telemetry data in the graph model format. In some embodiments, properties of nodes or edges comprise telemetry data gathered from devices. For example, amount of traffic sent/received, number of errors, fan speed, temperature, number or type of control processes running, or any other appropriate operational data is stored. In some embodiments, the graph model is updated with real-time telemetry data. A user may use a query language (e.g., GraphQL) to access telemetry information or other information in the network configuration graph. In some embodiments, telemetry information is read-only. Telemetry data may be stored in a key-value format wherein a key comprises a parameter (e.g., fan speed) and a value comprises a measured parameter value (e.g., fan speed in rotations per millisecond).

Figure 10A:
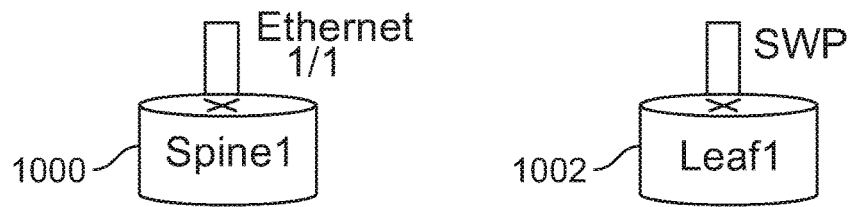
FIG. 10A is a diagram illustrating an embodiment of network devices. Two switches are shown.

FIG. 10A is a diagram illustrating an embodiment of network devices. Two switches are shown. In some embodiments, the two switches may be connected via a cable between the two. In some embodiments, the example shown is a network configuration desired by a user. For example, the intent may specify two switches with a cable connecting the two. As shown, switch 1000 is labeled "spine1" and switch 1002 is labeled "leaf1." As shown, an interface of switch 1000 is labeled "Ethernet 1/1" and an interface of switch 1002 is labeled "SWP."

Figure 10B:
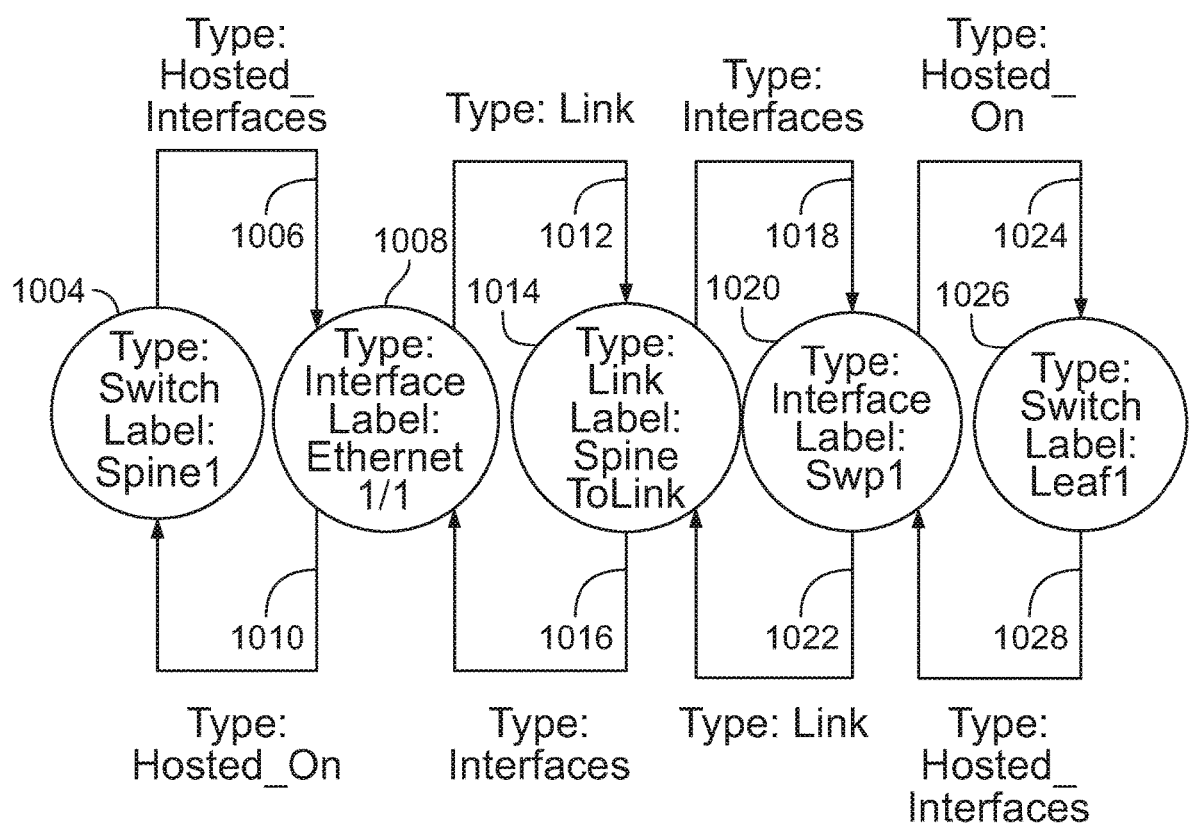
FIG. 10B is a diagram illustrating an embodiment of a portion of a graph model.

FIG. 10B is a diagram illustrating an embodiment of a portion of a graph model. In some embodiments, the graph model portion represents the network device configuration of FIG. 10A. Node 1004 is of type "switch" and label "spine1" and represents switch 1000 of FIG. 10A. Node 1026 is of type "switch" and label "leaf1" and represents switch 1002 of FIG. 10A.

Node 1008 as shown is of type "interface" and label "Ethernet 1/1." Edges 1006 and 1010 describe the relationship between the Ethernet 1/1 node (1008) and spine1 node (1004). Edge 1006 of type "hosted_interfaces" has node 1004 as a source node and node 1008 as a target node. Edge 1010 of type "hosted_on" has node 1008 as a source node and node 1004 as a target node. Node 1020 is of type "interface" and label "swp1." Edges 1024 and 1028 describe the relationship between the leaf1 node (1026) and swp1 node (1020). Edge 1024 of type "hosted_on" has node 1020 as a source node and node 1026 as a target node. Edge 1028 of type "hosted_interfaces" has node 1026 as a source node and node 1020 as a target node.

Node 1014 is of type "link" and label "SpineToLink." The node has relationships with the interfaces of the spine1 node and leaf1 node. Edges 1012 and 1016 describe the relationship between the Ethernet 1/1 node and the spineToLink node. Edge 1012 of type "link" has node 1008 as a source node and node 1014 as a target node. Edge 1016 of type "interfaces" has node 1014 as a source node and node 1008 as a target node. Edges 1018 and 1022 describe the relationship between the swp1 node and the spineToLink node. Edge 1022 of type "link" has node 1020 as a source node and node 1014 as a target node. Edge 1018 of type "interfaces" has node 1014 as a source node and node 1020 as a target node.

Figure 10C:
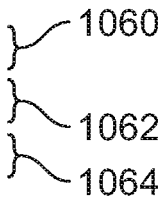
FIG. 10C is an example of a triggering pattern.

FIG. 10C is an example of a triggering pattern. The example shows a triggering pattern expressed in a programming language (e.g., Python). In the example shown, a specific combination and order of specific nodes and edges is defined. Any appropriate programming language may be used to define a triggering pattern. In some embodiments, the example shown describes a part of the graph model portion shown in FIG. 10B. For example, "node (type='switch')" at 1060 describes node 1004 of FIG. 10B, ".out('hostedinterfaces')" at 1062 describes edge 1006 of FIG. 10B, and ".node('interface')" at 1064 describes node 1008 of FIG. 10B.

The triggering pattern as shown defines outgoing relationships from left (node 1004 of FIG. 10B) to right (node 1026 of FIG. 10B) as shown in FIG. 10B, whereas outgoing relationships from right to left as shown in FIG. 10B are not described. For example, the triggering pattern describes only a part of the graph model portion shown in FIG. 10B. In some embodiments, an agent associated with the triggering pattern shown is invoked in the event the graph model portion shown in FIG. 10B is detected in, added to, modified in, or deleted from a graph model.

Figure 10D:
FIG. 10D is an example of a triggering pattern.

FIG. 10D is an example of a triggering pattern. In some embodiments, one or more relevant data structures are specified in the triggering pattern. The one or more relevant data structures may be specified using labels (e.g., label attributes of nodes or edges). In some embodiments, a callback function associated with the triggering pattern is called with a reference to a data structure that is specified in the triggering pattern (e.g., by label). For example, in the event a portion of a network configuration graph matches a triggering pattern of an agent, the agent is provided a path to a specific node or edge. In some embodiments, the specific node or edge is present in the portion of the graph model that matches the triggering pattern. The agent's callback function is called with the reference or path to the specific node or edge, allowing the function to be implemented on the specific node or edge. For example, a callback function comprises a label in the callback function that matches a label in the triggering pattern. The label allows the callback function to execute an action on a node or edge in the graph model, wherein the node or edge in the graph model matches the labeled node or edge in the triggering pattern. The use of a graph model and the label attribute allows a reference to a data structure to be easily passed on. In some embodiments, the callback function is called with multiple references to multiple data structures.

In the example shown, the triggering pattern defines "node(type='switch', label='local_device')" at 1080. In some embodiments, in the event a portion of the graph representation matches the triggering pattern, a node that matches the node defined at 1080 is labeled as "local_device." A callback function associated with an agent that is associated with the triggering function is defined with "local_device" as an input. A reference to the node in the graph representation that matches the node defined at 1080 is passed to the callback function in the event the callback function is invoked.

FIG. 11 shows an example of a model schema (e.g., in Python format) for a graph model. In some embodiments, a graph model of a network has an associated graph model schema. Valid nodes, edges, and relationships between nodes and edges may be defined in the schema. For example, only nodes of a first type may be allowed to share an edge with nodes of a second type. Invalid relationships or nodes may invoke a callback function. For example, the callback function may provide an error to a user or discard the last received change in intent. The schema may be domain-specific; different schemas may exist for different network architectures.

Model schema 1100 is written in Python, but any computer language may be used to implement the model schema. The example shows a graph model schema for typical leaf-spine network architecture. The disclosed system may treat individual design schemas as opaque and operates only at the graph meta model comprising of just nodes and relationships. As shown, model schema 1100 describes allowed data types and values. As shown, 1120, 1122, 1124, and 1126 comprise allowed relationships under the schema. For example, an edge of type "composed_of" must have a source node of type "link" and a target node of type "link." An edge of type "part_of" must have a source node of type "link" and a target node of type "link." An edge of type "hosted_interfaces" must have a source node of type "system" and a target node of type "interface."

Figure 12A:
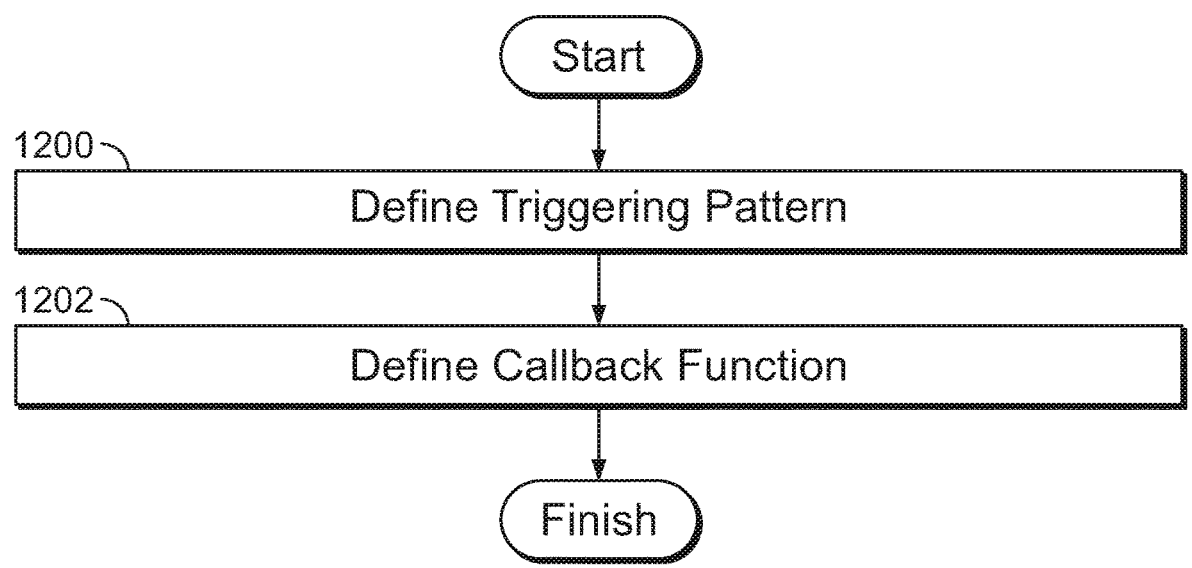
FIG. 12A is a flowchart illustrating an embodiment of an agent creation flow.

FIG. 12A is a flowchart illustrating an embodiment of an agent creation flow. In some embodiments, an agent is created to perform a callback function based on a triggering pattern. Multiple agents, each tracking a different triggering pattern, may work together to configure the network appropriately based on changes in a graph model of computing infrastructure. In some embodiments, a modular method of using separate agents increases efficiency in processing changes in intent.

In some embodiments, a set of pre-created agents is associated with a specific network architecture (e.g., leaf-spine architecture). For example, a set of agents and a schema may be associated with a network with leaf-spine architecture. Each network architecture type may have a corresponding schema and set of agents. In some embodiments, a schema or set of agents is customized for a network. Features may be added to the network configuration system by creating or modifying agents. For example, the system may be easily scaled by writing logic to add agents.

The example shown illustrates a process to create an agent. At 1200, a triggering pattern is defined. The triggering pattern may comprise a portion of a graph model of computing infrastructure. An agent may be triggered by edges, nodes, properties, or any aspect of the network configuration graph. In some embodiments, an agent comprises multiple triggering patterns. In some embodiments, each agent has a single triggering pattern. An agent may inject its triggering pattern as a query to a query engine in the management server (e.g., management server 102 of FIG. 1). At 1202, a callback function is defined. In some embodiments, the callback function defines an action to be taken based on the triggering pattern. For example, an agent may be associated with a triggering pattern of a node of type "link" and with a callback function that assigns an IP address. The agent may cause a callback function to assign an IP address in the event a node of type "link" is added to the graph model. In some embodiments, a callback function takes nodes or edges of the graph model as input. For example, the function is executed based at least in part on a node or edge in a portion of the graph model that matches the triggering pattern.

In some embodiments, an agent comprises a collection of callback functions. For example, different functions may be executed based on whether a portion of a graph model associated with the triggering pattern was added to, modified in, or deleted from the graph model (e.g., whether a portion of the graph model is changed to match the triggering pattern, a property of an edge or node in a portion of the graph model that matches the triggering pattern is changed, or a portion of the graph model matching the triggering pattern is changed to no longer match the triggering pattern). The agent may store multiple functions, wherein the functions are executed based on a type of change in a portion of a graph model associated with the triggering pattern (e.g., "added," "modified," or "deleted"), a type of a changed data structure, a position of a changed data structure, a reference/path to a data structure, or any other factor. For example, a triggering pattern may comprise a node of type device with an edge of type link connecting it to a node of type link. One callback function may define an action to be executed in the event the node of type device changes properties, whereas another callback function defines an action to be executed in the event the node of type link is deleted. In the event a triggering pattern defines a pattern comprising two nodes of a same type, different callback functions may be called based on which node is changed.

Agents may serve various roles in configuring the network. In some embodiments, a resource allocation agent is associated with a triggering pattern that represents one or more network elements that require resources to be allocated when the one or more elements are present in a network. A callback function associated with the resource allocation agent may execute actions that allocate resources required for the one or more network elements. For example, a networking configuration graph may be changed to add a cable to the network. A resource allocation agent associated with a triggering pattern of the specific nodes and edges that are created to add a cable is invoked. A callback function associated with the resource allocation agent is invoked, causing allocation of resources required for the cable.

In some embodiments, an agent is used to determine whether changes in the graph are consistent with a graph schema associated with the graph. A semantic validation agent may determine whether the graph is ready for downstream processing based on the graph schema. In the event the graph does not fulfill rules stated in the graph schema, the changes may be inapplicable. For example, certain device configurations cannot be rendered in the event IP addresses are unassigned or invalid. For example, a semantic validation agent may be associated with a triggering pattern of an edge type "instantiated by." The graph schema may indicate that edges of type "instantiated by" must have a source node of type "virtual_network" and a target node of type "vn_instance." In the event an edge of type "instanti-ated by" is added to the graph model, the semantic validation agent may be triggered. An associated callback function of the semantic validation agent may determine whether a source node of the edge is of type "virtual_network" and whether a target node of the edge is of type "vn_instance." In the event the source and target nodes are not of expected types as defined in the graph schema, an error message may be provided to a user.

In some embodiments, an agent performs checks associated with a triggering pattern once the pattern is detected. For example, an agent performs a check on nodes and edges surrounding a node of type "switch" to ensure required nodes and edges are present. In some embodiments, an agent raises alerts or adjusts the network configuration in the event a network component is operating at undesired ranges. For example, an agent is associated with a triggering pattern of a property of a node of type "server." In the event a change in a property of the node indicates the server is operating at a high temperature, an associated callback function of the telemetry data agent may be invoked to shut down the server associated with the node of type "server."

Figure 12B:
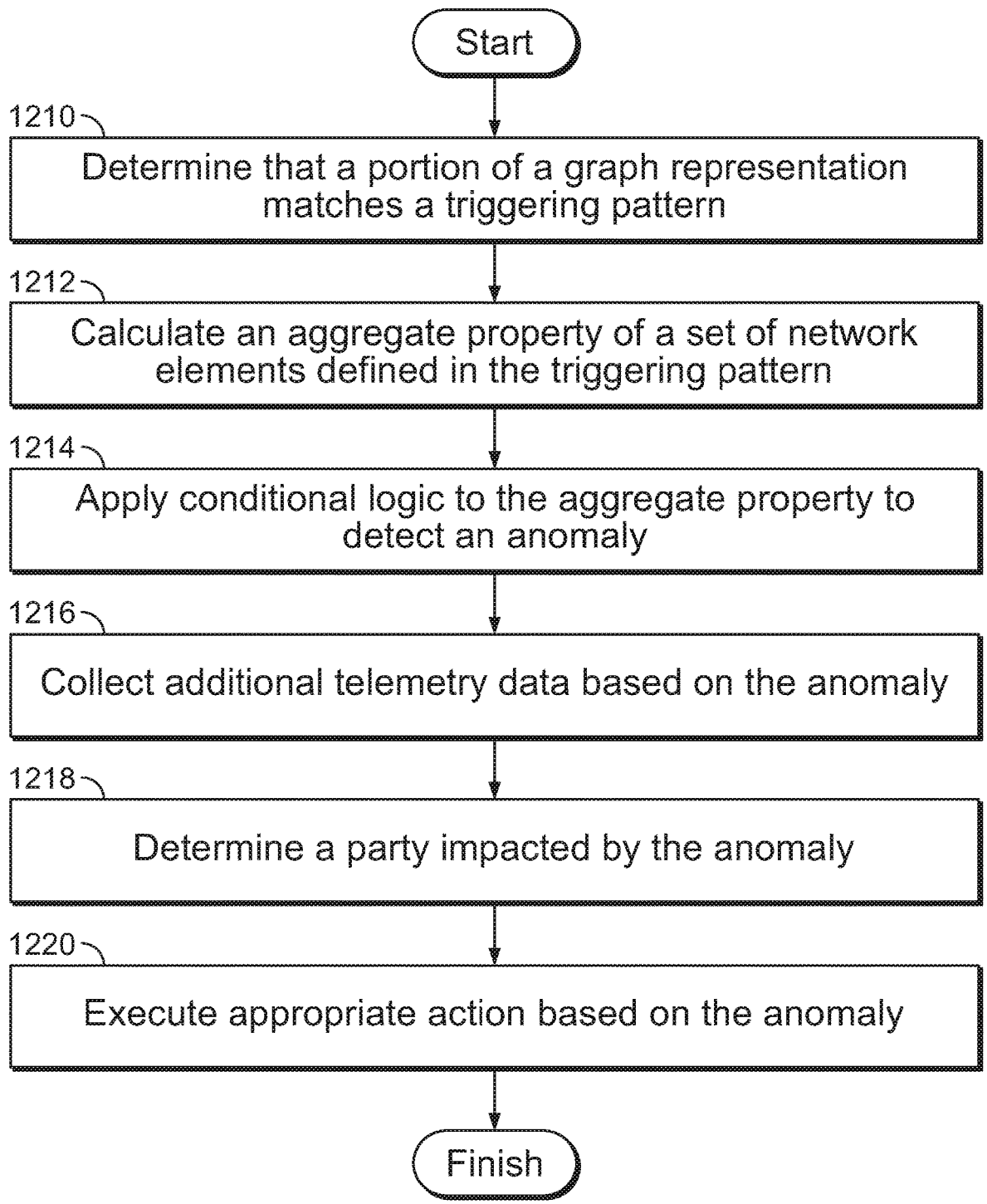
FIG. 12B is a flow diagram illustrating an embodiment of a process to detect and respond to an anomaly.

FIG. 12B is a flow diagram illustrating an embodiment of a process to detect and respond to an anomaly. In some embodiments, the system is used to collect network telemetry data, analyze the network, and respond appropriately in a closed loop. Anomalies, actionable signals, impact analysis, or any other appropriate information may be extracted from raw telemetry data. For example, detecting a service, device, or functional component outage (e.g., via telemetry data) is followed up with a determination of affected consumers or a determination and collection of additional telemetry data collection required. Based on the analysis, appropriate actions to inform impacted parties or remedy the anomaly may be executed.

At 1210, it is determined that a portion of a graph representation matches a triggering pattern. In some embodiments, the triggering pattern defines a set of managed network elements, wherein the managed network elements are monitored for an anomaly. For example, the triggering pattern comprises a set of links that traffic belonging to a specific virtual network of a specific tenant traverses. At 1212, an aggregate property of the set of network elements is calculated. In various embodiments, a standard deviation, minimum, maximum, average, or any appropriate statistic or property is calculated. For example, a recent history time series for the traffic on each link may be created and run through a watermark aggregator to determine the number of links running over 80% utilization for more than 30 seconds. At 1214, conditional logic is applied to the result to detect an anomaly. In some embodiments, pre-defined conditional logic comprises a threshold value (e.g., maximum or minimum) for the aggregate property and an anomaly is detected in the event the calculated aggregate property is abnormal based on the threshold value. For example, an anomaly is generated in the event more than five percent of links in the set of links are running over 80% utilization for more than 30 seconds. At 1216, additional telemetry data is collected based on the anomaly. For example, a complete set of tenants that contribute to traffic on the set of links is determined. At 1218, a party impacted by the anomaly is determined. For example, other virtual networks and tenants that are impacted by the anomaly are identified. At 1220, appropriate action based on the anomaly is executed. For example, traffic is redirected to different links or impacted tenants are asked to decrease utilization of the links.

In some embodiments, the closed-loop telemetry collection, analysis, and response process is automated. In some embodiments, the aggregate property of the set of network elements is continuously monitored based on a time interval (e.g., calculated every five seconds).

In some embodiments, an agent is associated with a triggering pattern that defines a set of managed elements. In some embodiments, the triggering pattern also defines a property of the set of managed elements. For example, "transmitted_bytes," referring to a number of transmitted bytes, is a property of a node of type "link." An agent's associated triggering pattern specifies transmitted bytes of a set of links that traffic belonging to a specific virtual network of a specific tenant traverses by specifying the "transmitted_bytes" property of the set of links. In some embodiments, a function is executed based on a property specified in the triggering pattern to calculate an aggregate property. For example, the agent associated with a triggering pattern that specifies the "transmitted_bytes" property of a set of specified nodes of type "link" is associated with a callback function that determines the percentage of links (out of links represented by the set of specified nodes of type "link") running over 80% utilization for more than 30 seconds.

In some embodiments, the agent is associated with a set of functions that calculate an aggregate property of the managed elements, apply conditional logic to the aggregate property, detect an anomaly, and store the anomaly data (e.g., information relaying an anomaly exists or relaying details on the anomaly, such as percentage of links that are running over 80% utilization for more than 30 seconds) in the graph representation. For example, a callback function may determine whether the percentage of links running over 80% utilization for more than 30 seconds is over a threshold. In the event the percentage is determined to be over the threshold, an anomaly may be determined to exist and the anomaly data stored. For example, anomaly data is stored as a property of a node (e.g., "aggregated_traffic" is a property of a node of type "link" that refers to the percentage of links that are running over 80% utilization for more than 30 seconds). In some embodiments, the anomaly data triggers an additional agent. For example, the additional agent is associated with a triggering pattern that specifies the "aggregated_traffic" property of a set of links that traffic belonging to the specific virtual network of the specific tenant traverses. The additional agent may trigger additional telemetry. For example, a function associated with the additional agent is defined to determine a complete set of tenants that contribute to traffic on the set of links. In some embodiments, a separate agent is associated with a triggering pattern that specifies a set of impacted parties. For example, the triggering pattern specifies tenants that have virtual networks that have endpoints that are hosted on servers that are connected via links that have aggregated_traffic over a threshold value (e.g., nodes of type "tenant" that share an edge with a node of type "virtual_network," wherein the node of type "virtual_network" shares an edge with a node of type "endpoint" that shares an edge of type "hosted_on" with a node of type "server," wherein the node of type "server" shares an edge with a node of type "link," wherein the node of type "link" has a property of "aggregated_traffic.") The separate agent may execute an associated function that alerts the tenants.

In some embodiments, the aggregate property is saved (e.g., as a node property) regardless of whether an anomaly is detected or not. Callback functions that are triggered based on the aggregate property may comprise conditionality (e.g., the function will not be called in the event the aggregate property value is not determined to be an anomaly).

In some embodiments, 1212, 1214, 1216, 1218, and 1220 are represented in a graph representation. In some embodiments, a workflow of processing stages (e.g., the steps described at 1212, 1214, 1216, 1218, and 1220) is represented in a directed acyclic graph. In some embodiments, each step is represented as a node. The order of the flow as shown is represented via directional edges. For example, a node of type "process_step" comprises information on calculating an aggregate property of network elements and has a directional edge that points to another node of type "process_step" comprising information on applying conditional logic to the aggregate property, causing the aggregate property calculation step to be performed before the conditional logic step. In some embodiments, the workflow of processing stages (e.g., the steps described at 1212, 1214, 1216, 1218, and 1220) is represented as a portion of a graph representation and is part of a graph representation of computing infrastructure. In some embodiments, the sequence of steps is represented in a separate graph.

Agents may subscribe to graph elements representing stages and react to them by executing processing that is required. In some embodiments, an agent is associated with a triggering pattern of graph elements representing a processing stage or step. In some embodiments, the agent has an associated callback function that executes processing that is defined or parametrized by the graph elements. For example, in the event of a request for data analytics on a specified node of type "link," a series of nodes of type "process_step" may be created that stem from the specified node of type "link." The series of nodes may comprise a single chain. For example, an edge that points from the specified node of type "link" is created and joins the specified node of type "link" with a subsequently newly created node of type "process_step," wherein the newly created node of type "process_step" has a node property that describes a formula to calculate an aggregate property. Following creation of the node of type "process_step" with a node property that describes a formula to calculate an aggregate property, a new edge that points from the aggregate property calculation node is created and joins the aggregate property calculation node with a subsequently created node of type "process_step" which has a node property that comprises a threshold value. In some embodiments, creation of the nodes of type "process_step" cause agents that are associated with triggering patterns that specify the nodes of type "process_step" to be triggered. The creation of the nodes of type "process_step" may occur one at a time, triggering the agents in a desired order.

For example, an agent with an associated triggering pattern of a property of "transmitted_bytes" of the specified node of type "link" may be associated with a callback function that determines whether the specified node of type "link" has an outgoing edge that points to a node of type "process_step" and in the event the specified node of type "link" does share an outgoing edge with a node of type "process_step," saves the "transmitted_bytes" property value of the node of type "link" to a property of the node of type "process_step." The "transmitted_bytes" property value may be saved under a property of "base_calculation_value" of the node of type "process_step." In some embodiments, calculation of the aggregate property is parametrized by the triggering pattern (e.g., a property conveying transmitted_bytes is defined in the triggering pattern and is used as input to calculation of percentage of over-utilized links).

For example, an agent associated with a triggering pattern that specifies the "base_calculation_value" property of the node of type "process_step" may cause a callback function associated with the agent to execute a calculation of an aggregate property based on the value saved under the "base_calculation_value" property and a formula saved under a "formula" property of the node of type "process_step." In some embodiments, the aggregate property is saved as a property of the node (e.g., as an "aggregate_property" property value). In some embodiments, values are passed between processing stages by saving them as node or edge properties.

The creation of the second node of type "process_step" that has a node property that specifies a threshold value may trigger an agent that is associated with a triggering pattern that specifies a property of "threshold value" of the node. A callback function associated with the agent may determine whether an anomaly is present based on the "threshold value" property value of the second node of type "process_step" and the "aggregate_property" property value of the first node of type "process_step." In the event an anomaly is detected, an "anomaly" property of the second node of type "process_step" may be updated to indicate that an anomaly is present. In various embodiments, processing steps are executed by various configurations of graphical elements (e.g., nodes, properties, and edges) and agents.

Figure 13A:
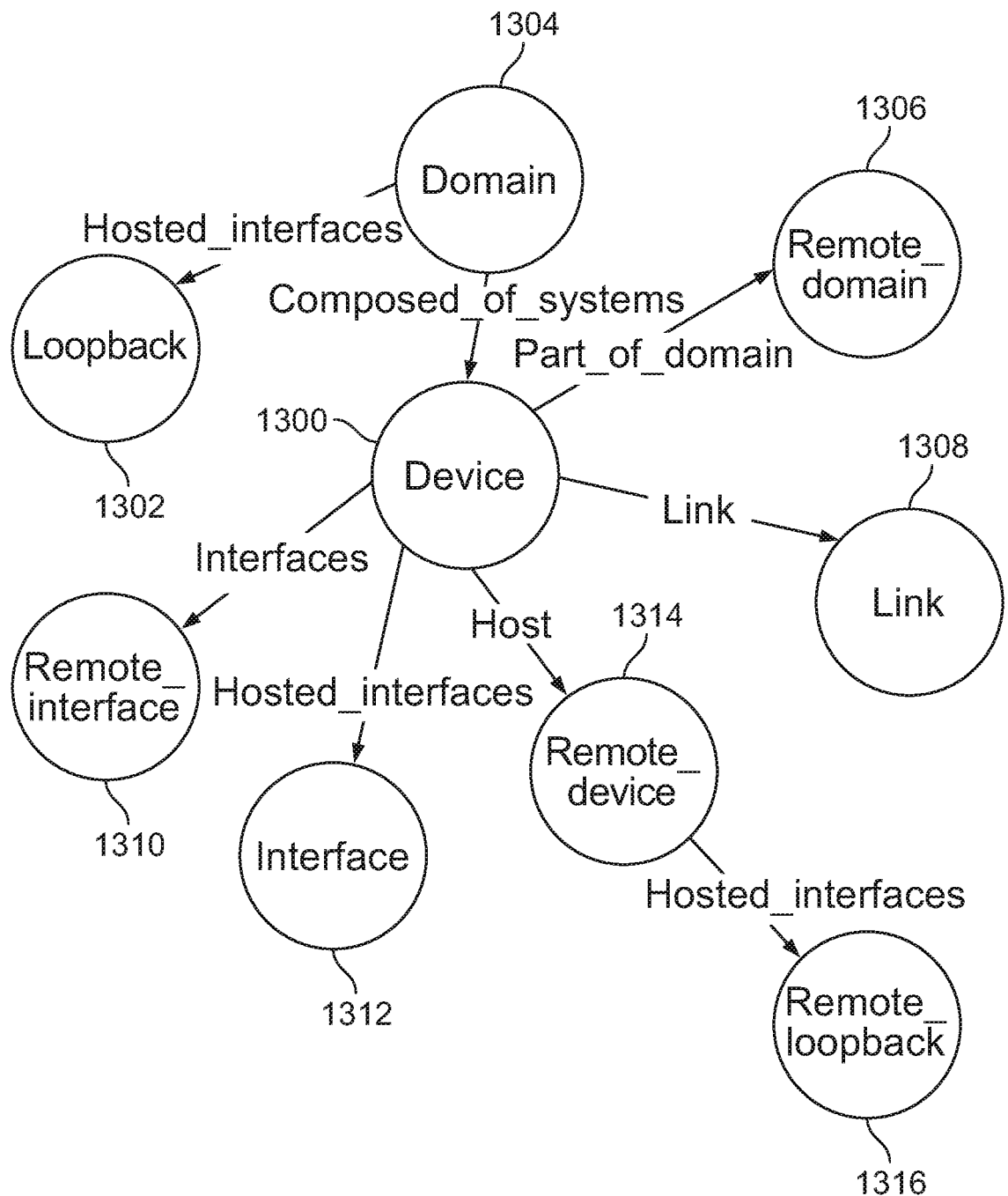
FIG. 13A is a diagram illustrating an embodiment of a portion of a graph model comprising branches.

FIG. 13A is a diagram illustrating an embodiment of a portion of a graph model comprising branches. The graph model portion illustrates a tree pattern of network devices and components. In the example, labels of nodes are shown and types of edges are shown. Domain node (e.g., node with label "domain") 1304 has outgoing edges (e.g., node 1304 is the source node of the edges) of types "hosted_interfaces" and "composed_of_systems" with loopback node 1302 and device node 1300 respectively. Device node 1300 has outgoing relationships of types "interfaces" with remote_interfaces node 1310, "hosted_interfaces" with interface node 1312, "host" with remote_device node 1314, "link" with link node 1308, and "part_of_domain" with remote_domain node 1306. Remote_device node 1314 has an outgoing edge of type "hosted_interfaces" with remote_loopback node 1316.

FIG. 13B shows an example of an implementation of an agent. In some embodiments, FIG. 13B implements an agent that is associated with a triggering pattern that matches the graph model portion shown in FIG. 13A. For example, in the event the graph model portion shown in FIG. 13A is detected in the graph model, the callback function shown will be invoked. Although the following example utilizes the Python programming language, other programming languages may be utilized in various other embodiments. In the example shown, a triggering pattern and a callback function are defined.

At 1356, the triggering pattern is defined. In the example shown, nodes labeled "domain" and "device" are defined at 1350 and 1353 respectively. The nodes correspond with nodes 1304 and 1300 as shown in FIG. 13A. In the example shown, nodes that have no outgoing edges are not separately declared outside of being part of the definition of another node. For example, "node('domain', name='domain', domain type='autonomous_')" at 1350 declares domain node 1304 of FIG. 13A, ".out('composed_of_systems')" at 1351 defines outgoing edge of type "composed_of_systems" from domain node 1304 of FIG. 13A, and ".node('system', name='device')" at 1352 defines node 1300 of FIG. 13A as being the target node of the edge of type "composed_of_systems." In the example shown, labels are used to refer back to a defined data structure. For example, "node (name='device')" at 1353 is used to refer to the node first defined in the line reading ".node('system', name='device')" at 1352.

The code declares a node, its outgoing edges, and the target nodes of the outgoing edges. For example, the second line in the example shown declares a node of type "domain" and name (e.g., label) "domain." Lines beginning with "node" declare a node. Lines beginning with ".out," ".node," and ".where" follow a line beginning with "node" and refer to the node declared in the line beginning with "node." Lines beginning with ".out" indicate an outgoing edge from the node. Lines beginning with ".node" follow lines beginning with ".out" and indicate a target node of the edge defined in the line beginning with ".out." Lines beginning with ".where" describe details referring to nodes.

At 1370, a callback function is defined. In some embodiments, the callback function is executed in the event a portion of a graph model matching the triggering pattern defined at 1356 is added to, modified in, or deleted from the graph model.

Figure 14A:
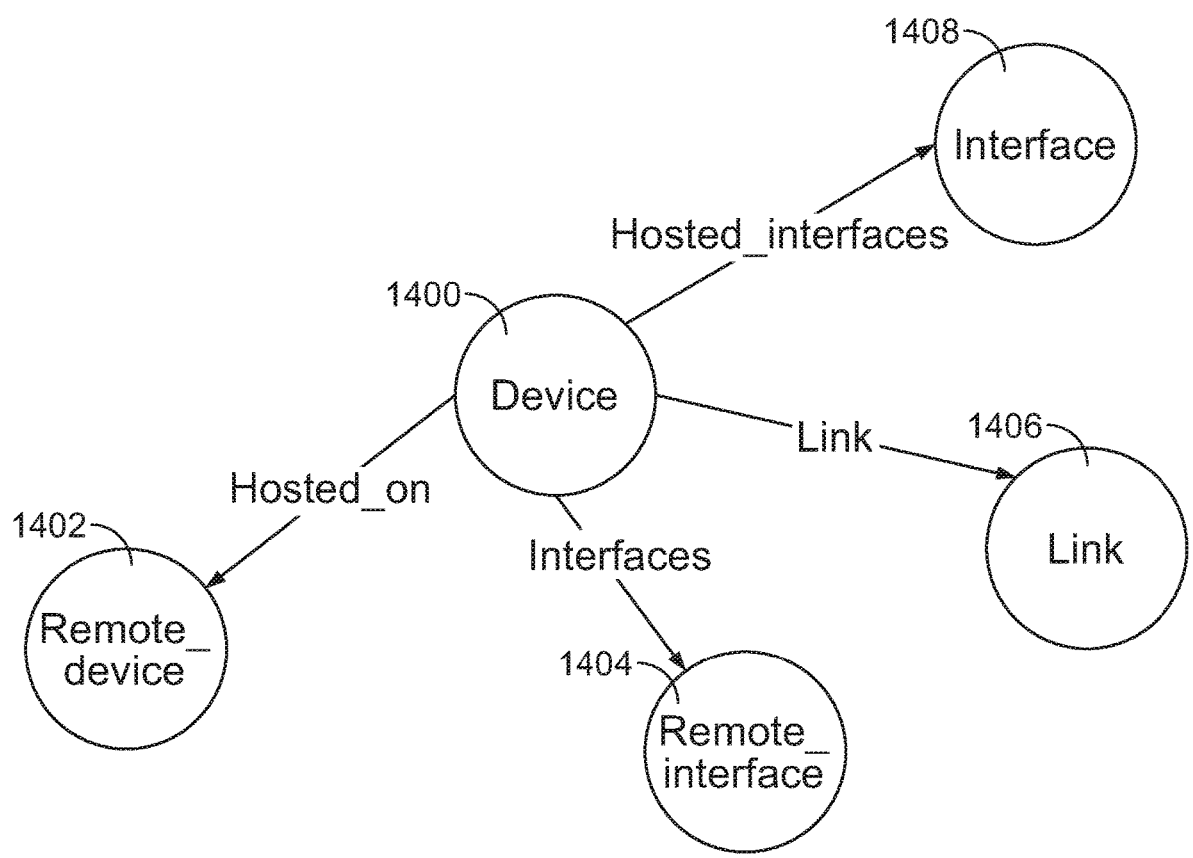
FIG. 14A is a diagram illustrating an embodiment of a portion of a graph model.

FIG. 14A is a diagram illustrating an embodiment of a portion of a graph model. Device node (e.g., node with label "device") 1400 has outgoing edges of types "hosted_on" with remote_device node 1402, "interfaces" with remote interface node 1404, "link" with link node 1406, and "hosted_interfaces" with interface node 1408.

Figure 14B:
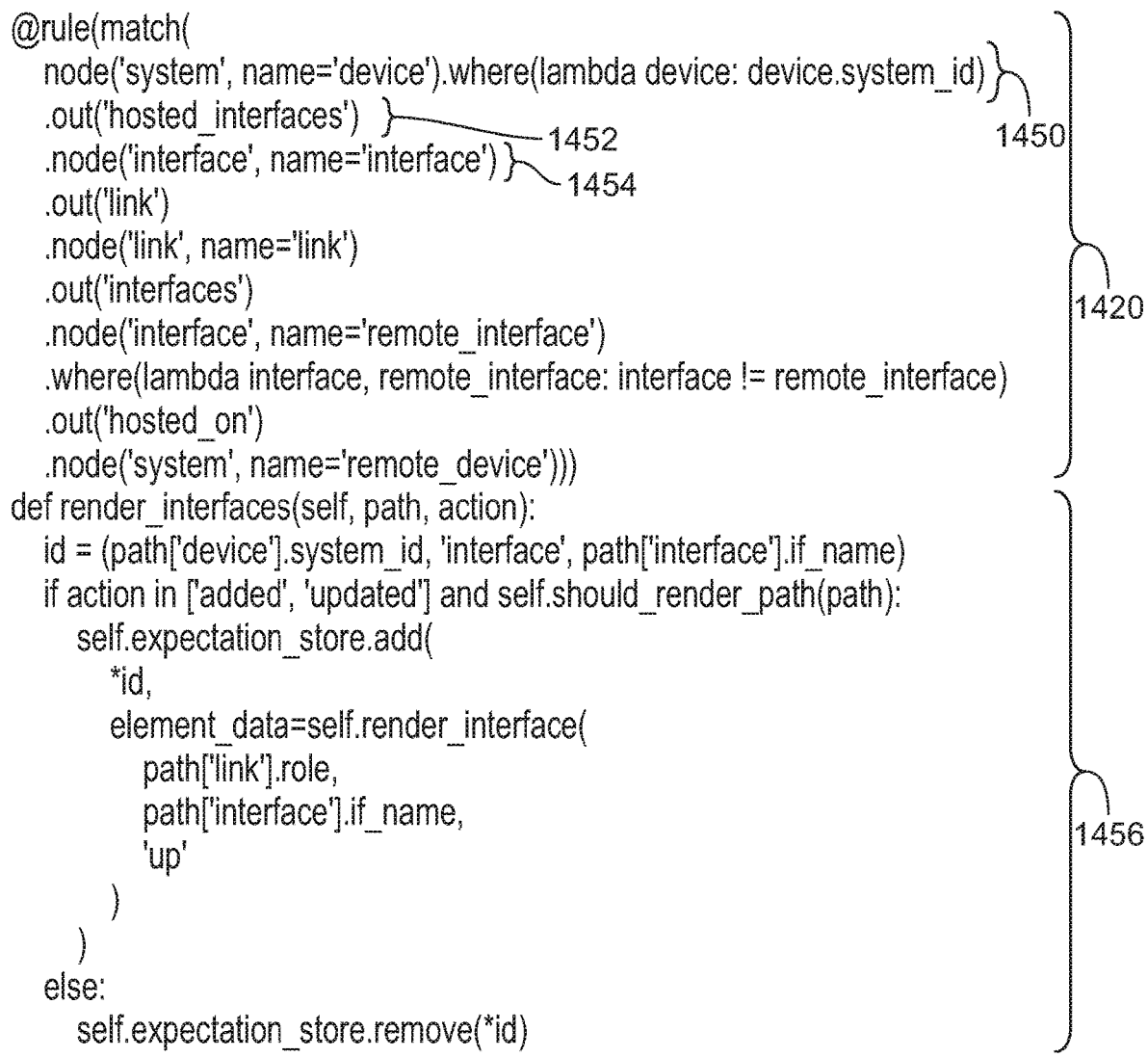
FIG. 14B shows an example of an implementation of an agent.

FIG. 14B shows an example of an implementation of an agent. A class that implements the agent is identified at 1400, wherein the agent can have one or more triggering patterns. The class shown defines various reusable functions. While the example is written in Python, there are no limits on programming language features an agent uses. The triggering pattern is identified at 1420. In some embodiments, the triggering pattern matches the portion of a graph model shown in FIG. 14A. For example, "node('system', name='device')" at 1450 describes device node 1400 of FIG. 14A; ".out('hosted_interfaces')" at 1452 describes edge of type "hosted_interfaces" of FIG. 14A; and ".node ('interface', name='interface')" at 1454 describes interface node 1408 of FIG. 14A. A callback function associated with the agent is defined at 1456. In some embodiments, the callback function is invoked whenever a portion of the graph model matching the triggering pattern defined at 1420 is added to, removed from, or updated in the graph.

Figure 15:
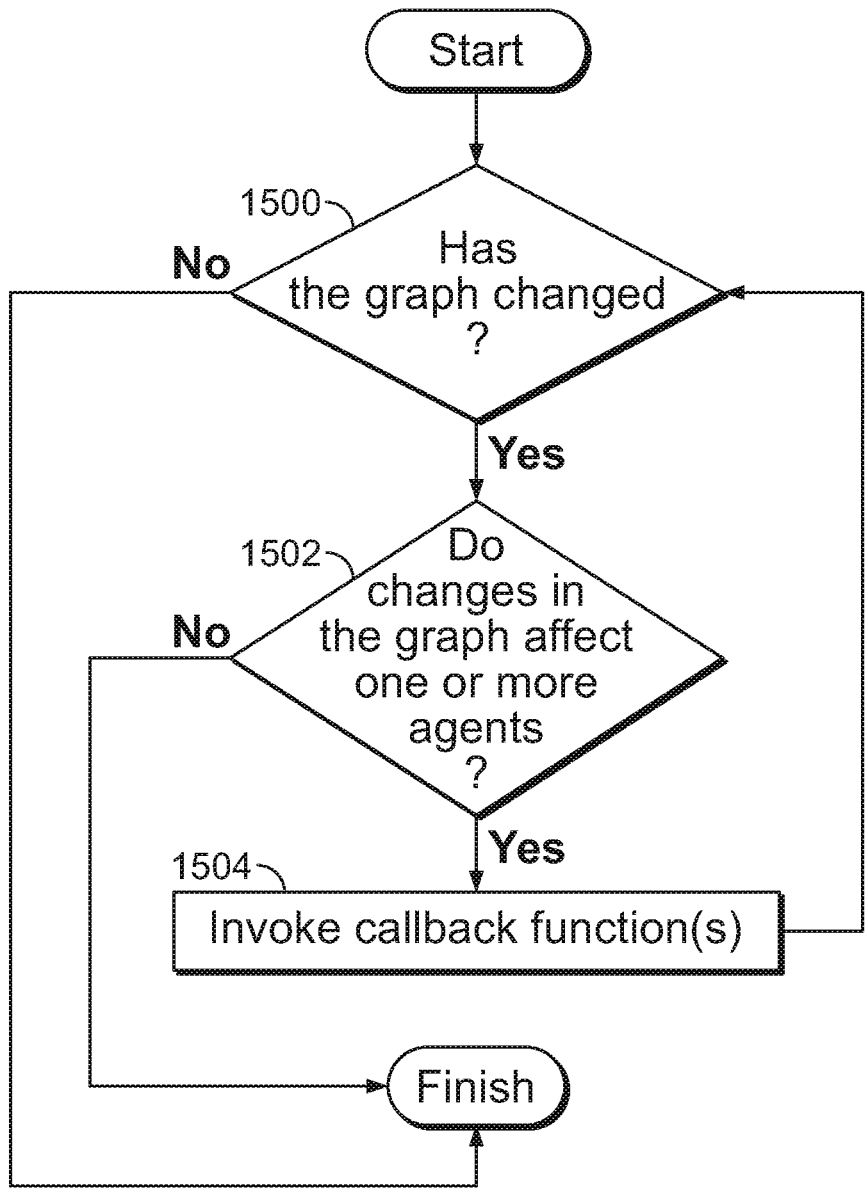
FIG. 15 is a flow diagram illustrating an embodiment of a process for invoking callback functions.

FIG. 15 is a flow diagram illustrating an embodiment of a process for invoking callback functions. In some embodiments, the process implements 804 and 806 of FIG. 8. In some embodiments, the process is implemented by agent manager 1602 of FIG. 16. At 1500, it is determined whether the graph has changed. The graph may change based on a received intent or based on invoked callback functions. In some embodiments, changes to the graph caused by one agent trigger another agent. In the event the graph has not changed, the process is finished. In some embodiments, the process is repeated while the network is active (e.g., desired to be configured). In the event the graph has changed, at 1502, it is determined whether changes in the graph affect one or more agents.

In some embodiments, changes to the graph representation invoke an agent in the event a portion of the graph representation associated with a triggering pattern of the agent is detected in, added to, updated in, or removed from the graph representation. In some embodiments, a detection or addition of a portion of the graph representation matching the specific triggering pattern to the graph representation occurs in the event changes to the graph representation cause a portion of the graph representation to match the specific triggering pattern, wherein the portion of the graph representation did not previously match the specific triggering pattern. For example, a portion of the graph representation matching the specific triggering pattern is detected in the graph representation in the event existing nodes and edges in the graph are modified such that a portion of the graph matches the specific triggering pattern. A portion of the graph representation matching the specific triggering pattern is added to the graph representation in the event a new graph portion matching the specific triggering pattern is added to the existing graph.

In some embodiments, a portion of the graph representation matching the triggering pattern in the graph representation is updated in the event the change in the graph representation modifies a node or edge within a portion of the graph representation that matched the specific triggering pattern prior to the change and the portion continues to match the specific triggering pattern following the change.

In some embodiments, a portion of the graph representation associated with the triggering pattern is deleted from the graph representation in the event a change to the graph representation modifies the portion of the graph representation that previously matched the triggering pattern such that the portion of the graph representation no longer matches the triggering pattern. For example, a node or edge may be deleted from the portion of the graph that previously matched the triggering pattern, a node or edge in the portion of the graph that previously matched the triggering pattern may be altered (e.g., an attribute such as type is changed), or the portion of the graph that previously matched the triggering pattern may be deleted in entirety.

In the event changes in the graph do not affect one or more agents, the process is finished. In the event changes in the graph affect one or more agents, at 1504, callback function(s) are invoked. For example, one or more callback functions associated with the one or more agents are invoked. In some embodiments, the callback function is provided an indication of whether a portion of the graph representation associated with a triggering pattern is detected in, added to, updated in, or removed from the graph representation. In some embodiments, different callback functions are called based on the indication in order to perform different actions based on the indication. For example, in the event a specific node-relationship pattern is added to the network configuration graph, the callback function allocates resources (e.g., allocating an IP address for a node of type "link"). In the event the pattern is removed, the callback function removes the resource request for the node.

Figure 16:
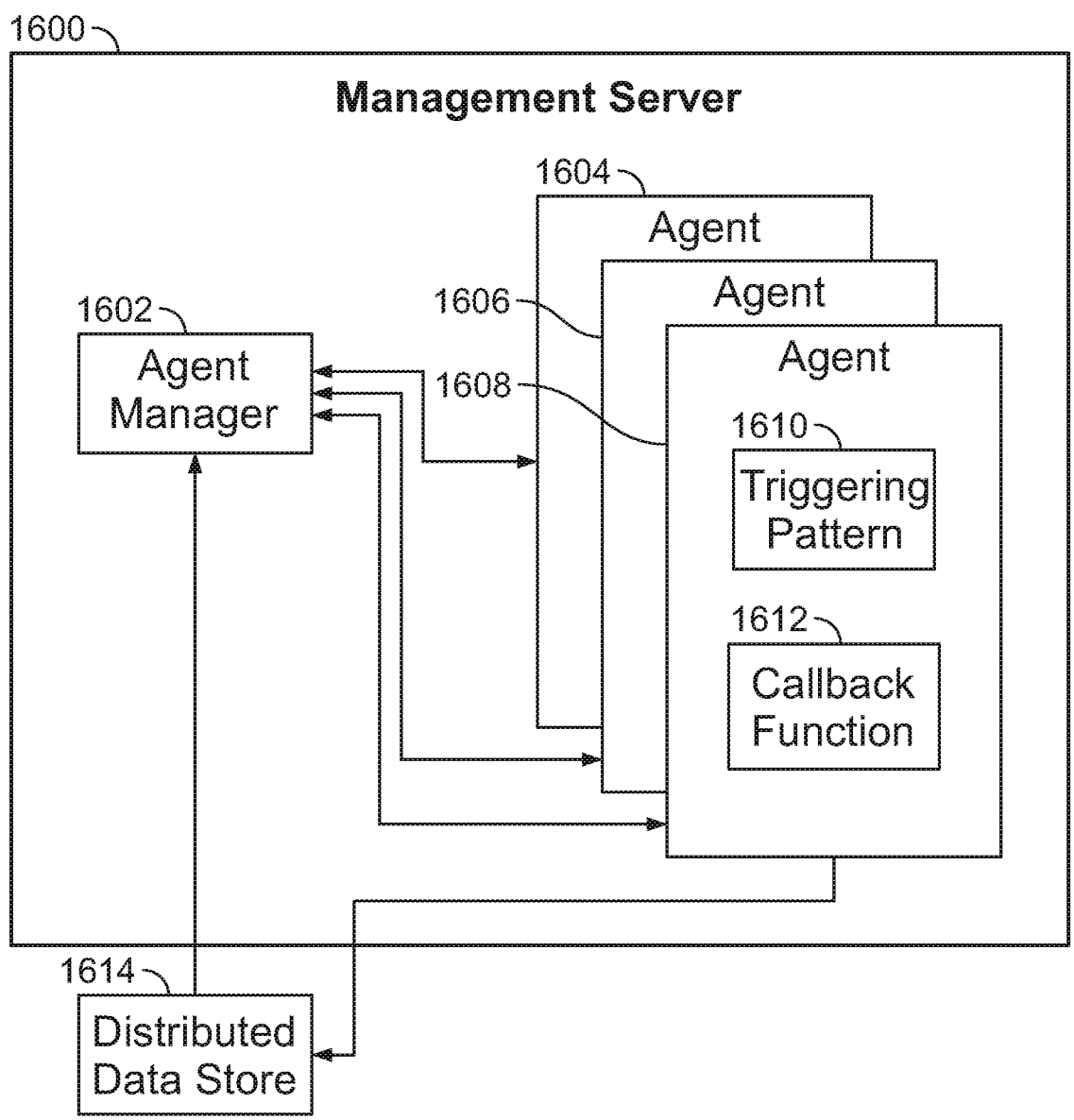
FIG. 16 is a diagram illustrating an embodiment of a management server.

FIG. 16 is a diagram illustrating an embodiment of a management server. Management server 1600 may be used to implement management server 102 of FIG. 1. In the example shown, management server 1600 comprises agent manager 1602 and agents 1604, 1606, and 1608. In various embodiments, the management server comprises 60, 200, 1000, or any appropriate number of agents. An agent may comprise a triggering pattern and corresponding callback function to be called in the event a triggering pattern is present. As shown, agent 1608 is associated with triggering pattern 1610 and callback function 1612.

In some embodiments, a central software component such as agent manager 1602 is used to track all changes to a network configuration by tracking changes to a graph representation of the network configuration, wherein the graph representation accurately represents a real-time state of the network. In some embodiments, agent manager 1602 comprises a query engine. As shown, agent manager 1602 receives inputs from distributed data store 1614. In some embodiments, the graphical representation of the network configuration is stored in the distributed data store. The inputs may comprise a current network configuration graph (e.g., graphical representation of the network configuration). In some embodiments, agent manager 1602 compares a current state of the network configuration graph to a previous state of the network configuration graph to determine changes in the graph. In some embodiments, agent manager 1602 implements 804 (detect portions of the graph representation that affect triggering patterns or agents) of FIG. 8. In the event a network configuration graph has changed, agent manager 1602 notifies only relevant agents of the change. Relevant agents are determined based on their triggering patterns (e.g., whether a change in the graph affects a triggering pattern of an agent). For example, a "publish-subscribe" model is utilized wherein an agent is subscribed to changes in the graph that affect a triggering pattern associated with the agent. In some embodiments, agents are invoked based on triggering patterns in lieu of a central change logging component.

Various actions may be required to be performed based on the network configuration graph. In various embodiments, changes in the graph cause state to be collected from a device, a link to be deleted, a node to be created, or any other appropriate action. The actions may be performed via callback functions. In some embodiments, a query of a specific triggering pattern is run one time. After a triggering pattern is specified, an associated agent is only notified of a change in the graph in the event its triggering pattern is matched in the graph model. In some embodiments, the live querying and graphical representation allow the system to be robust and scalable. In some embodiments, the framework of the system is not changed; agents, nodes, or edges are added to implement new features.

In the example shown, agents provide input to distributed data store 1614. The agents may cause changes to the network configuration when associated callback functions are invoked. The changes may be stored in the network configuration graph. In some embodiments, agents implement 808 of FIG. 8 (update the graph representation, if applicable, based on processing results of the agent callback functions).

In some embodiments, management server 1600 facilitates analysis and monitoring of the established network. For example, a user provides a specification of components of a workflow (e.g., directed graph workflow) utilized to detect and analyze the network (e.g., analyze performance, detect issues, detect anomaly, etc.). One or more of the components may execute a dynamically updating query (e.g., triggering pattern) of the graph representation, and one or more may execute one or more processing functions including at least one condition that dynamically processes dynamically updated results of the dynamically updating query. The result of the workflow may be used to generate and provide a notification and/or report.

Figure 17:
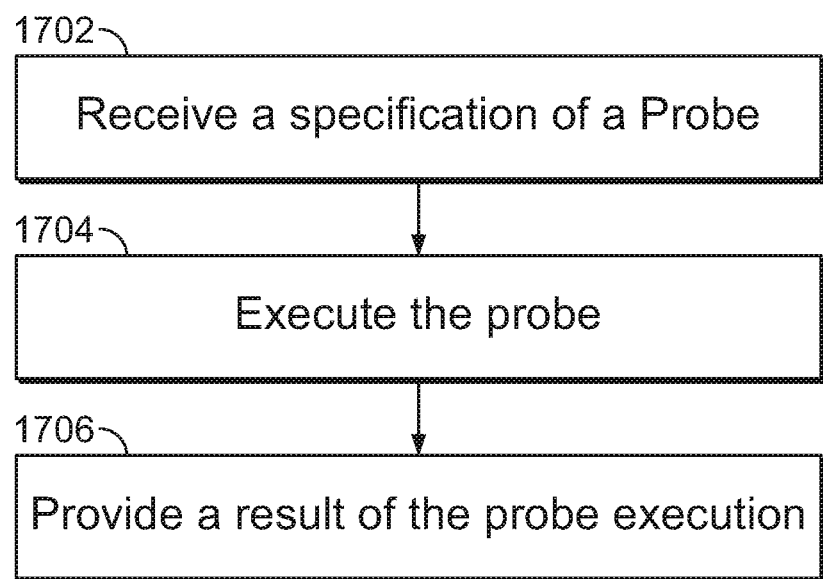
FIG. 17 is a flowchart illustrating an embodiment of a process for performing analysis of telemetry data.

FIG. 17 is a flowchart illustrating an embodiment of a process for performing analysis of telemetry data. The process of FIG. 17 may be at least in part implemented in management server 102 and/or network device 106 and/or 108 of FIG. 1. In some embodiments, at least a portion of the processes of FIG. 12A and/or FIG. 12B is performed in one or more steps of the process of FIG. 17.

At 1702, a specification of a probe is received. The probe specifies a configuration of analytics to be performed (e.g., on components of a computer network). For example, the probe specifies a network analysis to be performed to identify, analyze, and/or resolve network problems of a network. In some embodiments, the specification of the probe includes a specification of one or more probe elements (e.g., software data processor elements) that are organized in a relationship (e.g., directed acyclic graph of elements specified via input/output data dependencies of the elements with respect to each other). These elements together form a declarative specification of elements that at least in part represents processing stages in performing a desired analysis. Each desired probe element may be selected among a provided set of template elements and may be configured for a desired probe application. Thus the elements may serve as building blocks of stages that can be connected together in a specified pipeline (e.g., directed acyclic graph) to define and specify the probe.

At a high level, declarative specification may define the intent of "what" rather than the detailed specification of "how." By specifying the intent, it is ensured that expectations of the intent are dynamically met in the presence of any change. By leveraging the graph representation that includes telemetry data and a triggering pattern that dynamically provides updated results, current relevant resources can be dynamically and automatically identified and processed even if the network is updated.

In some embodiments, the probe includes a probe processor element that gathers data (e.g., processed telemetry data) using a dynamically updating "live" query. This allows parallel pipeline stages of probe processor elements to be executed for different network components (matching a dynamically updating "live" query pattern) and results from these parallel pipeline stages are dynamically gathered together using another probe element and further processed using additional probe elements processing the gathered data. Thus various stages of dynamically updating "live" query patterns may be utilized to dynamically create and gather various parallel element paths of the probe.

In some embodiments, specification of the probe is received from a user via a structured text provided using a RESTful API. In some embodiments, specification of the probe is received from a user via a graphical user interface.

In some embodiments, the probe elements (e.g., data processor elements) of the probe include two categories of elements: collector category probe processor elements and processor category probe processor elements. The collector category probe processor elements may include a specification of a dynamically updating query (e.g., triggering pattern/graph query) that uses the graph representation of the network to fetch the data published by "raw" telemetry collectors and the processor category probe processor elements may be specified to perform processing based on the collected telemetry data. For example, a declarative specification of a collector category probe processor element object executes a dynamically updating "live" query (e.g., triggering pattern) and declarative specifications of a plurality of processor elements (e.g., dynamically process dynamically updated results of the dynamically updating query) are received. When the declarative specifications are executed, the use of the query/triggering pattern allows the specification to dynamically adapt to any changes in the network without the need to reprogram code or the specification. Based on a result of the execution of the elements, a notification of a detected anomaly is provided if appropriate. A specified processor category probe processor element may perform a calculation or other processing to be performed on input data (e.g., input data from output of another element). By connecting together probe processor elements, a desired analysis may be performed.

In some embodiments, each stage specifies one or more data types. Examples of the data types include: Number (N); Number Time Series (NTS); Number Set (NS); Number Set Time Series (NSTS); Text (T); Text Time Series (TTS); Text Set (TS); Text Set Time Series (TSTS); Discrete State (DS); Discrete State Time Series (DSTS); Discrete State Set (DSS); Discrete Set Time Series (DSSTS). An NS is a set of numbers. A DSS is a set of discrete state variables. Part of the specification of a DSS (and DSSTS) stage is the possible values the discrete state variable can take. A text set (T) is a set of strings. An NSTS is a set of time series with numbers as values. For example, a member of this set would be: (time=0 seconds, value=3), (time=3 seconds, value=5), (time=6 seconds, value=23), etc. A DSTS is the same as an NSTS except values are discrete state. A TSTS is the same as an NSTS except values are strings. Number (N), Discrete State (DS), and Text (T) are simply Number Sets, Discrete State Sets, and Text Sets guaranteed to be of length one. NTS, DSTS, and TS are the same as above, but are time series instead of single values.

The probe processor elements specified in the specification of the probe may be selected among a plurality of available elements provided by a platform provider for use by a user to build/specify the probe. For example, Apstra, Inc. of Menlo Park, Calif. provides implementations of available elements that can be instantiated in the specification of the probe to build/specify the probe.

An example of the available probe processor element that can be specified is the "service_data_collector" element. This is a collector category probe processor element and thus takes no input. This element effectively imports data into the output stage, depending on the configuration (which as can be seen is a graph query). Output is either Discrete State-Set or Number-Set. The configuration parameters that can be specified for this element in the specification include: service name—name of service (lldp, bgp, interface, or custom service); graph_query—triggering pattern/graph query; system_id—expression mapping from graph query to a system_id; key—expression mapping from graph query to whatever key is necessary for the service; and additional_ properties—dictionary mapping from a property key for a given output element to an expression describing how to derive the value for that key.

Another example of the available probe processor element that can be specified is the "interface_counter_collector" element. This is a collector category probe processor element and thus takes no input. This element effectively imports data into the output stage, depending on the configuration (which as can be seen is a graph query). Output is Number-Set output. The configuration parameters that can be specified for this element in the specification include: graph_query—triggering pattern/graph query; system_id— expression mapping from graph query to a system_id; interface expression—mapping from graph query to interface name; counter_type—enum of one of: tx_unicast_packets, tx_broadcast_packets, tx_multicast_packets, tx_bytes, tx_error_packets, tx_discard_packets, rx_unicast_packets, rx_broadcast_packets, rx_multicast_packets, rx_bytes, rx_error_packets, rx_discard_packets; additional_properties—dictionary mapping from a property key for a given series to an expression describing how to derive the value for that key.

Another example of the available probe processor element that can be specified is the "std_dev" element. This is a processor category probe processor element that is provided an input. This element calculates a standard deviation of each determined group and outputs a standard deviation value for each of the groups. Output is NS. Input is an NS. The configuration parameters that can be specified for this element in the specification include: group_by configuration and ddof—either 0 or 1 for uncorrected or corrected standard deviation. The configuration parameter called "group_by" specifies the partitioning of an input into groups, such that calculations can be performed on each of the groups to produce a result value per each group. The "group_by" parameter of this element or any other element that can include the "group_by" parameter may specify a list of property names. In the case of the empty list, the input is considered to be a single group; thus, the output is of size 1 and either N, DS, or TS. If a list of property names is specified, e.g., ["system_id," "iface_role"], or a single property is specified, e.g., ["system_id"], the input is divided into groups such that for each group, every item in the group has the same values for the given list of property names. The output data type of the processor element depends on a value of the group_by parameter; for the empty list, a processor produces a single value result, such as N, DS, or T, and for grouping by one or more properties it returns a set result, such as NS, DSS, or TS.

Another example of the available probe processor element that can be specified is the "avg" element. This is a processor type probe processor element that is provided an input. This element calculates an average of each determined group and outputs an average value for each of the groups. Output is NS. Input is an NS or NSTS. The configuration parameters that can be specified for this element in the specification include: group_by configuration.

Another example of the available probe processor element that can be specified is the "periodic_avg" element. This is a processor category element that is provided an input. This element calculates an average per each item in the input over a given period for each elapse of the given period. The configuration parameters that can be specified for this element in the specification include: period—period time in seconds.

Another example of the available element that can be specified is the "sum" element. This is a processor category element that is provided an input. This element calculates a sum of each determined group and outputs a sum value for each of the groups. Output is NS. Input is an NS or NSTS. The configuration parameters that can be specified for this element in the specification include: group_by configuration.

Another example of the available probe processor element that can be specified is the "accumulate" element. This is a processor category element that is provided an input. Input is N, DS, T, NS, DSS, or TS. Output is a time series version of the input. One time series is created per each input with the same properties. For example, each time the input changes, a timestamp and the value are recorded and appended to the corresponding output series. If duration is set and the length of the output time series in time is greater than duration, oldest samples are removed from the time series until the duration condition is met. If max_samples is set and the length of the output time series in terms of number of samples is greater than max_samples, oldest sample from the time series is removed until the condition is met. The configuration parameters that can be specified for this element in the specification include: duration—number of seconds (default is None) and max_samples—number of samples (default is None). The duration or the max_samples may be required to be specified.

Another example of the available probe processor element that can be specified is the "anomaly" element. This is a processor category element that is provided an input. Input is either N, NS, or NSTS. Output is DSS indicating whether property of input is in a specified range or not. For time series inputs, sample_count, sum, and avg can be specified. In the case of a time series input, output value indicates most recent value of the time series. The configuration parameters that can be specified for this element in the specification include: range; property—enum of either value, sample_count, sum, avg; and suppress_anomaly. The range may include two optional fields: min and max. Together, they specify the range. If one is omitted, the range is considered infinite in that direction. The "suppress_anomaly" parameter in this and other elements is a Boolean and is considered "false" if omitted. If set to true, no anomaly indication will be generated from this element.

Another example of the available probe processor element that can be specified is the "match_perc" element. This is a processor category element that is provided an input. Input is a DSS. Output is NS. This element outputs for each determined group a percentage of items in the input group that are equal to a reference state. The configuration parameters that can be specified for this element in the specification include: reference_state—discrete state value; and group_by parameter.

Another example of the available probe processor element that can be specified is the "match_count" element. This is a processor category element that is provided an input. Input is a DSS. Output is NS. This element outputs for each determined group a count of number items in the input group that are equal to a reference state. The configuration parameters that can be specified for this element in the specification include: reference_state—discrete state value; and group_by parameter.

Another example of the available probe processor element that can be specified is the "state_ext" element. This is a processor category element that is provided an input. Input is a DSS. Output is NS. There is a DS in the output per each DS on input. This element monitors each input DS over the last time_window seconds. If, at any moment, for any of the states in state_range, the amount of time having been in that state over the last time_window seconds does not fall into a range specified in the corresponding state_range entry, an anomaly (depending on suppress_anomaly) is determined and the corresponding output component is set to True. Otherwise, the output component for a given input component is nominally False. The configuration parameters that can be specified for this element in the specification include: time_window—time in seconds; suppress_anomaly; and state_range. The state_range parameter specifies mappings from each possible state to a set of ranges of time during the most-recent time_window seconds that the input state is allowed to be in that state. If there is no entry for a given state, it is assumed that there is no constraint on the amount of time we are in that particular state.

Another example of the available probe processor element that can be specified is the "headroom" element of "twostage_l3clos." This is a processor category element that is provided an input. Input is (at least) the tx_bytes for every fabric interface in the system (NS). This element calculates the headroom between every pair of systems described in "pairs." Input is (at least) the tx_bytes for every fabric interface in the system. The input stage must have a property named "system_id" indicating the system_id of the system on which the interface resides, and a property named "interface" indicating the name of the interface. There are five outputs. Two outputs, "min_headroom" and "max_headroom," describe the minimum and maximum headroom between every pair of nodes described in inputs. There are entries for every adjacent pair of nodes en route between each source/destination pair. Each entry is tagged with "src_system," "dst_system," "src_system_role," and "dst_system_role." The outputs "min_headroom_path" and "max_headroom_path" are tagged with the same set of properties. However, each output contains a text string describing the minimum or maximum path, respectively. The path is a "||"-separated list of interfaces describing a path. Each interface is described by a comma-separated list of system_id and interface_name. An example path (1 hop) would be: "spine1,eth0||leaf0,eth1." The remaining output "link_headroom" describes the headroom on every specific link en route between every source/destination pair in "pairs." Each link is tagged with "src_system," "dst_system," "src_system_role," "dst_system_role," "src_if_name," "dst_if_name," and "speed" (e.g., link speed in bps).

At 1704, the probe is executed. Executing the probe includes obtaining the appropriate telemetry data (e.g., telemetry data matching the dynamically updating "live" query of the probe) and processing the obtained telemetry data (e.g., using probe processor elements of the probe).

In some embodiments, a single execution instance of the probe may not be enough to perform a desired analysis and the probe is to execute a plurality of times. Results of the various executions are saved and gathered together to form a set of results (e.g., time series of results). For example, because a network can always change during deployment, a network analysis is executed/performed periodically. The results are then "aggregated" to provide information about recent history rather than instantaneous status. In one example, a user may desire a network link to be "up" for 99.9% of the time in the last one hour and "down" not more than one seconds during any "down" event. In some embodiments, the aggregate property of the set of network elements is continuously monitored based on a time interval (e.g., calculated every five seconds). In some embodiments, one or more elements of the probe are associated with detection and/or notification associated with a detected anomaly. For example, based on whether a specified criteria is met, a notification is provided via the one or more elements of the probe.

In some embodiments, a triggering pattern of a probe element defines a set of managed network elements of the network graph representation, wherein the managed network elements are monitored for an anomaly. The execution of the probe may be a part of closed-loop telemetry collection and analysis. In some embodiments, an agent is associated with a triggering pattern that defines a set of managed elements. In some embodiments, the triggering pattern also defines a property of the set of managed elements. In some embodiments, the agent is associated with a set of functions that calculate an aggregate property of the managed elements, apply conditional logic to the aggregate property, detect an anomaly, and store the anomaly data (e.g., information relaying an anomaly exists or relaying details on the anomaly, such as percentage of links that are running over 80% utilization for more than 30 seconds) in the graph representation. In some embodiments, the anomaly data triggers an additional agent. In some embodiments, the aggregate property is saved (e.g., as a node property) regardless of whether an anomaly is detected or not. Processing functions that are triggered based on the aggregate property may comprise conditionality (e.g., the function will not be called in the event the aggregate property value is not determined to be an anomaly). Agents may subscribe to graph elements representing stages and react to them by executing processing that is required. In some embodiments, an agent is associated with a triggering pattern of graph elements representing a processing stage or step. In some embodiments, the agent has an associated callback function that executes processing that is defined or parametrized by the graph elements.

At 1706, a result of the probe execution is provided. In various different embodiments, the result of the probe may be provided via an API (e.g., RESTful API), a GUI, a data stream, and/or a notification. For example, the result of the probe can be obtained, analyzed and/or manipulated via API commands. In another example, the result of the probe is accessible via GUI (e.g., time series graph of results of executions of the probe provided using a network management interface). The GUI may allow navigation of probe structure and viewing of elements of stages (inputs/outputs). Different visualizations may be provided for different result data types (e.g., different visualizations for number set, number time series, discrete state set, discrete state time series, etc.). In another example, the result of the probe is streamed via one or more messages (e.g., a message is provided when a result value changes or for each time series). In another example, the probe detects anomalies/errors and when the probe detects that a triggering condition is met, an associated notification is provided (e.g., to a network administrator). Appropriate responsive action may be automatically performed based on a detected anomaly. For example, traffic is redirected to different links or impacted tenants are asked to decrease utilization of the links. In some embodiments, results of one or more probes are provided to another probe that gathers the results of the probe(s) to perform further analysis. For example, various different probes may be chained together to perform a complex analysis.

For example, an example probe takes all tx_bytes counters (or the first-derivative of the tx_bytes counter) for every server-facing interface of a network switch in the network (e.g., identified using a query pattern of collector elements), calculates the standard deviation across them, and raises an anomaly if and when that standard deviation exceeds some threshold. In the processing stages of this probe, a probe processor element outputs the tx_bytes counter for every server-facing interface in the network. Its output stage is used as input into a standard-deviation processor element which, in this context, outputs a stage with a single number describing the standard deviation across all server-facing interfaces in the network. This final stage is used as input into an anomaly processor element that generates a discrete state output. For example, when a user/operator detects an anomaly (e.g., on GUI or via streaming message or any other transport on which anomalies are sent) indicating the standard deviation threshold has been violated and likely server traffic is not evenly distributed, the user/operator is able to drill down via inspection of probe stages (e.g., using GUI or RESTful API) to determine which ports on which servers are misbehaving. With this information, the user/operator is able to resolve the issue.

FIG. 18A is an example of a specification of a probe. In some embodiments, probe specification 1802 is received in 1702 of the process of FIG. 17.

To create probe specification 1802, the operator may POST the specification to an endpoint URL (e.g., "/api/blueprints/<blueprint_id>/probes") via an API (e.g., send a POST request with the specification to the URL). The endpoint is provided the specification, including a list of probe processor element instances. Each processor element instance contains an instance name (defined by user), processor element type (e.g., a selection from a catalog defined by the platform and the reference design), and "inputs" and/or "outputs." All additional fields in each processor element are specific to that type of processor element and are specified in the "properties" sub-field.

In the first entry, probe specification 1802 specifies a probe processor element instance of type "interface_counter_collector" named "server_tx_bytes." It takes as input a query called "graph_query" which is a graph_query. It then has two other fields named "interface" and "system_id." These three fields together indicate that a (first time-derivative of) counter is to be collected for every server-facing port in the system. For every match of the query specified by "graph_query," a "system_id" is to be extracted by taking the "system_id" field of the "sys" node in the resulting path (as specified in the "system_id" processor field) and an interface name by taking the "if_name" field of the "intf" node in the resulting path (as specified in the "interface" processor field). The combination of system ID and interface is used to identify an interface in the network, and its "tx_bytes" counter (as specified by "counter_type") is put into the output of this processor. The output of this probe processor element is of type "Number Set" (NS). This probe processor element has no inputs, an "input" field is not specified. It has one output, labeled "out" (as defined by the "interface_counter_collector" processor element type). That output is mapped to a stage labeled "server_tx_bytes_output." The "units" field is optional; it is a dictionary associating a string-value with each output stage for the given probe processor element. It is a user-specified field meant to describe the units of the output stage and thus aid in inspection of stages. It is returned when fetching stage data.

The second probe processor element is of type "std_dev" and takes as input the previously created stage called "server_tx_bytes." This processor outputs a standard deviation taken across each of the many input numbers. This output is named "std_dev_output."

The final probe processor element is of type "anomaly" and takes as input "std_dev_output." It raises an anomaly when the input is in the range specified by "range"—in this case if the input is ever greater than 100 (chosen value to indicate when the server-directed traffic is unbalanced). This processor has a single output labeled "server_traffic_imbalanced." This output (as defined by the anomaly element type) is of type DS (Discrete State) and can take values either "true" or "false," indicating whether or not an anomaly is raised. Although further processing is not performed with this anomalous state data in this example, that does not preclude its general possibility in other examples.

POSTing specification 1802 to the endpoint will return a UUID, which can be used for further operations. HTTP DELETE can be sent to "/api/blueprints/<blueprint_id>/probes/<uuid>" to delete the probe specified by its UUID. HTTP GET can be sent to "/api/blueprints/<blueprint_id>/probes/<uuid>" to retrieve the configuration of the probe as it was POSTed. In addition to information provided in the POST request for probe creation, output will contain two more fields: "id" with UUID of the probe; and "state" with actual state of the probe—possible values are "created" for a probe being configured, "operational" for a successfully configured probe, and "error" if probe configuration has failed. Additionally, HTTP GET can be sent to "/api/blueprints/<blueprint_id>/probes/<uuid>" to retrieve all the probes for blueprint <blueprint_id>.

FIG. 18B is an example of responses to queries for stages of a probe. In some embodiments, response 1804, 1806 and/or 1808 are received in 1706 of the process of FIG. 17. An operator may wish to inspect the various stages of a probe. Stages of the probe can be implicitly created by being named in the input and output of the various processor elements. A particular stage of a probe can be obtained by sending a request to the appropriate endpoint/identifier (e.g., "api/blueprints/<blueprint_id>/probes/<uuid>/stages/<stage_name>").

In the example probe specified via specification 1802 of FIG. 18A, the first stage is named "server_tx_bytes." This stage contains the "tx_bytes" counter for every server-facing port in the system. This stage can be obtained via a request (e.g., HTTP GET) to the endpoint URL "/api/blueprints/<blueprint_id>/probes/<uuid>/stages/server_tx_bytes_output" The response of this query is shown in FIG. 18B as response 1804. The "server_tx_bytes" stage contains the "tx_bytes" value for every server-facing interface in the network. In this example, this stage is of type "ns," indicating NS or Number-Set. Data in stages is associated with context. This means that every element in the set of a stage is associated with a group of key-value pairs. Per every stage, the keys are the same for every piece of data (or, equivalently, item in the set). These keys are listed in the "properties" field of a given stage, and are generally a function of the generating processor element. Each of the items in "values" assigns a value to each of the properties of the stage and provides a value (the "Number" in the "Number Set"). The meaning of this data in this stage is that tx_bytes on intf1 of spine1 is 22, on intf2 of spine1 is 23, and on intf1 of spine3 is 24 bytes per second.

To query the second stage of the probe of specification 1802, an HTTP GET request can be sent to the endpoint "/api/blueprints/<blueprint_id>/probes/<uuid>/stages/std_dev_output." The example response to this request is shown in FIG. 18B as response 1806.

The final stage in the probe can be requested (e.g., HTTP GET request) at the endpoint "/api/blueprints/<blueprint_id>/probes/<uuid>/stages/server_traffic_imbalanced." The example response to this request is shown in FIG. 18B as response 1808. As shown, this stage indicates whether or not server traffic is imbalanced ("true") or not ("false") by indicating if the standard deviation across tx_bytes across all server-facing ports is greater than 100. Note the "possible_values" field describes all values that the discrete state "value" can take.

It is important to note that all processors of a probe can also be queried via "/api/blueprints/<blueprint_id>/probes/<uuid>/processors/<processor name>." By performing such a query, the user can discover the configuration of requested processor elements.

FIG. 18C is an example of a raised anomaly. In some embodiments, response 1810 is received in 1706 of the process of FIG. 17. The final stage of the probe of specification 1802 of FIG. 18A raises an anomaly (and sets its output to "true"), when the standard deviation of tx_bytes across server-facing interfaces is greater than 100. Probe anomalies can be obtained (e.g., GET request) via the anomaly API at endpoint "/api/blueprints/<bluprint_id>/anomalies?type=probe." Response 1810 is the JSON form of an anomaly that would be raised by the example probe of specification 1802 of FIG. 18A (ellipse utilized to omit content to simplify the example). As shown in 1810, the identity contains the "probe_id" and the name of the stage on which the anomaly was raised and which requires further inspection by the operator. Within a given stage, if the type of the stage were a set-based type, the "properties" field of the anomaly would be filled with the properties of the specific item in the set that caused the anomaly. Multiple anomalies can be raised on a single stage, as long as each is on a different item in the set. In our example, since the stage in question is of type NS, the "properties" field is not set.

FIG. 18D is an example of formats for probe messages. In some embodiments, any processor element instance in any probe can be configured to have its output stages streamed in the "perfmon" channel of a streaming output. If the property "enable_streaming" is set to "true" in the configuration for any processor, its output stages will have all their data streamed. For non-time-series-based stages, each will generate a message whenever their value changes. For time-series-based stages, each will generate a message whenever a new entry is made into the time series. For Set-based stages, each item in the set will generate a message according to the two prior rules. Each message that is generated has a value, a timestamp, and a set of key-value pairs. The timestamp is the time at which the value changed for non-time-series-based stages and the timestamp of the new entry for time-series-based stages. The key-value pairs correspond to the "properties" field observed earlier in the "values" section of stages, thus providing context. Specified format 1812 is encapsulated in a PerfMon message (and that in turn in an AosMessage). The key-value pairs of context are put into the "property" repeated field (with "name" as the key and "value" as the value) while the value is put into the "value" field. "probe_id" and "stage_name" are as they appear. The blueprint_id is put into the "origin name" of the encapsulated AosMessage. Similarly the timestamp is put into the generic "timestamp" field.

Figure 19E:
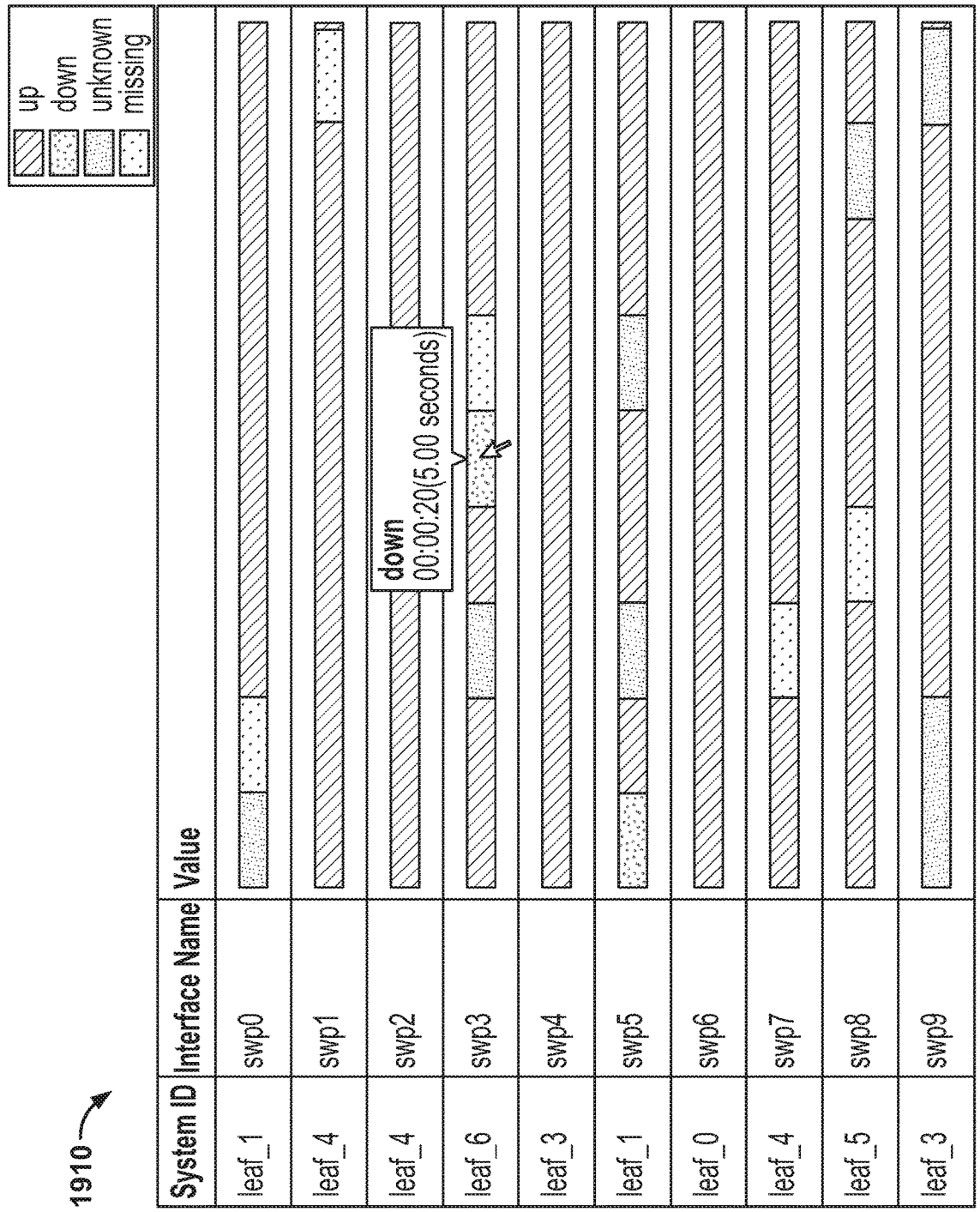

FIG. 19A is a diagram illustrating an embodiment of a user interface for managing a probe. User interface 1902 allows navigation of a probe structure and viewing of the content of stages (inputs/outputs). Since the formats for all of the stages is pre-defined, the views become available automatically after the probe is created, (e.g., without requiring custom UI development). In some embodiments, there are 4 different visualization elements, one for each: number set, number time series, discrete state set, discrete state time series.

FIGS. 19B-19E show various example user interface components 1904-1910 showing results from probe executions.

Figure 20A:
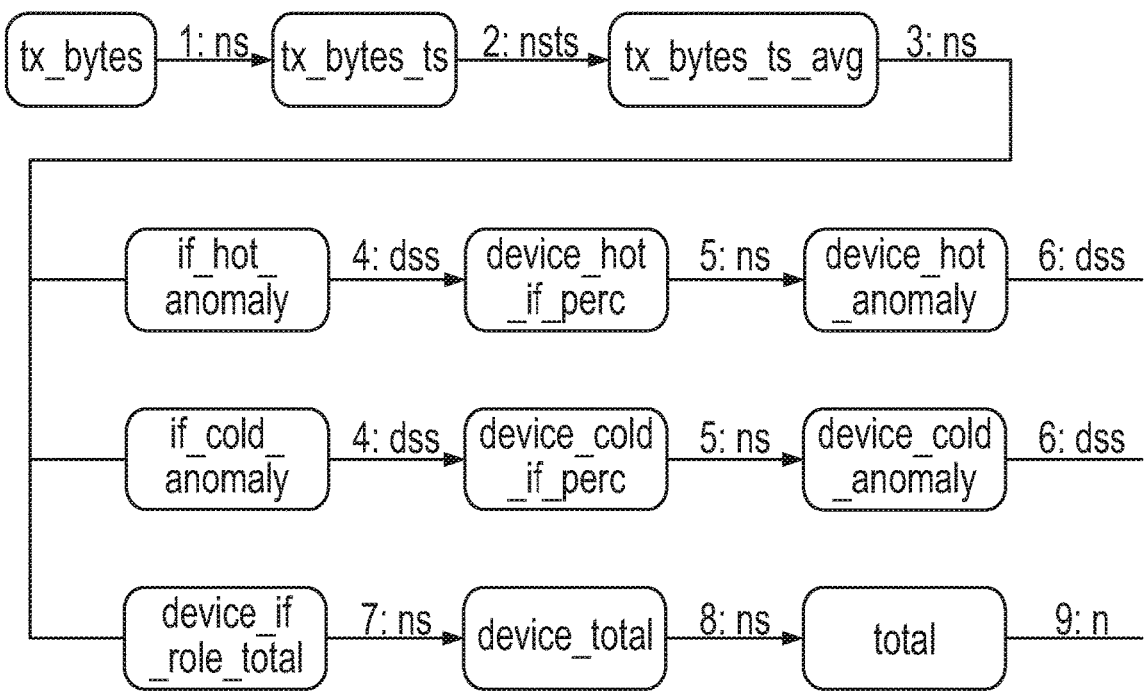
FIG. 20A is a diagram illustrating stages of an example probe for hot/cold traffic aggregation.

FIG. 20A is a diagram illustrating stages of an example probe for hot/cold traffic aggregation. This probe is applicable to all 8 counter types (e.g., essentially representing 8 different probes). This probe take counters an inputs, and for each interface, determines whether network traffic is running hot or cold based on a 30 sec average. Results are summarized per device and across devices. Description of stages of this probe shown in stage diagram 2002 is as follows:

(1) Use "interface_counter_collector" to take counter_type from every interface on every leaf/spine (for example tx_bytes). As the output it produces a set (1:ns in the figure), with each set member containing a value of the counter and some metadata describing the element to which this number applies (essentially describing the interface using system_id and interface name in this case).

(2) Make time series out of it using "accumulate" processor (tx_bytes_ts). Configuration of this processor contains the desired duration and/or number of samples for the time series. Produces a set of time series (2:nsts in the figure).

(3) Calculate average for each time series using "periodic_avg" processor (tx_bytes_ts_avg). Produces a number set (3:ns in the figure).

(4) Use "anomaly" processor to generate "hot" anomaly if average in (3) goes above 80% per interface (if_hot_anomaly). Produces discrete state set (4:dss in the figure), with possible values true/false for each interface.

(5) Use "anomaly" processor to generate "cold" anomaly if average in (3) goes below 10% (or some fixed number if we cannot incorporate link speed) per interface (if_cold_anomaly). Produces discrete state set (4:dss in the figure), with possible values true/false for each interface.

(6) Group output of (3) by interface role AND system_id and sum these groups (using "sum" processor) to get total counter_type traffic per interface role on a device (device_if_role_total). Produces as the output a set of numbers, each representing total traffic per interface role on a given device (7:ns in the figure).

(7) Group (6) by system_id and apply sum (using "sum" processor) to get total counter_type per system_id (device total). Produces as the output a set of numbers, each representing total traffic per device (8:ns in the figure).

(8) Apply sum to (7) using "sum" processor to get total counter_type traffic (total, 9:n in the figure).

(9) Group (4) by system_id and match (anomaly=true, using "match_perc" processor) to get set of numbers (5:ns in the figure) representing percentage/count of hot/cold anomalies per system_id (device_cold_if_perc). Produces as the output a number set, each member representing perc.

(10) anomaly true/false, for each device (6:dss in the figure).

(11) Group (5) by system_id and match (anomaly=true, using "match_perc" processor) to get set of numbers (5:ns in the figure) representing percentage/count of hot anomalies per system_id (device_hot_if_perc).

(12) Raise anomaly on output of (5) using "anomaly" processor if more than 30% are hot (device_hot_anomaly). Produces as the output a discrete state set, each representing device_hot_anomaly true/false, for each device (6:dss in the figure).

Once this probe is configured, the following data becomes available via APIs (e.g., by sending request to corresponding endpoint URL):

(1) Last sample of tx_bytes traffic on each interface, on every device specified by query (in this case all devices, but query could easily filter out specific devices). An example UI for data set of type "number set" (NS) which displays set of values and associated keys (system ID, Interface Name and Value Type in this case) is shown in UI element 1904 of FIG. 19B.

2. Time series on each interface. An example UI for "number time series" data set (NTS) is shown in UI element 1906 of FIG. 19C. UI element 1906 shows time series for each member of a set and associated keys (System ID, Interface Name).

3. Recent history averages on each interface.

4. Presence of hot/cold anomaly on an interface as defined by the policy (e.g., greater than 80% hot, less than 10% cold) in the probe. An example UI for "discrete state set" (DSS) is shown in UI element 1908 of FIG. 19D. UI element 1908 shows a set of enums or booleans and associated keys (in the shown example UI it is just System ID, but for the specific example it would include interface name as well).

5. Percentages of hot/cold interfaces on each device (per interface role).

6. Presence of hot/cold anomaly on device as defined by the policy in the probe (if more than 50% hot interfaces, device is hot, if more than 30% of interfaces is cold, device is cold).

7. Total recent history average tx_bytes traffic on a device per interface role.

8. Total recent history average tx_bytes traffic on a device.

9. Total recent history average tx_bytes traffic on all devices matching a query.

Figure 20B:
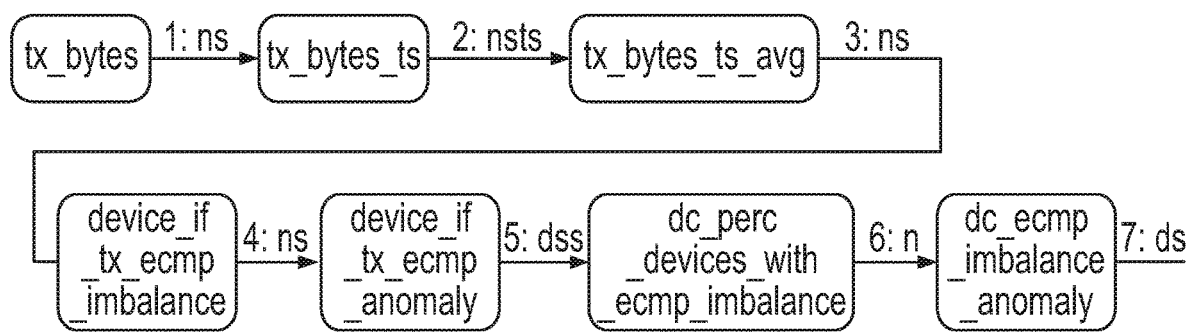
FIG. 20B is a diagram illustrating stages of an example probe for detecting EMCP imbalance.

FIG. 20B is a diagram illustrating stages of an example probe for detecting EMCP imbalance. This probe is applicable to 2 counter types: tx_bytes, rx_bytes. This probe takes counters and for all fabric interfaces on all the leafs, calculates average over 10 sec, and calculates the standard deviation (as a measure of imbalance) between fabric interfaces on a given device, raises anomaly for the device if imbalance is over some threshold, and calculates percentage of leafs with this ECMP imbalance and raises anomaly if more than 10% are imbalanced. Description of stages of this probe shown in stage diagram 2004 is as follows:

1. Use "interface_counter_collector" to take counter_type from every interface on every leaf/spine (for example tx_bytes). As the output it produces a set (1:ns in the figure), with each set member containing a value of the counter and some metadata describing the element to which this number applies (essentially describing the interface using system_id and interface name in this case).
2. Make time series out of it using "accumulate" processor (tx_bytes_ts). Configuration of this processor contains the desired duration, 5 sec, for the time series. Produces a set of time series (e.g., 2:nsts).
3. Calculate average for each time series using "periodic_avg" processor (tx_bytes_ts_avg). Produces a number set (e.g., 3:ns).
4. Group interface tx/rx averages per device (system_id) and calculate standard deviation for each group using "std_dev" processor (device_if_tx_ecmp_imbalance). Produces a number set, with each member representing standard deviation between tx/rx traffic on each fabric interface (e.g., 4: ns).
5. Raise ECMP imbalance anomaly if standard deviation as a measure of imbalance is above certain threshold using "anomaly" processor (device_if_tx_ecmp_anomaly). Produces a set of discrete states (true/false) indicating the presence of the anomaly on the device (e.g., 5: dss).
6. Calculate percentage of devices with ECMP anomaly (e.g., 6:n) using "match_perc" processor (dc_perc_devices_with_ecmp_imbalance).
7. Raise data center wide ECMP imbalance anomaly if the percentage of devices is above a certain threshold using "anomaly" processor (dc_ecmp_imbalance_anomaly). Produces discrete state (e.g., 7: ds).

Once this probe is configured, the following data becomes available via APIs (e.g., by sending request to corresponding endpoint URL):
1. Last sample of tx_bytes traffic on each interface, on every device specified by query (in this case all devices, but query could easily filter out specific devices).
2. Time series on each interface.
3. Recent history averages on each interface.
4. Standard deviation between the traffic on fabric interfaces as a measure of ECMP imbalance, per system_id.
5. ECMP imbalance anomaly if standard deviation as a measure of imbalance is above certain threshold, per system_id.
6. Percentage of devices with ECMP anomaly.
7. Data center wide ECMP imbalance anomaly.

Figure 20C:
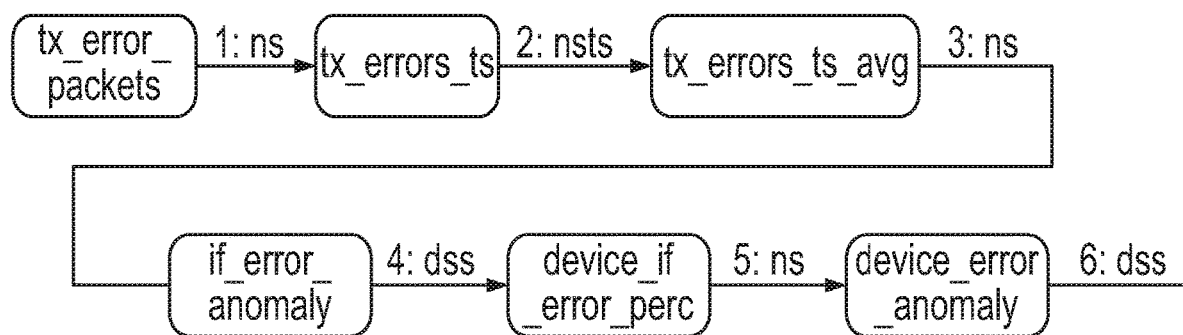
FIG. 20C is a diagram illustrating stages of an example probe for error/discard counter anomalies.

FIG. 20C is a diagram illustrating stages of an example probe for error/discard counter anomalies. This probe is applicable to both error and discard counters. This probe takes (error/discard) counters and for each interface, aggregates it over some time period and alerts if average is larger than 0 (indicating there were errors in recent history, and provide count/percentage of interfaces with this condition per device). A description of stages of this probe shown in stage diagram 2006 is as follows:

1. Use "interface_counter_collector" to take counter_type from every interface on every leaf/spine (tx_error_packets). As the output it produces a set (1:ns in the figure), with each set member containing a value of the counter and some metadata describing the element to which this number applies (essentially describing the interface using system_id and interface name in this case).
2. Make time series out of it using "accumulate" processor (tx_errors_ts). Configuration of this processor contains the desired duration and/or number of samples for the time series. Produces a set of time series (2:nsts in the figure).
3. Calculate average for each time series using "periodic_avg" processor (tx_errors_ts_avg). Produces a number set (3:ns in the figure).
4. Use "anomaly" processor (if_error_anomaly) to generate "error" anomaly if average in (3 above) is larger than 0. Produces discrete state set (4:dss in the figure), with possible values true/false for each interface.
5. Group (4 above) by system_id and match (anomaly=true, using "match_perc" processor) to get set of numbers (5:ns in the figure) representing percentage/count of error anomalies per system_id (device_error_if_perc). Produces as the output a number set, each member representing percentage of interfaces with errors on a device.
6. Raise anomaly on output of (5 above) using "anomaly" processor if more than 30% of interfaces have errors (device_error_anomaly). Produces as the output a discrete state set, each representing device_error_anomaly true/false, for each device (6:dss in the figure).

Once this probe is configured, the following data becomes available via APIs (e.g., by sending request to corresponding endpoint URL):
1. Last sample of tx_errors on each interface, on every device specified by query (in this case all devices, but query could easily filter out specific devices).
2. Time series on each interface.
3. Recent history averages on each interface.
4. Presence of error anomaly on an interface as defined by the policy (>0%).
5. Percentages of interfaces with errors on each device (per interface role).
6. Presence of error anomaly on device as defined by the policy in the probe (if more than 30% error interfaces).

Figure 20D:
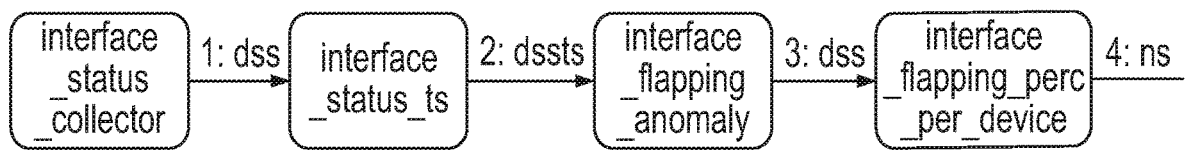
FIG. 20D is a diagram illustrating stages of an example probe for Interface Status Flapping Anomalies.

FIG. 20D is a diagram illustrating stages of an example probe for Interface Status Flapping Anomalies. This probe collects interface status and detects flapping, generates flapping anomaly per interface as well as aggregates the number of anomalies per device, and across all the devices. A description of stages of this probe shown in stage diagram 2008 is as follows:

1. Use "interface" service collector (interface_status_collector) to get the status of all interfaces. Interfaces are keyed by system_id and interface_name and these keys are obtained from the query. Produces discrete state set (1:dss in the figure), up/down per each interface.
2. Create time series for the status using "accumulate" processor (interface_status_ts). Produces as output a set of discrete state time series, one for each interface (2:dssts in the figure). Sets duration (5 sec) and max_samples for the time series.
3. Use "anomaly" processor to get "flapping" anomaly by taking "sample_count" metric, and generate anomaly if this count is larger than 10 (more than 10 state changes per time series duration (5 s)). Produces discrete state set (3:dss in the figure), true/false for each of the interfaces.

4. Group the set in (3 above) by system_id and calculate percentage/count of interfaces that have anomaly "true," per device. Produces number set, representing percentage/count of interface flapping anomalies per device (4:ns in the figure).

Once this probe is configured, the following data becomes available via APIs (e.g., by sending request to corresponding endpoint URL):
1. Last sample of each interface status on every interface/device matching the query.
2. Time series of interface status changes of each interface status on every interface/device matching the query An example user interface (UI) for a "discrete state time series" (DSTS) data set is shown in UI element 1910 of FIG. 19E. UI element 1910 shows how the state changes over time for each element identified by the key.
3. Interface status flapping anomaly for every interface/device matching the query.
4. Percentage of interfaces with status flapping anomalies for every device matching the query.

Figure 20E:
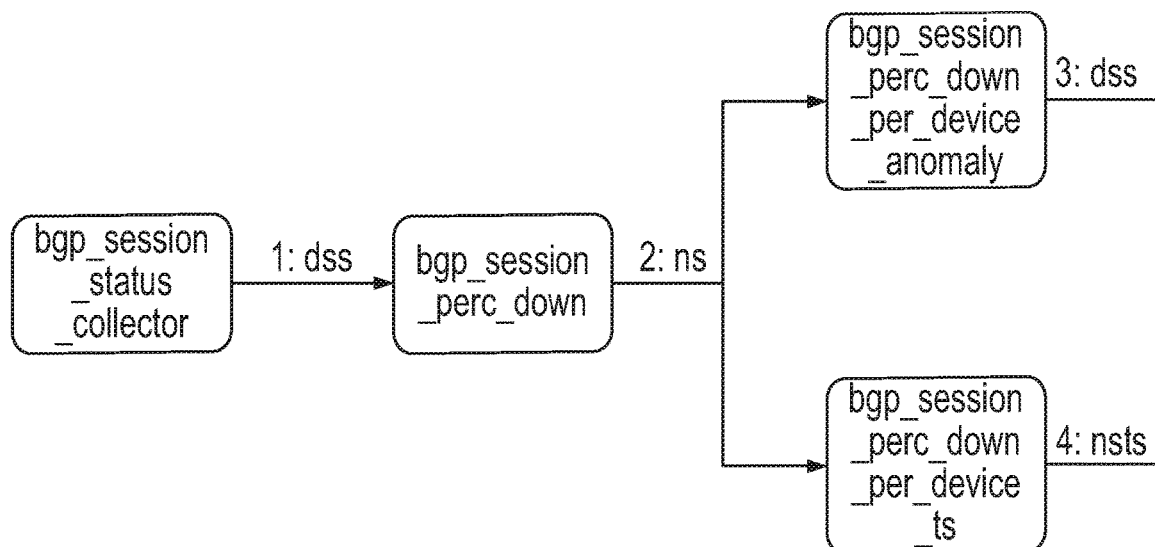
FIG. 20E is a diagram illustrating stages of an example probe for BGP session status per device anomalies.

FIG. 20E is a diagram illustrating stages of an example probe for BGP session status per device anomalies. This probe takes status for each BGP (Border Gateway Protocol) session that is expected to be there, groups it per device, shows the percentage of sessions that were down per device, shows how that percentage changed over recent history, and provides notification if that percentage is larger than 0. Recent history is defined by specifying the duration and/or number of samples. A description of stages of this probe shown in stage diagram 2010 is as follows:
1. Use "bgp" service collector (bgp_session_status_collector) to validate the status of all expected BGP sessions. Sessions are keyed by source/dest IP/ASN and these keys are obtained from the query (1:dss in the figure).
2. Group BGP sessions by system_id using "match_perc" processor to get percentage of sessions on a given device that are down (bgp_session_perc_down) (2:ns in the figure).
3. Raise anomaly if (2 above) is larger than 0 using "anomaly" processor (bgp_session_perc_down_per_device_anomaly). This anomaly will be active as long as there are BGP sessions down on the device (3:dss in the figure).
4. Create time series from output of (2 above), using "accumulate" processor (bgp_session_perc_down_per_device_ts). This time series shows how the percentage of BGP sessions that are down on a device change over time (4:nsts in the figure).

Once this probe is configured, the following data becomes available via APIs (e.g., by sending request to corresponding endpoint URL):
1. Last sample of each BGP session status on every device matching the query.
2. Percentage of BGP sessions down on each device.
3. BGP session anomaly on a device indicating that there are BGP sessions "down."
4. Time series showing how the percentage of BGP sessions down on a device changed over time.

Figure 20F:
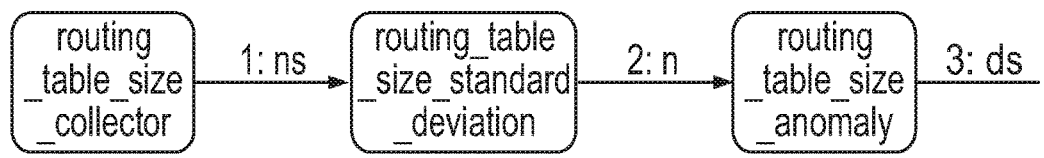
FIG. 20F is a diagram illustrating stages of an example probe for routing table size anomalies.

FIG. 20F is a diagram illustrating stages of an example probe for routing table size anomalies. This probe collects routing table size on all network leafs that are not connected to external routers, calculates standard deviation and raises anomaly if standard deviation is larger than 0. Stages of this probe are shown in stage diagram 2012.

Another example of a probe that can be specified is for virtual_network endpoint distribution. This type of probe is an example of a telemetry collector that operates on the graph itself. For example, this probe can be used to track the distribution of the number of virtual network endpoints per server and to validate whether it is uniform. Some other examples of probes related to virtual networks include a probe for the distribution of the number of endpoints per virtual_network and how virtual networks are spread across network racks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of network analysis performed by one or more processors, the method comprising:
receiving a first declarative specification that specifies a dynamically updating query for a collector element, wherein the dynamically updating query identifies criteria for matching a portion of a network and wherein the collector element is configured to collect results from the network based on the dynamically updating query;
receiving a second declarative specification that specifies a processing element separate from the collector element and configured to process the results collected by the collector element;
executing the collector element based on the first declarative specification and executing the processing element based on the second declarative specification, wherein executing the collector element and the processing element comprises, in response to an identification of a detected change in the network that would affect the dynamically updating query, reconfiguring at least one of the collector element or the processing element using one or more of the first declarative specification and the second declarative specification; and
providing an indication of a detected anomaly based on the at least one of the collector element or the processing element being reconfigured due to the detected change in the network.

2. The method of claim 1, wherein the dynamically updating query is for a graph representation of networking components of the network.

3. The method of claim 2,
wherein the graph representation includes a computing infrastructure node and a computing infrastructure edge;
wherein the computing infrastructure node comprises one or more of an identifier, a type, a label, a tag, or a property; and
wherein the computing infrastructure edge comprises one or more of an identifier, a type, a label, a tag, a source node, a target node, or a property.

4. The method of claim 2, wherein telemetry data of networking components of the network is stored in the graph representation.

5. The method of claim 1, wherein the dynamically updating query identifies a pattern of an interrelated set of infrastructure nodes and infrastructure edges of the network.

6. The method of claim 1, wherein the detected anomaly indicates an anomaly in a performance of the network.

7. The method of claim 1, wherein the method is at least in part performed as a part of a directed acyclic graph of stages in performing the network analysis.

8. The method of claim 1, wherein executing the processing element comprises aggregating a result of the results the dynamically updating query with a previous result of a previous processing.

9. The method of claim 8, wherein the detected anomaly is based at least in part on the aggregated result.

10. The method of claim 1, wherein the first declarative specification and the second declarative specification are included in an HTTP POST request.

11. The method of claim 1, wherein the indication of the detected anomaly is provided via a graphical user interface.

12. The method of claim 1, wherein the indication of the detected anomaly is provided via a streaming message.

13. The method of claim 1, further comprising automatically performing a responsive action based on the indication of the detected anomaly.

14. The method of claim 1, wherein providing the indication of the detected anomaly includes providing an analysis report of telemetry data gathered from one or more networking components of the network.

15. A system for network analysis comprising:
one or more processors configured to:
receive a first declarative specification that specifies a dynamically updating query for a collector element, wherein the dynamically updating query identifies criteria for matching a portion of a network and wherein the collector element is configured to collect results from the network based on the dynamically updating query;
receive a second declarative specification that specifies a processing element separate from the collector element and configured to process the results collected by the collector element;
execute the collector element based on the first declarative specification and execute the processing element based on the second declarative specification, wherein, to execute the collector element and the processing element, the one or more processors are configured to, in response to an identification of a detected change in the network that would affect the dynamically updating query, reconfigure at least one of the collector, element or the processing element, using one or more of the first declarative specification and the second declarative specification; and
provide an indication of a detected anomaly based on the at least one of the collector element or the processing element being reconfigured due to the detected change in the network; and
a memory coupled to at least one of the one or more processors and configured to provide at least one of the one or more processors with instructions.

16. The system of claim 15, wherein the dynamically updating query is for a graph representation of networking components of the network.

17. The system of claim 16, wherein telemetry data of networking components of the network is stored in the graph representation.

18. The system of claim 15, wherein the one or more processors are further configured to automatically perform a responsive action based on the indication of the detected anomaly.

19. The system of claim 15, wherein the one or more processors are configured to provide the indication of the detected anomaly including by being configured to provide an analysis report of telemetry data gathered from one or more networking components of the network.

20. A non-transitory computer readable medium comprising instructions for causing one or more processors to:
receive a first declarative specification that specifies a dynamically updating query for a collector element, wherein the dynamically updating query identifies criteria for matching a portion of the network and wherein the collector element is configured to collect results from the network based on the dynamically updating query;
receive a second declarative specification that specifies a processing element separate from the collector element and configured to process the results collected the collector element;
execute the collector element based on the first declarative specification and execute the processing element based on the second declarative specification, wherein the instructions that cause the one or more processors to execute the collector element and the processing element cause the one or more processors to, in response to an identification of a detected change in the network that would affect the dynamically updating query, reconfigure at least one of the collector element or the processing element using one or more of the first declarative specification and the second declarative specification; and
provide an indication of a detected anomaly based on the at least one of the collector element or the processing element being reconfigured due to the detected change in the network.

* * * * *